(12) United States Patent
Stebe et al.

(10) Patent No.: US 11,708,532 B2
(45) Date of Patent: Jul. 25, 2023

(54) SYSTEM AND METHOD FOR MANIPULATING A COLLOIDAL PARTICLE

(71) Applicant: The Trustees of the University of Pennsylvania, Philadelphia, PA (US)

(72) Inventors: Kathleen J Stebe, Penn Valley, PA (US); Francesca Serra, Baltimore, MD (US); Yimin Luo, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 12 days.

(21) Appl. No.: 17/025,431

(22) Filed: Sep. 18, 2020

(65) Prior Publication Data
US 2021/0087470 A1   Mar. 25, 2021

Related U.S. Application Data

(60) Provisional application No. 62/903,102, filed on Sep. 20, 2019.

(51) Int. Cl.
*C09K 19/52*   (2006.01)
*C09K 19/02*   (2006.01)
*B01J 19/12*   (2006.01)
*B01J 19/08*   (2006.01)

(52) U.S. Cl.
CPC ............. *C09K 19/52* (2013.01); *B01J 19/087* (2013.01); *B01J 19/12* (2013.01); *C09K 19/02* (2013.01); *B01J 2219/085* (2013.01); *B01J 2219/0852* (2013.01); *B01J 2219/12* (2013.01)

(58) Field of Classification Search
CPC .................................................... B01J 19/087
See application file for complete search history.

(56) References Cited

U.S. PATENT DOCUMENTS

8,323,755 B2 * 12/2012 Hegmann ............. G02F 1/1396
428/1.3

OTHER PUBLICATIONS

Luo et al. "Experimental realization of the "lock-and-key" mechanism in liquid crystals", Soft Matter, 2016, 12, 6027-6032. (Year: 2016).*
Blanc et al., "Ordering nano-and microparticles assemblies with liquid crystals," Liq. Cryst. Rev., vol. 1, (2013), pp. 83-109.
Brake et al., "Effect of surfactant structure on the orientation of liquid crystals at aqueous-liquid crystal interfaces," Langmuir, vol. 19, (2003), pp. 6436-6442.
Brenner, "The slow motion of a sphere through a viscous fluid towards a plane surface," Chem. Eng. Sci., vol. 16, (1961), pp. 242-251.
Brochard et al., "Dynamics of the orientation of a nematic-liquid-crystal film in a variable magnetic field," Phys. Rev. Letr., vol. 28, (1972), 1681.
Cavallaro et al., "Exploiting imperfections in the bulk to direct assembly of surface colloids," Proc. Natl. Acad. Sri. USA., vol. 110, (2013), pp. 18804-18808.

(Continued)

*Primary Examiner* — Chanceity N Robinson
(74) *Attorney, Agent, or Firm* — BakerHostetler

(57) ABSTRACT

Methods for colloidal particle manipulation mediated by an elastic fluid responsive to changes in boundary conditions, including methods of controlling motion of colloidal particles using wavy wall boundary conditions. Methods for driving transitions in topological defect configurations of colloidal particles using wavy wall boundary conditions.

18 Claims, 35 Drawing Sheets

(56) References Cited

OTHER PUBLICATIONS

Chen et al., "Colloidal transport within nematic liquid crystals with arrays of obstacles," Soft Matter, vol. 14, (2018), pp. 83-91.
Chernyshuk et al., "Theory of elastic interaction of colloidal particles in nematic liquid crystals near one wall and in the nematic cell," Phys. Rev. E., vol. 84, (2011), 011707.
De Gennes et al., "The Physics of Liquid Crystals," 2nd ed., Oxford University Press, New York, (1993).
Dinsmore et al., "Self-assembly of colloidal crystals," Curt. Opin. Colloid interface Sci., vol. 3, (1998), pp. 5-11.
Eskandari et al., "Particle selection through topographic templates in nematic colloids," Soft Matter, vol. 10, (2014), pp. 9681-9687.
Ganatos et al., "A strong interaction theory for the creeping motion of a sphere between plane parallel boundaries, Part 2, Parallel motion," J. Fluid. Mech., vol. 99, (1980), pp. 755-783.
Gu et al., "Observation of saturn-ring defects around solid microspheres in nematic liquid crystals," Phys. Rev. Lett., vol. 85, (2000), 4719.
Khullar et al., "Dynamic evolution of topological defects around drops and bubbles rising in a nematic liquid crystal," Phys. Rev. Lett., vol. 99, (2007), 237802.
Lavrentovich, "Transport of particles in liquid crystals," Soft Matter, vol. 10, (2014), pp. 1264-1283.
Lee et al., "Fine golden rings: tunable surface plasmon resonance from assembled nanorods in topological defects of liquid crystals," Adv. Mater, vol. 28, (2016), pp. 2731-2736.
Legge et al., "Photo-induced phase transitions in azobenzene-doped liquid crystals," J. Phys. D. Appl. Phys., vol. 25, (1992), pp. 492-499.
Li et al., "Directed self-assembly of colloidal particles onto nematic liquid crystalline defects engineered by chemically patterned surfaces," ACS Nano., vol. 11, (2017), pp. 6492-6501.
Loudet et al., "Application of an electric field to colloidal particles suspended in a liquid-crystal solvent," Phys. Rev. Lett., vol. 87, (2001), 165503.
Loudet et al., "Line defect dynamics around a colloidal particle," Eur. Phys. J. E., vol. 7, (2002), pp. 205-208.
Lubensky et al., "Topological defects and interactions in nematic emulsions," Phys. Rev. E., vol. 57, (1998), 610.
Luo et al., "Around the corner: colloidal assembly and wiring in groovy nematic cells," Phys. Rev. E., vol. 93, (2016), 032705.
Luo et al., "Experimental realization of the "lockand-key" mechanism in liquid crystals," Soft Matter, vol. 12, (2016), pp. 6027-6032.
Luo et al., "Tunable Colloid Trajectories In Nematic Liquid Crystals Near Wavy Walls," Nature Communications, vol. 9, (2018), 3841.
Manoharan, "Colloidal matter: packing, geometry, and entropy," Science, vol. 349, (2015), 1253751.
Matczyszyn et al., "Phase change in azobenzene derivative-doped liquid crystal controlled by the photochromic reaction of the dye," J. Phys. Chem. B., vol. 107, (2003), pp. 6039-6045.
Nobili et al., "Disorientation-induced disordering at a nematic-liquid-crystal-solid interface," Phys. Rev. A., vol. 46, (1992), R6174.
Nych et al., "Assembly and control of 3d nematic dipolar colloidal crystals," Nat. Comm., vol. 4, (2013), 1489.
Ohzono et al., "Zigzag line defects and manipulation of colloids in a menatic liquid crystal microwrinkle groove," Nat. Comm., vol. 3, (2012), 1709.
Peng et al., "Control of colloidal placement by modulated molecular orientation in nematic cells," Sci. Adv., vol. 2, e1600932 (2016).
Poulin et al., "Inverted and multiple nematic emulsions," Phys. Rev. E., vol. 57, (1998), 626.
Poulin et al., "Novel colloidal interactions in anisotropic fluids," Science, vol. 275, (1997), pp. 1770-1773.
Ravnik et al., "Landau-de gennes modelling of nematic liquid crystal colloids," Liq. Cryst., vol. 36, (2009), pp. 1201-1214.
Sengupta et al., "Topological microfluidics for flexible micro-cargo concepts," Soft Matter, vol. 9, (2013), pp. 7251-7260.
Serra, "Curvature and defects in nematic liquid crystals," Liq. Cryst., vol. 43, (2016), pp. 1920-1936.
Silvestre et al., "Key-lock mechanism in nematic colloidal dispersions," Phys. Rev. E., vol. 69, (2004), 061402.
Skarabot et al., "Interactions of quadrupolar nematic colloids," Phys. Rev. E., vol. 77, (2008), 031705.
Stark, "Director field configurations around a spherical particle in a nematic liquid crystal," Eur. Phys. J. B., vol. 10, (1999), pp. 311-321.
Stark, "Physics of colloidal dispersions in nematic liquid crystals," Phys. Rep., vol. 351, (2001), pp. 387-474.
Stark, "Saturn-ring defects around microspheres suspended in nematic liquid crystals: an analogy between confined geometries and magnetic fields," Phys. Rev. E., vol. 66, (2002), 032701.
Terentjev, "Disclination loops, standing alone and around solid particles, in Remade liquid crystals," Phys. Rev. E., vol. 51, (1995), pp. 1330-1337.
Vilfan et al., "Confinement effect on interparticle potential in nematic colloids," Phys. Rev. Lett., vol. 101, (2008), 237801.
Yi et al., "Recent progress on patchy colloids and their self-assembly," J. Phys. Condens., Matter 25, (2013), 193101.
Yoshida et al., "Three-dimensional positioning and control of colloidal objects utilizing engineered liquid crystalline defect networks," Nat. Comm., vol. 6, (2015), 7180.

* cited by examiner

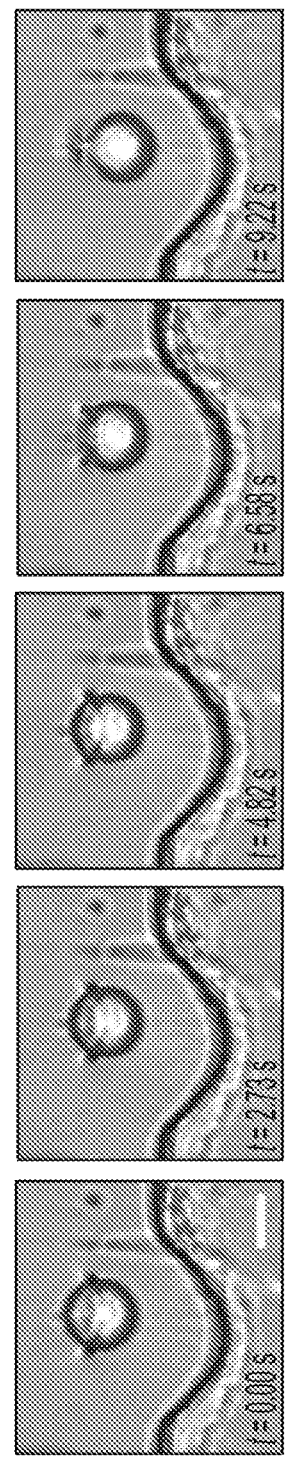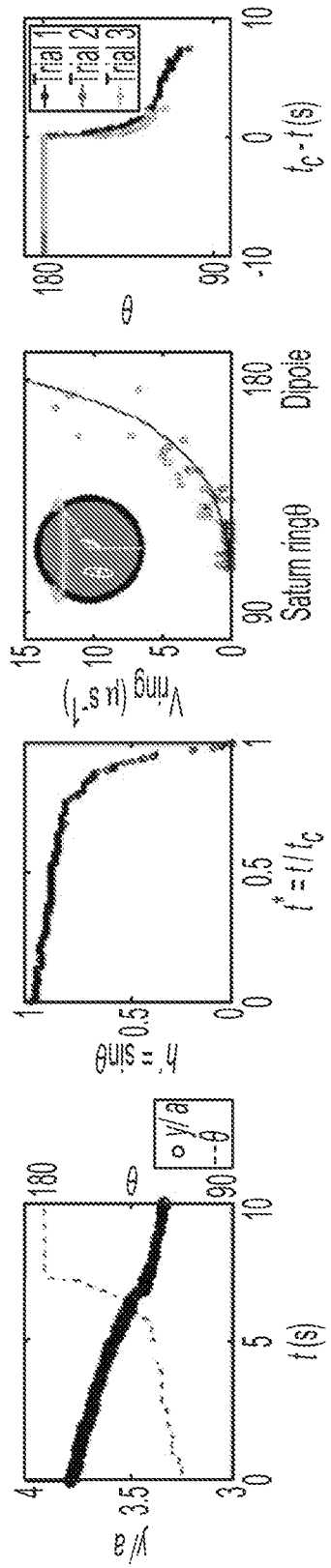
FIG. 14A
FIG. 14B
FIG. 14C
FIG. 14D
FIG. 14E

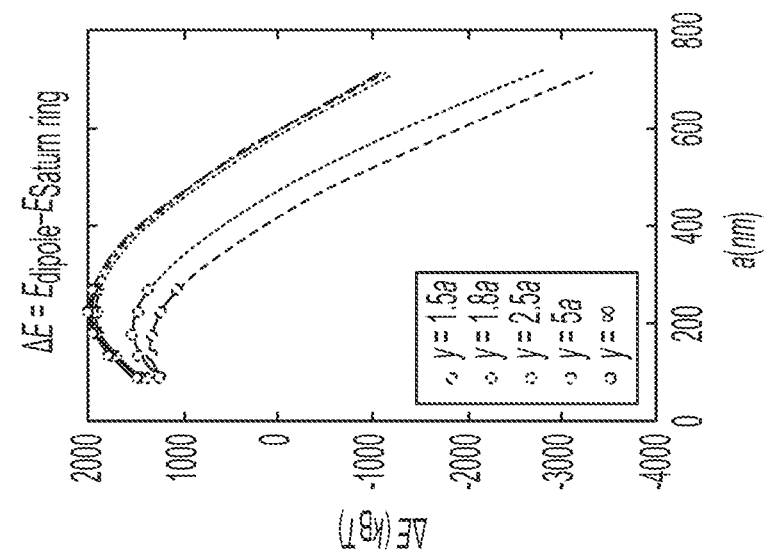
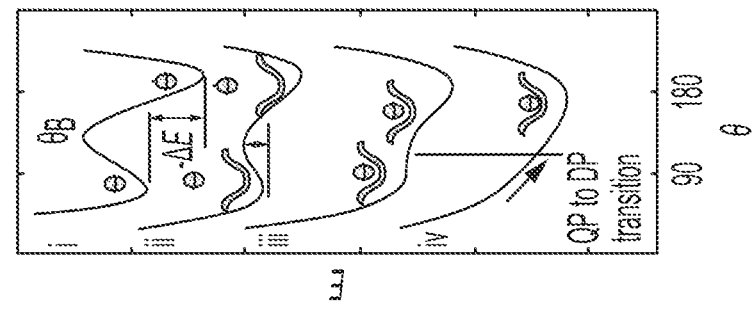
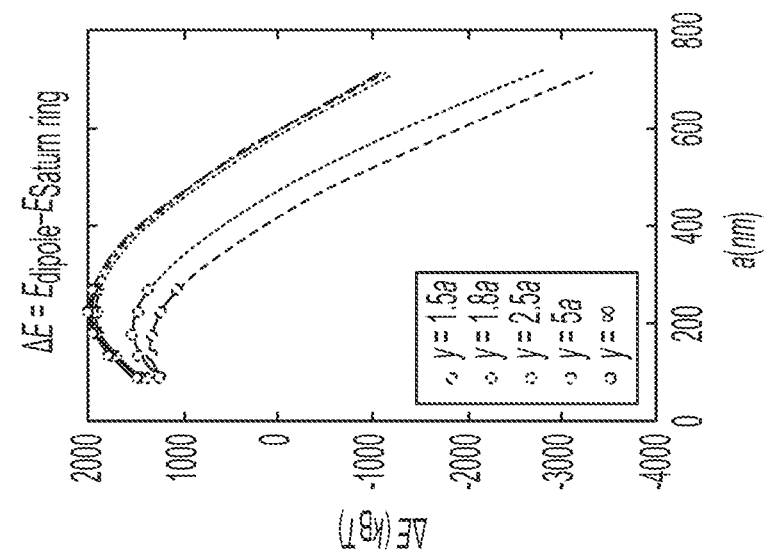
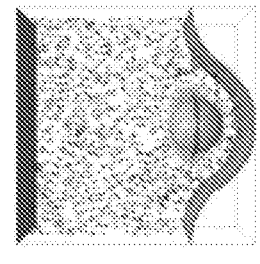
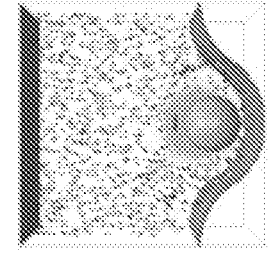
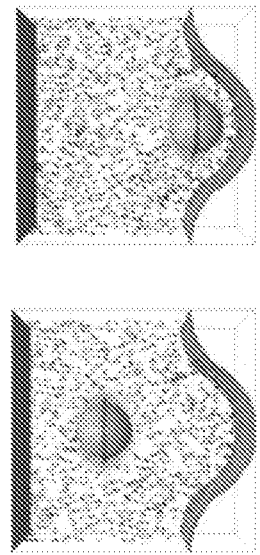
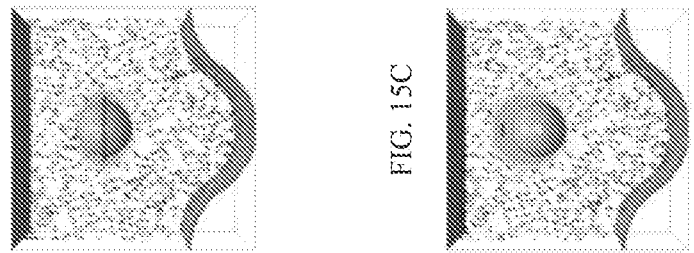
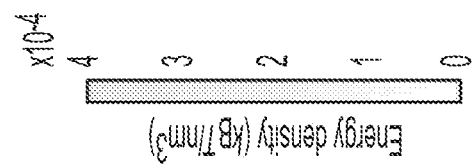

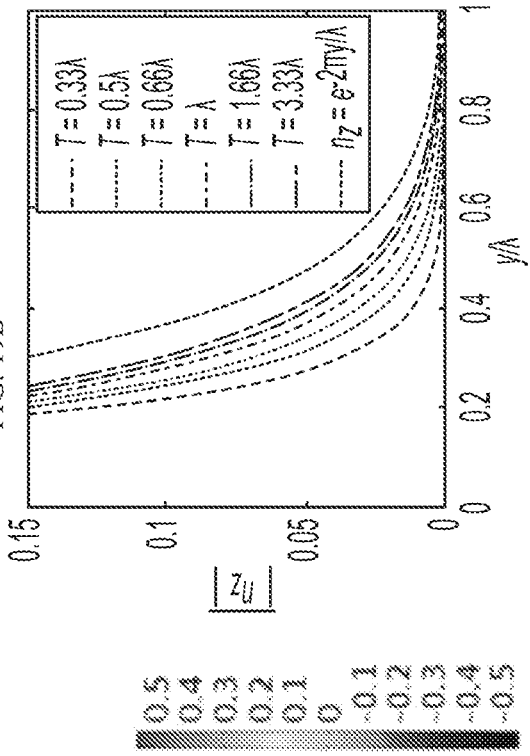
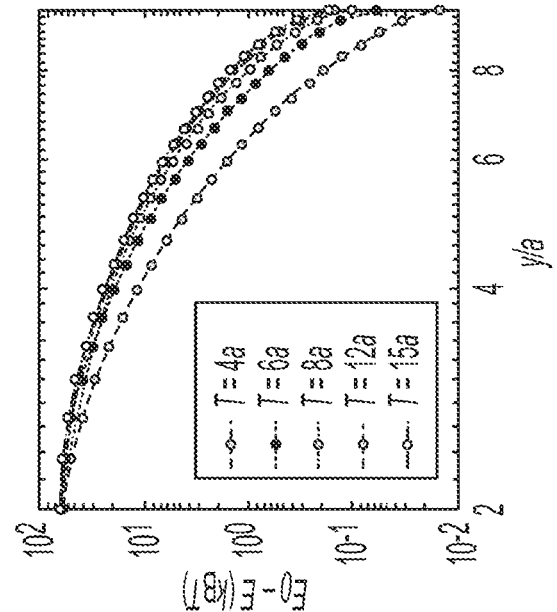
FIG. 19A
FIG. 19B
FIG. 19C
FIG. 19D

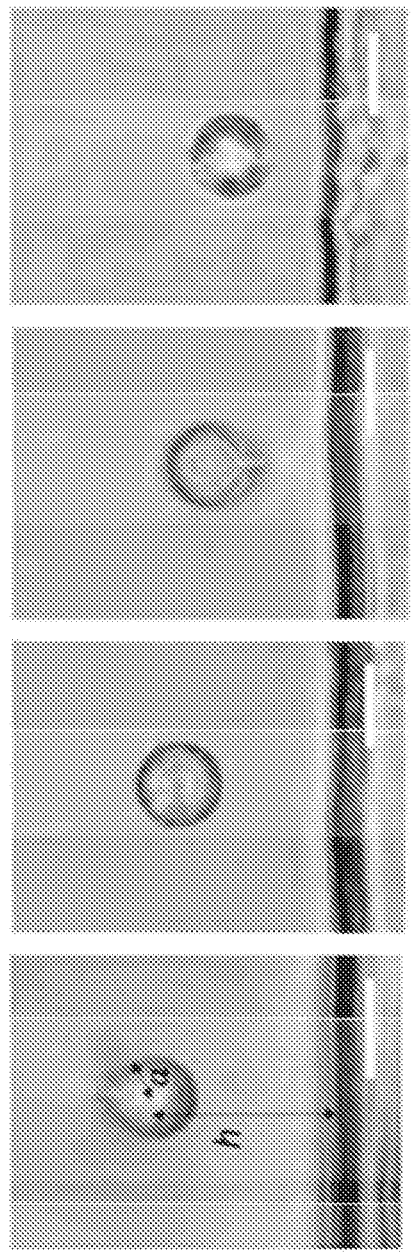 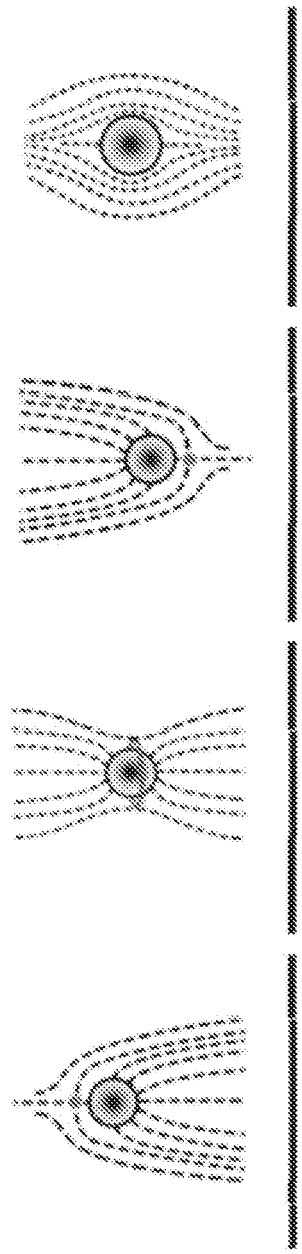
$h/a = 4.5$    3.5    3    2.2
FIG. 26A    FIG. 26B    FIG. 26C    FIG. 26D

SYSTEM AND METHOD FOR MANIPULATING A COLLOIDAL PARTICLE

CROSS REFERENCE TO RELATED APPLICATIONS

The present application claims priority to and the benefit of U.S. patent application Ser. No. 62/903,102, "Microrobots in Nematic Liquid Crystals" (filed Sep. 20, 2019), the entirety of which application is incorporated herein by reference for any and all purposes.

GOVERNMENT RIGHTS

This invention was made with government support under Grant No. W911NF1610288 awarded by the Army Research Office. The government has certain rights in the invention.

TECHNICAL FIELD

The invention relates to methods for colloidal particle manipulation mediated by an elastic fluid responsive to changes in boundary conditions, including methods of controlling motion of colloidal particles using wavy wall boundary conditions and methods for driving transitions in topological defect configurations of colloidal particles using wavy wall boundary conditions.

BACKGROUND

The ability to dictate colloid motion is an important challenge in fields ranging from materials science to living systems. Embedding colloids in liquid crystals has been broadly explored for multiple applications in which a particle must be controlled. These include material self-assembly, targeted delivery of different cargo, and novel manufacturing techniques. However, previous control methods tend to act directly on the liquid crystal using temperature, confinement, or electric fields. Additionally, these techniques are often "all or none," meaning that they either do not solicit a response or drastically change the crystal configuration.

SUMMARY

To improve upon techniques for colloidal particle manipulation and to provide a method of finer control over colloid/liquid crystal systems, the present disclosure describes using wavy wall boundary conditions to gently guide colloid motion within the liquid crystal. Such gentle guidance provides opportunities for (1) creating self-healing surfaces in which the particle fuses with a damaged boundary, (2) targeted delivery and release of cargo at specified locations, and (3) microscale manufacturing in which the liquid crystal is highly sensitive to perturbations and prompts self-assembly of the colloids.

Liquid crystal/colloid systems for targeted delivery and self-assembly of colloids, and the use of boundary conditions to gently guide colloids into different regions of the crystal domain have been described elsewhere. However, the disclosed technology describes methods of using wavy boundary walls to define multiple stable loci that act as attractors and unstable loci that repel colloids, and methods of using wavy boundary walls to drive transitions in topological defect configurations of colloidal particles. The disclosed technology demonstrates several aspects of colloid control, including transitions between defect configurations, propelling particles along well-defined paths and exploiting multi-stable systems to send particles to particular sites within the domain. Colloidal particles can be gently manipulated within the liquid crystal not through direct intervention, but by using an elastic fluid that responds to changes in boundary conditions and is reconfigurable (e.g., the position of colloids can be controlled by the amplitude and frequency of wavy boundary walls).

In one aspect, the present disclosure provides methods for manipulating a colloidal particle, the method comprising: constructing a nematic liquid crystal cell assembly by forming a bounded cell, including placing at least one wavy wall between two parallel plates to form at least one bounding edge; and confining nematic liquid crystals within the bounded cell, wherein the colloidal particle is within the nematic liquid crystals; wherein geometry of the at least one wavy wall defines an elastic energy field within the confined nematic liquid crystals that is configured to interact with the colloidal particle.

Also provided are systems, comprising: a bounded cell, the bounded cell comprising at least one wavy wall disposed between two parallel plates to form at least one bounding edge; nematic liquid crystals confined within the bounded cell, a colloidal particle disposed within the nematic liquid crystals; the geometry of the at least one wavy wall defining an elastic energy field within the confined nematic liquid crystals configured to interact with the colloidal particle.

Further provided are systems, comprising: a bounded cell, the bounded cell comprising at least one wavy wall disposed between two parallel plates to form at least one bounding edge; and nematic liquid crystals confined within the bounded cell, a colloidal particle disposed within the nematic liquid crystals; the geometry of the at least one wavy wall defining an elastic energy field within the confined nematic liquid crystals configured to interact with the colloidal particle such that the colloidal particle is encouraged to a stable location within the system.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings:

FIG. 11B a schematic of the experimental setup (N denotes rubbing direction, T denotes thickness of the cell). c, d Cross polarized images of liquid crystal near the wavy wall with the long axis either, FIG. 11C at a 45° angle to the polarizer or FIG. 11D perpendicular to the polarizer. The scale bars are 20 μm.

FIG. 12A—an equal time step (Δt=125 s) image is shown for the case λ=80 μm, H*=60 μm. FIG. 12B—a range of interaction H* vs. the wavelength of the feature λ for homeotropic droplets (open circles) and homeotropic colloids (crosses). FIG. 12C—the position of the particle y with respect to time t. Inset: Energy dissipated to viscosity along an article trajectory U with respect to the particle position y. The cross shows where we truncate the trajectory for integration along the path to infer the dissipation. The scale bar is 10 μm. Without being bound to any particular theory, H* (range of interaction) can be from, e.g., about 1 to about 100 μm or from about 5 to about 80 μm, from about 10 to about 65 μm, from about 15 to about 55 μm, or even from about 20 to about 45 μm.

FIG. 13A—filled red circles denote splay matching cases, where the Saturn ring sits at the equatorial position ($y_{def}/a=y_{eq}/a$). Crosses denote location of distorted Saturn rings, $y_{def}/a>y_{eq}/a$. Open circles indicate the height of the center of mass (COM) of the colloid. The dotted line denotes flat wall limit. Inset: Schematic of system geometry. FIGS. 13B, 13C—experimental bright field microscopy image and schematic of splay matching. FIGS. 13D, 13E—experimental bright field microscopy image and schematic of distorted Saturn ring. FIG. 13F—heights of the center of mass (COM, open circles) and hedgehog defects (crosses) of the colloid with dipole defects. FIGS. 13G, 13H—experimental bright field microscopy image and schematic of dipoles and their defects. The scale bars are 10 μm.

FIG. 14A-14D illustrates dynamics of the quadrupole to dipole transition. FIG. 14A—time-lapse image of a Saturn ring transforming to a dipole at a metastable position remotely from the wall defined by the elastic energy field. The scale bar is 10 μm. FIG. 14B—the y location of the colloid's center of mass (COM) and evolution of the polar angle θ during the transition. Initially, the colloids assume the θ=90° (Saturn ring) configuration, which gradually evolves to θ=180° as the COM continuously moves towards the wall. After the transition to a dipolar configuration, the particle approaches the wall. FIGS. 14C, 14D—reduced ring size and velocity from our system reveal similar dynamics of transition. The solid line serves as guide to the eye. FIG. 14E—a θ vs. $t_c$-t plot shows three experimental runs of transition in similar geometry. In FIGS. 14B-14Db-d, $t_c$ is the time at which θ=90°.

FIG. 15A-15F provides simulated energy density for dipole and quadrupole near a wavy boundary. By exploring the energy for colloids in dipole (DP) and Saturn ring (QP) configurations at various positions above the well for fixed colloid size and wavy wall geometry, the equilibrium heights for the Saturn ring are found. FIG. 15A—a Saturn ring located at the reference state far from the wall (state 1, y=5a). FIG. 15B—a Saturn ring located at its equilibrium location (state 2, y=1.8a), a decrease of 203.5 kBT from state 1. FIG. 15C—a dipole located at the reference state far from the wall (state 1, y=5a). FIG. 15D—a dipole located at its equilibrium location (state 2, y=1.5a), with an energy decrease of 585.01 kBT from state 1. FIG. 15E—schematic representation of the total energy of the system E vs. the reaction coordinate θ for several distances y from the well, changing from far from the well to close to the well (i through iv) as E decreases. The presence of the well shifts the angle of the energy barrier's maximum to the right (increasing θ) and decreases the energy barrier until it is eliminated as the particle moves closer to the wall. FIG. 15F—the energy of the dipole and quadrupole are calculated for systems of different size (colloid radius a=90, 135, 180, 225, 270 nm; the simulation box and the walls are scaled accordingly). The energy difference between quadrupole and dipole ($\Delta E=E_{dipole}-E_{Saturn}$ ring) is plotted against a. Circles denote simulation results, solid lines are fitted to forms suggested by scaling arguments, dotted line are extrapolations based on these fits.

FIG. 16A—elastic energy field and the resulting forces for colloids near the wall in a Saturn ring configuration. FIGS. 16B-16E Particle paths are illustrated by points that indicate particle COM position over time; time step Δt=5 s between neighboring points. The colored dots denote: FIG. 16B—three representative trajectories (out of 28) of a colloid with Saturn ring defect. FIG. 16C—four representative trajectories (out of 12) of an upward-oriented dipole. FIG. 16D—two representative trajectories (out of 11) of a downward-oriented dipole. FIG. 16E—two representative trajectories (out of 14) of a planar-anchoring colloid with two boojums released between two neighboring wells. Insets: schematics of colloids with respective defect types. The scale bars are 10 μm. FIG. 16F—the range of interaction H* as a function of λ is similar for homeotropic (H) and planar (P) anchoring, for hedgehog (DP) and Saturn ring (QP) defects, and for solid colloids and droplets.

FIG. 17A—schematic of two parallel walls with a gap comparable to 2λ, between them. FIG. 17B, 17C—a magnetic particle with a Saturn ring defect, placed near a hill, with wall to wall separation (b) 60 μm and (c) 42 μm. In FIG. 17B, the particle is more attracted to the wall on the same side. In FIG. 17C the particle is repelled from the hill, and traverses the separation between walls to dock in the well on the opposite side (2a=9 μm). FIG. 17D-17F—behaviors of the dipoles. The waves of the wall are either out of phase with hill to hill configuration such as in d or in phase with hill to valley such as in FIG. 17E, 17F—the scale bars are 10 μm.

FIG. 18A—schematic of the experimental setup with tilt angle α to harness gravity to drive colloid motion in x direction. FIG. 18B—image of the setup which allows fine control of the tilt, and thus the x-component of gravity gsinα. FIG. 18C—a colloid traveling with x-directed velocity Vx=0.01 μms$^{-1}$ at tilt angle α=11.2°. FIG. 18D—a colloid traveling at Vx=0.06 μms$^{-1}$ at tilt angle α=12.3°. FIG. 18E—particle trajectories at various initial loci predicted for the sum of the elastic energy field and a gravitational potential energy gradient in −x direction across uniform set of wells (λ=70 μm). FIG. 18F—a colloid traveling at Vx=0.09 μms$^{-1}$ at tilt angle α=12.8° across wells of decreasing wavelengths (λ=70, 60, 50, 40 μm).

FIG. 19A-19D shows that confinement truncates the decay length of wall perturbations in the director field. (FIG. 19A) The color denotes the deviation from 0 of the x n component of the director field, which decays with distance y from the wavy wall. The color bar denotes the magnitude of the distortion. At z=0, the wall imposes uniform planar anchoring; thus, at this slice, x n=0. At the plane z=0.5T corresponding to the midplane between top and bottom plates, the distortion is strongest. (FIG. 19B) The absolute value for x n, averaged across the gap, versus the colloid's distance y from the bottom of the well. The dotted line corresponds to exponential decay, the limit for an infinite gap width. (FIG. 19C) Schematic of the configuration for LdG simulation of a colloid of radius a with center of mass (COM) at height y above the bottom of the well in a cell of thickness T with a Saturn ring defect. (FIG. 19D) The energies from LdG numerical modeling for cell of thickness T vs. y, normalized by radius of the colloid.

(FIG. 21A) Saturn ring reaches lowest energy at y/a=1.8 (splay matching) when simulated with 2.6x core energy where the ring does not distort. (FIG. 21B) Saturn ring reaches lowest energy at y/a=1.6 (distorted Saturn ring) when simulated with 1x core energy. (FIG. 21C) Dipole reaches lowest energy at y/a=1.5 when simulated with 2.6x core energy and initialized with dipolar configuration around the particle. a=135 nm, R=243 nm, R/a=1.8 in all cases. We have verified that the same equilibrium position hold for system of different sizes as long as the core energy is the same as the cases simulated here. The reference energy is set to be the minimum energy stage corresponding to the equilibrium position.

(FIG. 22A) Same as FIG. 14D but including two cases which include debris. The angle evolution is highly reproducible in all cases near the transition time $t_c$. (FIG. 22B) Tracking center of mass (COM) height and polar angle θ evolution during the quadrupole to dipole transition for well of 2A=25 um. (FIG. 22C) Two instances of quadrupole to-dipole transition in well 2A=25 um with reproducible dynamics. (FIG. 22D) Defect dynamics of two transitions which happened near walls with 2A=15 um and 2A=25 um wells respectively show that, even if the systems are different, the dynamics of the transition is similar. The legends in FIGS. 22A, 22C, 22D denote video number of the trajectories tracked.

(FIG. 24A) The difference between the dipole and Saturn ring in phase energy scales linearly in a. This scaling emerges because the defect energy of the dipole does not grow while that of the Saturn ring defect does grow with the linear dimension of the system. (FIG. 24B) The difference in gradient free energy has a linear part (~a) and a logarithmic part (~a log a). Here it is fitted to form k1a+k2a log a+k3. At large radius, this is linear in a.

(FIGS. 25A, 25B) Sample LdG numerical modeling results with a colloid centered at two different grid locations above a wavy wall. (FIG. 25C) Discretized form of energy by choosing the site above the center of the well (λ/2, λ) as the reference energy. (FIG. 25D) Smoothed energy field extended by assuming symmetry and periodicity.

FIG. 26A-26D provides equilibrium distance of particles away from a planar homeotropic wall. Particle diameter 2a=8.7, 10, 10.2, 9.8 um in FIG. 26A-26D. The final equilibrium particle position away from a flat wall for (a) a dipole with its point defect oriented upwards, (FIG. 26B) a colloid with Saturn ring defect, (FIG. 26C) a dipole with its point defect oriented downwards, (FIG. 26D) a colloid with boojums. Defects are illustrated schematically in red in all cases. The scale bars are 10 um.

DETAILED DESCRIPTION OF ILLUSTRATIVE EMBODIMENTS

Figure 1:
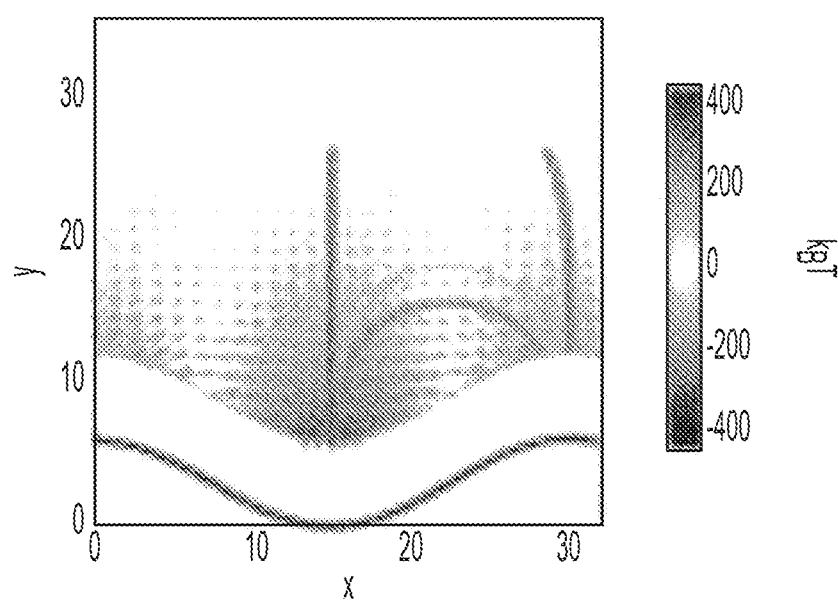
FIG. 1 provides a depiction of a heat map of the elastic energy for a colloid in the vicinity of the wavy wall according to aspects of the present invention.

The present disclosure may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

It should be understood that the present disclosure also incorporates the content of "Tunable Colloid Trajectories In Nematic Liquid Crystals Near Wavy Walls," Luo et al., *Nature Communications* (2018), 9:3841 (DOI: 10.1038/s41467-018-06054-y), the entirety of which foregoing publication is incorporated herein by reference for any and all purposes.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps can be performed in any order.

It is to be appreciated that certain features of the invention which are, for clarity, described herein in the context of separate embodiments, can also be provided in combination in a single embodiment. Conversely, various features of the invention that are, for brevity, described in the context of a single embodiment, can also be provided separately or in any subcombination. All documents cited herein are incorporated herein in their entireties for any and all purposes.

Further, reference to values stated in ranges include each and every value within that range. In addition, the term "comprising" should be understood as having its standard, open-ended meaning, but also as encompassing "consisting" as well. For example, a device that comprises Part A and Part B can include parts in addition to Part A and Part B, but can also be formed only from Part A and Part B.

By embedding energy landscapes in confined nematic liquid crystals (NLCs), a versatile platform is provided to define colloidal migration. This is achieved by placing a wavy wall, with alternating hills and wells, in nematic liquid crystals, to impose a smooth elastic energy field with alternating splay and bend distortions. This domain generates (meta)stable loci that act as attractors and unstable loci that repel colloids over distances large compared to the colloid radius. Energy gradients in the vicinity of these loci are exploited to dictate colloid trajectories. Several aspects of this control are demonstrated, by studying transitions between defect configurations, propelling particles along well defined paths, and exploiting multistable systems to send particles to particular sites within the domain. Such tailored landscapes have promise in reconfigurable systems and in microrobotics applications.

The development of robust methods to drive microscopic objects along well defined trajectories paves new routes for materials assembly, path planning in microrobotics and other reconfigurable micro-systems. Strategies developed within NLCs are one means to address these needs. Because the strategies developed in liquid crystals depend on topology, confinement, and surface anchoring, which can be manipulated by changing surface chemistry or texture on colloids with very different material properties, they are applicable across materials platforms. Controllable elastic energy fields are developed in NLCs near wavy walls as a tool to manipulate the ranges of attraction and to define stable equilibria, and have also exploited elastic energy fields to drive transitions in topological defect configurations. The near-field interaction between the colloid and the wall rearranges the defect structure, driving a transition from the metastable Saturn ring configuration to the globally stable dipolar configuration for homeotropic colloids.

Furthermore, the concept of repulsion from unstable points was developed as a means to dictate paths for colloids immersed within the NLCs. Unstable sites from which multiple trajectories can emerge have been identified, and these trajectories can be used to propel particles, demonstrating the multistability made possible by the wavy wall geometry.

In one embodiment, a colloid is attracted to a site, and that fuses with the boundary making a repair at that site in an arbitrary liquid crystalline medium. This technology has application in a general setting that contains liquid crystalline material. The ability to take advantage of the elastic distortion inside the liquid crystal to find flawed site can be broadly applied to repair surface imperfections.

In another embodiment, a number of particles which are initially held at the unstable loci by an external field are subsequently released. Due to minor perturbation in their initial positions, they follow distinct paths and reach different final states. The associated defect with the particle, a natural result of topology, can interact with the boundary geometry if the particle approaches the wall. In addition, the particles can carry content with environmental sensing capabilities. Upon release, the particles explore different sections of the domain for distributed sensing and reporting. This ability has application in settings where targeted delivery is required (e.g., prompting cell differentiation via specific signaling molecules) or in sensing applications.

In yet another envisioned embodiment, materials assembly is realized through the controlled displacement and release of the defect ring via the control of the boundary conditions that can be further actuated by tunable liquid crystal elastomers. Exquisite control can be set up given the extraordinary sensitivity of liquid crystals to perturbations. The ability to utilize defects as template for colloidal assembly has been broadly explored in use for photonic materials and macromolecule assembly. However, previous control methods (temperature, confinement, electromagnetic field, etc.) have significant drawbacks; they either do not solicit a response or drastically change the director configuration. Here, a system was designed where extremely fine control can be realized by modifying the boundary conditions rather than acting on the liquid crystal directly.

Colloids in nematic liquid crystals (NLCs) confined within bounding surfaces with tailored topographies were also developed as microrobots. The elasticity of the fluid confined in controlled boundaries defines a force field, giving opportunity to direct microrobot motion by controlling the boundary shape. Interactions that arise from distortions and topological defects made by the colloids in the NLC are exploited to simulate, predict and control the motion of the robots. Topological defects collect molecules and nanoparticles. The microrobots can sense within the domain. The distortions disturb the nematic director field, with energetic costs that depend on colloid size and shape, colloid position, NLC orientation at the bounding surfaces, and boundary geometry.

Loci attractive to colloidal particles were also defined and controlled with precision. Such highly controllable interaction can lead to transformation of the topological defects associated with the colloids. This change, in turn, alters modality of colloid assembly, range of interaction, and structure formation. Additionally, repulsive loci, from which multiple paths diverge, were defined. For example, microrobots are repelled from surfaces that violate shape complementarity; by appropriate responsive boundary design, fixed points are embedded in the domain in the energy landscape to which colloid paths converge, and unstable points from which colloids diverge along multiple paths for distributed sensing and reporting. Controlled colloid paths will be achieved using electric or magnetic fields and/or deformation of the reconfigurable LCE bounding surfaces.

Controlled paths for colloids can also be based on energy efficient control strategies developed for macro-scale autonomous vehicles operating in flows that exploit critical manifolds or separatrices that delineate dynamically distinct regions in the external field. Motion control and path planning strategies for independent control of multiple colloids, and achieving single to ensemble control of these colloids, can be realized by leveraging the arrangement of the critical points and critical manifolds in electromagnetic force field and in the tunable position of the LC elastomeric boundary. The result is a responsive system capable of distributed sensing, actuation and adaptation. Furthermore, by designing a series of perturbations, it is possible to create "secret knocks" that trigger given transformation between topological defects and reconfigurations of the system, enabling computation and data storage.

In NLCs, topology, confinement, and surface anchoring dictate colloid interactions with elastic energy landscapes. This behavior implies that strategies to dictate colloidal physics developed in these systems are robust and broadly applicable to any material with similar surface anchoring and shape. Furthermore, the ability to control the types of topological defects that accompany colloidal particles provides access to significantly different equilibrium states in the same system. Isolated colloids with homeotropic (perpendicular) anchoring are accompanied by a topologically required companion defect. This defect adopts either a hyperbolic hedgehog configuration, with a topological point defect near the particle, or a Saturn ring configuration with a disclination line encircling the particle. The hedgehog configuration is commonly observed for micron-sized particles, although the Saturn ring can be stabilized by confinement. Similarly, a colloid with planar anchoring forms two topologically required "boojums", surface defects at opposing poles. Together, the hedgehog and the colloid form a topological dipole, while colloids with Saturn ring or boojums companion defects have quadrupolar symmetries. Far from the colloid, the corresponding disturbances in the director field are analogous to the electrostatic potential distribution around charged multipoles. Thus, the structure of the colloid and its companion defect dictate the range and form of their interactions. Control over each of these defect configurations is demonstrated.

Exemplary Methods

A wavy wall is confined between two parallel plates as a tool to direct colloid assembly. The wavy wall is configured as a bounding edge to the planar cell. The wavy wall is sandwiched between two antiparallel glass cover slips, treated with 1% PVA (poly(vinyl alcohol)), annealed at 80° C. for one hour and rubbed to have uniform planar anchoring. Once assembled, the long axis of the wall is perpendicular to the oriented planar anchoring on the bounding surfaces.

A wavy wall can have periodic undulations, although the undulations need not always be perfectly periodic. The undulations of a wavy wall can have the same amplitude, though this is not a requirement. When two wavy walls oppose one another, the first opposing wall can include undulations that have the same period and/or amplitude as the undulations of the second opposing wall, although this is not a requirement. The "peaks" of a first wall's undulations can be opposite the "peaks" of the second wall's undulations, but this is not a requirement. An example wavy wall is shown in FIGS. 1A-1D of "Tunable Colloid Trajectories In Nematic Liquid Crystals Near Wavy Walls," Luo et al., *Nature Communications* (2018), 9:3841 (DOI: 10.1038/s41467-018-06054-y), incorporated herein by reference in its entirety.

Figure 2:
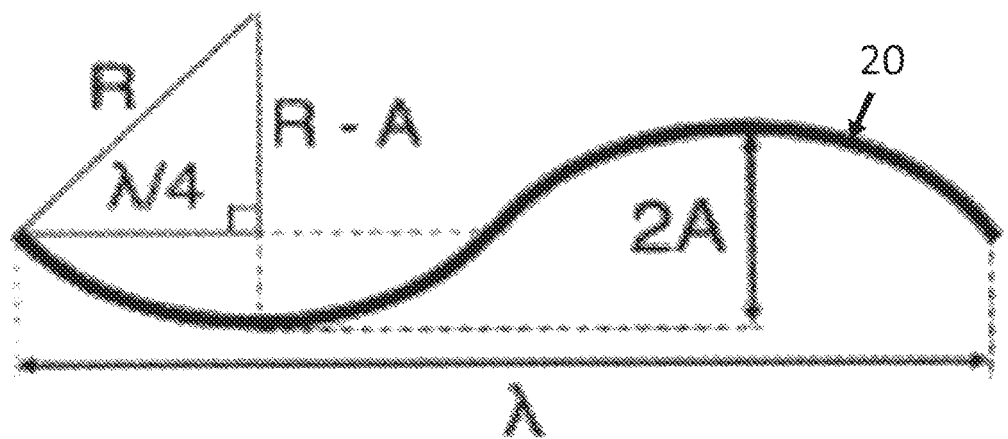
FIG. 2 provides a schematic of the wavy wall shape with relevant parameters according to aspects of the present invention.
Figure 3:
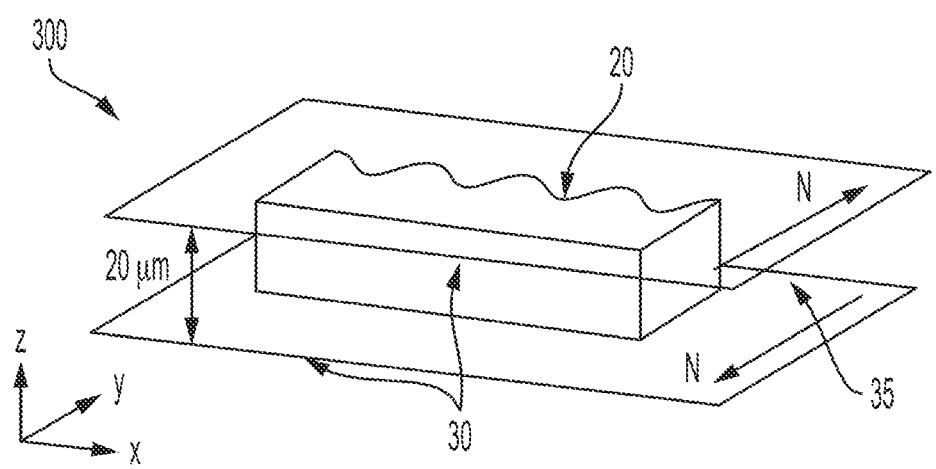
FIG. 3 provides a schematic of the experimental setup involving the wavy wall according to aspects of the present invention.

To mold the elastic energy landscape near a curved boundary (FIG. 1), long, SU-8 epoxy resin strips were fabricated using standard lithographic techniques to form wavy wall structures 20 (FIG. 2) that are placed between two parallel glass slides 30 with planar anchoring oriented perpendicular to the strip (FIG. 3). The wavy wall 20 is configured as a bounding edge to the planar cell 300. These strips, of thickness between 20-28 μm, are coated with silica using silica tetrachloride via chemical vapor deposition, then treated with DMOAP (dimethyloctadecyl[3-(trimethoxysilyl)propyl]). The wavy wall 20 is sandwiched between two antiparallel glass cover slips 30, treated with 1% PVA (poly(vinyl alcohol)), annealed at 80° C. for one hour and rubbed to have uniform planar anchoring. Once assembled, the long axis of the wall 20 is perpendicular to the oriented planar anchoring on the bounding surfaces. This cell 300 is filled by capillarity with a suspension of colloids in the nematic liquid crystal 35 (NLC) 4-cyano-4'-pentylbiphenyl (5CB) in the isotropic phase, and subsequently quenched into the nematic phase ($T_{NI}$=34.9°). The walls 20 have period λ (FIG. 2) ranging from 27-80 μm and consist of smoothly connected circular arcs of radius R between 7-40 μm. In some LC cells the actual thickness was larger than expected, which was attributed to a gap above the strip. In those cases some small colloids could remain trapped between the wavy strip 20 and the top glass surface 30, so the effective thickness could be as large as 35-40 μm.

Colloid migration within this assembly was observed with an optical microscope. For the larger beads, strong confinement between the glass slides stabilizes the Saturn ring configuration. The size and polydispersity of the colloids are characterized by measuring a number of colloids using the program FIJI. Colloids used included:

(1) a=7.6±0.8 μm silica particles (Corpuscular Inc.), treated with DMOAP to have homeotropic anchoring;

(2) a=4.3±0.4 μm ferromagnetic particles with polystyrene core and coated with chrome dioxide (Spherotech, Inc.), treated with DMOAP, an amphiphile that imposes homeotropic anchoring, and with PVA for planar anchoring; and (3) a=4.3±8 μm custom-made emulsion droplets where water phase was loaded with magnetic nanoparticles and crosslinked. The oil phase consisted of 5CB mixed with 2 wt % Span 80. The water consisted of a 50:50 mixture of water loaded with iron oxide nanoparticle and a pre-mixed crosslinking mixture. The magnetic nanopowder iron (II, III) oxide (50-100 nm) was first treated with citric to make it hydrophilic. The crosslinking mixture was pre-mixed with HEMA (2-hydroxyl ethyl methacry-late): PEG-DA (poly (ethylene glycol) diacrylate): HMP (2-hydroxyl-2-methyl-propiophenone) in 5:4:1 ratio. Water and oil phases were emulsified with a Vortex mixer to reach desired colloid size range. The two were combined in a vial treated with OTS (trichloro(octadecyl)silane) to minimize wetting of the wall by the water phase during the crosslinking process. All chemicals were purchased from Sigma Aldrich unless otherwise specified.

The emulsion was crosslinked by a handheld UV lamp (UVP, LLC) at 270 nm at roughly P=1 mW/cm$^2$ for 3 hours. The emulsion was stored in a refrigerator for stability. Span 80 ensured that the liquid crystal-water interface would have homeotropic anchoring. The magnetic droplets were very polydispersed due to the emulsification process. However, when their behavior was compared with the silica and ferromagnetic colloids, only colloids and droplets of similar sizes were compared.

Smaller beads, which experience weaker confinement, adopt the dipolar structure. Particles are equally repelled by elastic interactions with the top and bottom glass slides, whose strength dominates over the particles' weight, so gravity plays a negligible role in the system. When observed through the microscope, this configuration forms a quasi-2D system in the (x, y) plane, where y is measured from the base of a well in the direction perpendicular to the wall. The wavy wall 20 forms a series of hills and valleys, with a distance 2A from the base of the well to the highest point on a hill (FIG. 2). Because of strong homeotropic anchoring at the wavy wall 20, these features impose zones of splay and bend in this domain. In particular, the valleys are sites of converging splay, the hills are sites of diverging splay, and the inflection points are sites of maximum bend. In terms of the parameters R and A, the structure has period. Unless specified otherwise, 2A=10 μm. The gentle undulations of this wall 20 deform the surrounding director field but do not seed defect structures into the NLC. The control achieved over colloidal motion was determined by characterizing particle behavior within the energy landscape near this wall. In addition, Landau-de Gennes (LdG) simulations of the liquid crystal orientation were used.

The cells 300 form a quasi-2D system that is viewed from above. In this view, the wavy wall 20 is in the plane of observation. The homeotropic colloids 50 dispersed in the NLC 35 are located between the top and bottom coverslips. These colloids 50 are levitated away from both top and bottom surfaces by elastic repulsion. The cell was imaged with an upright microscope (Zeiss Axiolmager M1m) under magnification ranging from 20× to 50×. The dynamics of the colloid near the wavy wall were recorded in real time using optical microscopy. Additional information regarding the director field configuration was also gleaned using polarized optical microscopy (POM).

A magnetic field was applied by using a series of 8 NdFeB magnets (K&J Magnetics, Inc.) attached to the end of a stick. The magnets was placed roughly 0.5 cm from the sample; the field applied is estimated to be roughly 40-60 mT, far below the strength required to reorient the NLC molecules, but sufficiently strong to overcome the drag and move magnetic droplets and particle in arbitrary directions.

Numerical modeling provides insight into the NLC director field in the confining geometries. The standard numerical Landau-de Gennes (Q-tensor) approach was used with a finite difference scheme on a regular cubic mesh. This approach is widely used to compute regions of order and disorder in bounded geometries through a global free energy minimization. The Q-tensor is a second-rank, traceless, symmetric tensor having a largest eigen-value of order parameter S in the NLC. Using the Landau-de Gennes approach, at equilibrium, the 3-D director field and the locations of defect structures for a given geometry were predicted. The nematic director field, a headless vector field (i.e. −n≡n), represents the average direction of an ensemble of molecules of size comparable to the correlation length at any point in the system. The geometry of the system, the boundary conditions, and elastic constants for the NLC 35 are inputs to the numerical relaxation procedure. Specifically, the particle is bounded by walls with oriented planar anchoring separated by thickness T=4a. The anchoring at the boundary opposite of the wavy wall 20 was set to zero, and that of the flat plates sandwiching the colloid 50 and the wavy wall 20 was set to oriented planar. The Nobili-Durand anchoring potential was used.

Defects were defined as the regions where the order parameter S is significantly less than the bulk value. The mesh size in the simulation was related to the correlation length in the NLC 35, and corresponds to 4.5 nm. Due to the difference in scale, the exact final configurations of numerics and experiment must be compared with caution; nevertheless, it is an invaluable tool to corroborate and elucidate experimental findings. Because the size of simulation is much smaller, much stronger anchoring is applied. For most of the results, infinite anchoring strength is applied unless otherwise specified. To simulate dipoles, the material constants B and C were varied so that the core energy of the defect is 2.6×higher to compensate for the small system. In addition, an initial condition was used with a dipolar configuration about the colloid, where Rc is the colloid radius, $r_c$ is the location of the colloid center, P=3.08 is the dipole moment, and is the far-field director. This expression is applied only in a sphere of radius 2Rc around $r_c$.

Exemplary Results

FIG. 1 shows sample trajectories that a particle 50 can take next to a wall thanks to the rich energy landscape. In this system, elastic energy gradients are defined by the period and amplitude of the wavy wall structure 20 (FIGS. 2 and 3), allowing long ranged wall-colloid interactions. Colloids 50 can be placed at equilibrium sites far from the wall 20 that can be tuned by varying wall 20 curvature. Unstable loci, embedded in the elastic energy landscape, can repel colloids and drive them along multiple paths.

Figure 4:
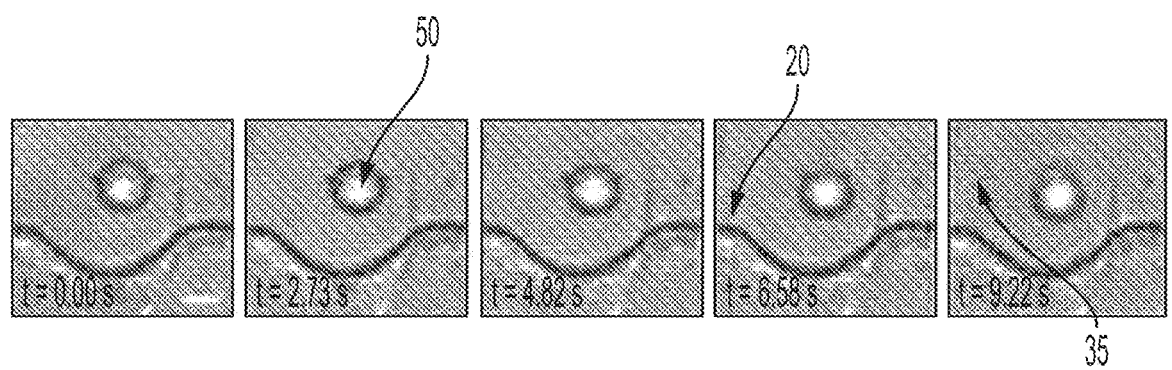
FIG. 4 provides time-lapse images of a Saturn ring particle transforming to a dipole according to aspects of the present invention.
Figure 5A:
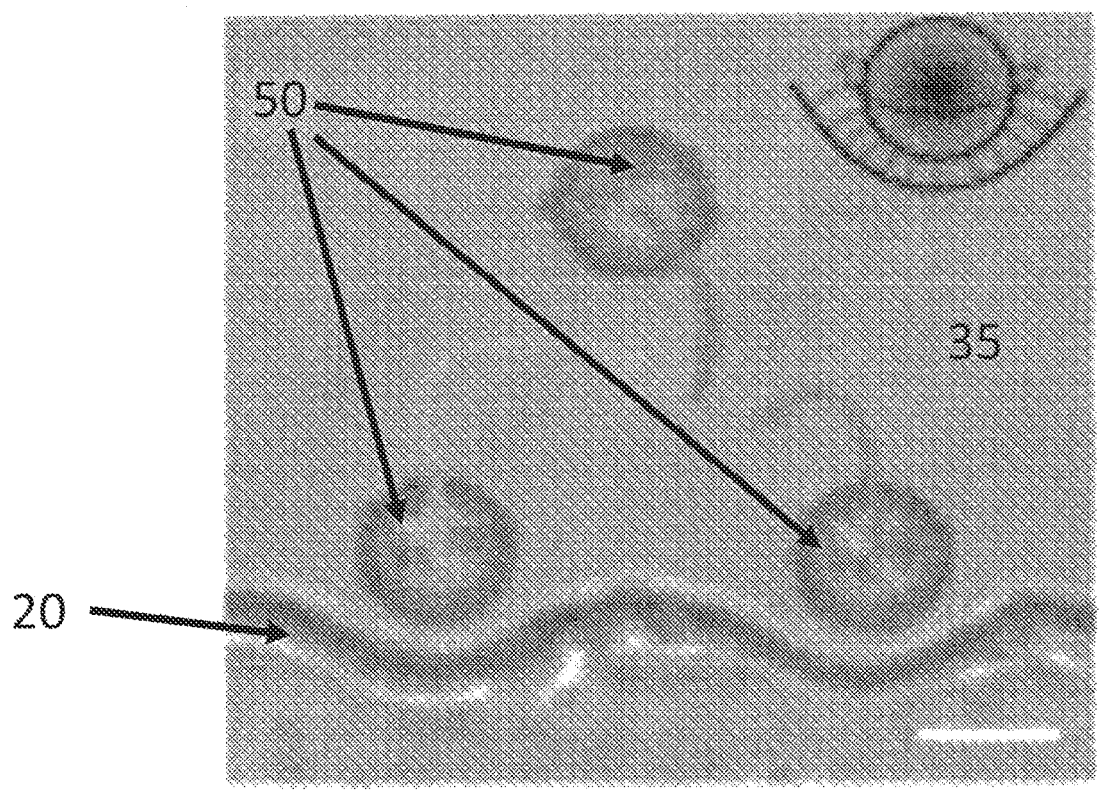
FIG. 5A provides an image of three trajectories traced by a homeotropic colloid released from an initial position between two identical wells according to aspects of the present invention.
Figure 5B:
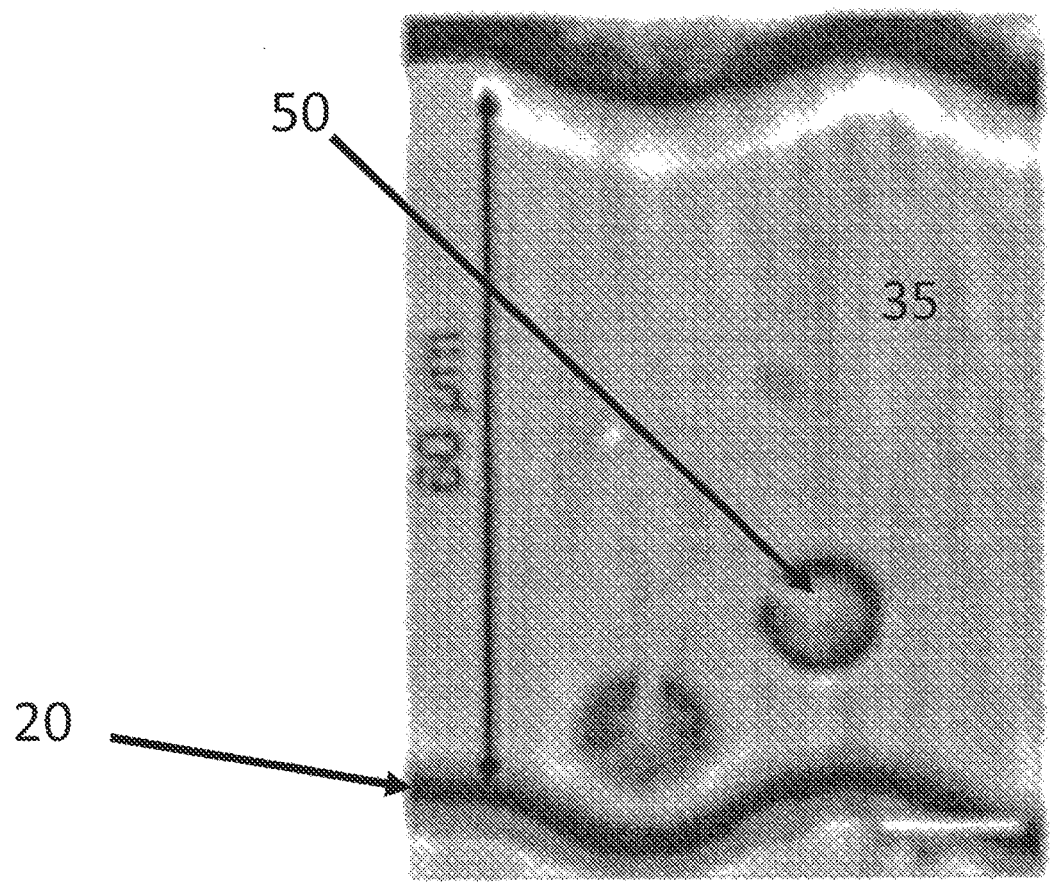
FIG. 5B provides an image of motion of a magnetic particle with a Saturn ring defect placed near a hill with wall-to-wall separation of 60 μm according to aspects of the present invention. (This separation is illustrative only, as the shortest wall-to-wall separation between walls can be, e.g., from about 10 to 100 micrometers, or from about 20 to 90 micrometers, or from about 30 to 80 micrometers, or from about 40 to about 70 micrometers, or even about 50 micrometers.)
Figure 5C:
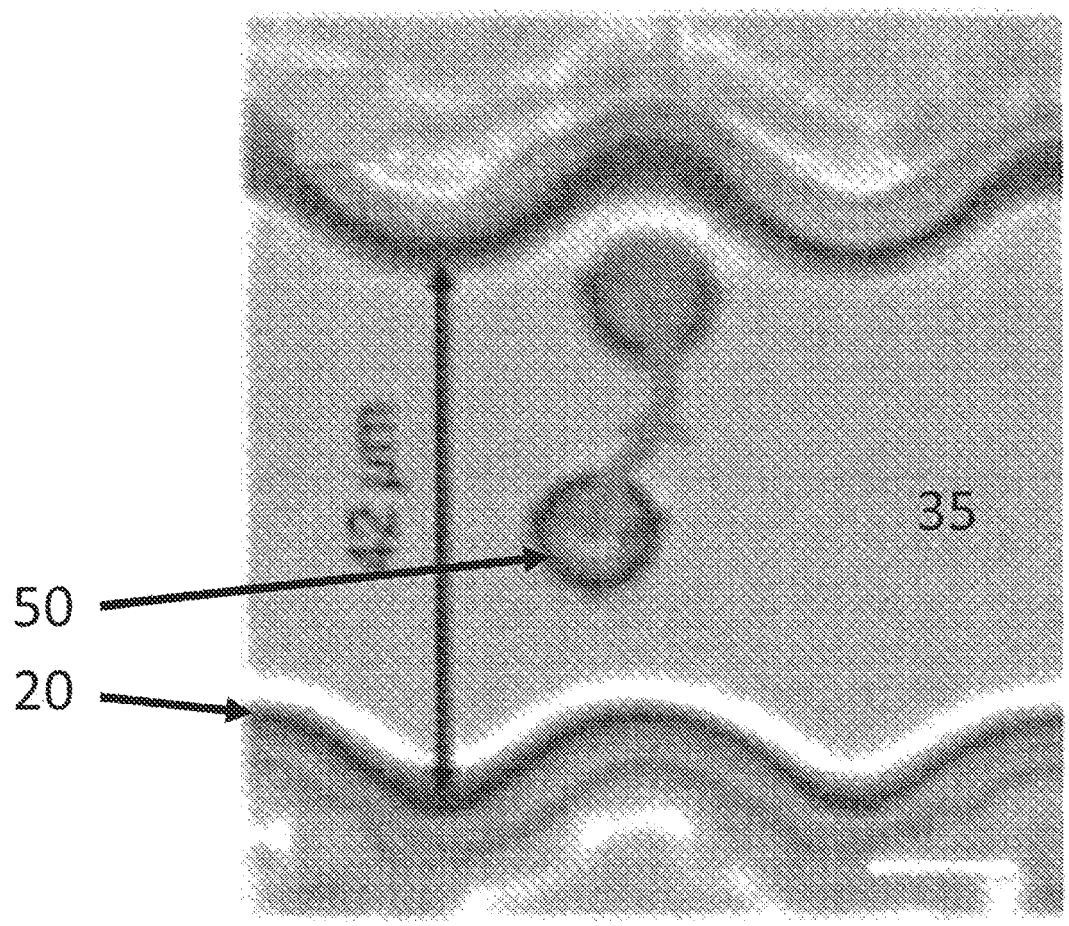
FIG. 5C provides an image of motion of a magnetic particle with a Saturn ring defect placed near a hill with wall-to-wall separation of 42 μm according to aspects of the present invention.

Aspects of this energy landscape were developed and exploited to control colloid motion. For example, metastable equilibria of colloids were exploited to induce gentle transformations of the colloids' 50 companion topological defects driven by the elastic fields (FIG. 4). Since topological defects can be sites for accumulation of nanoparticles and molecules, such transformations enable manipulation of hierarchical structures. Unstable loci to direct particle trajectories and to produce multistable systems were also created, with broad potential implications for reconfigurable systems and microrobotics (FIGS. 5A-5C).

Figure 6:
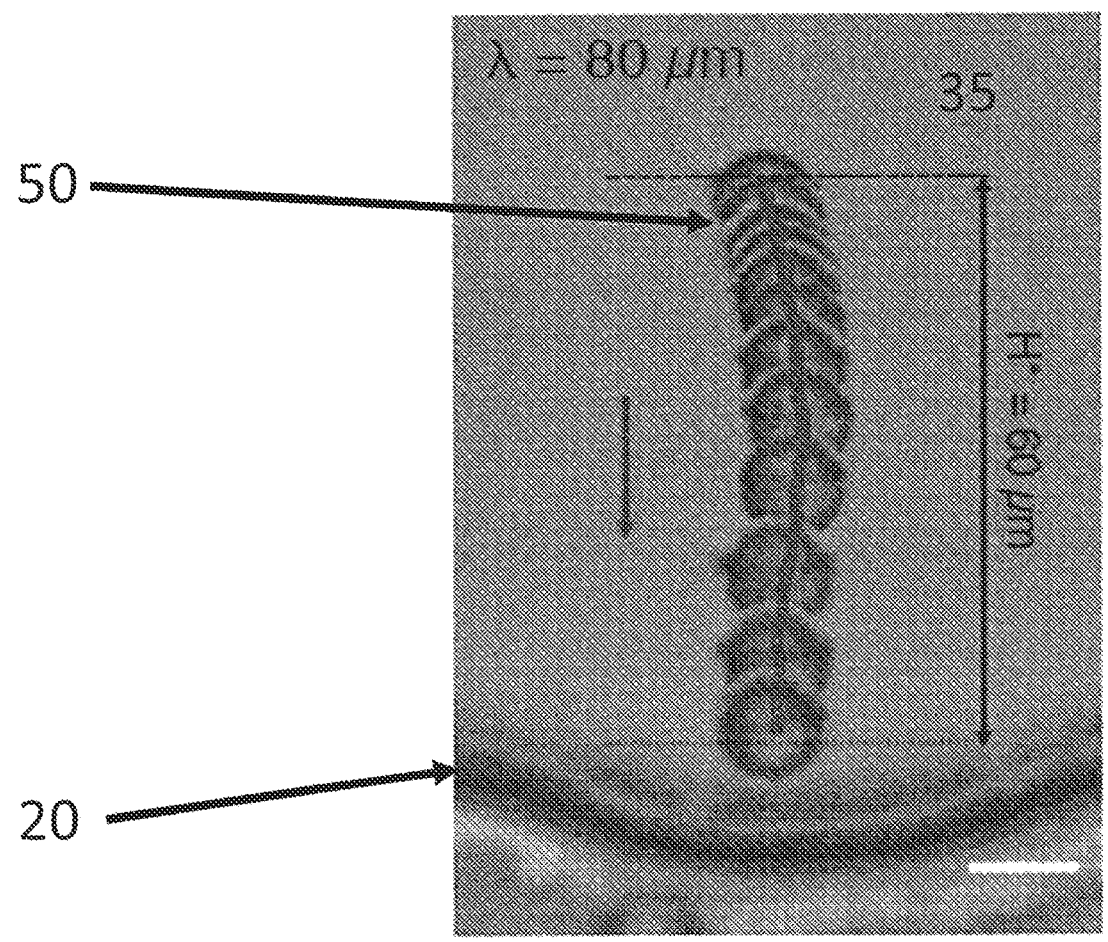
FIG. 6 provides an image of the range of interaction H* of the colloid with the wall according to aspects of the present invention.

To determine the range of interaction of a colloid with undulated walls of differing k, a magnetic field was used to move a ferromagnetic colloid (a=4.5 µm) to a position y far from the wall 20 and x corresponding to the center of the well. The magnet was rapidly withdrawn, and the colloid 50 was observed for a period of 2 min. If the colloid 50 failed to approach the wall 20 by distances comparable to the particle radius within this time, the colloid 50 was moved closer to the wall 20 in increments of roughly a particle radius until it began to approach the wall 20. The range of interaction H* was defined as the maximum distance from the wall 20 at which the colloid 50 starts moving under the influence of the wall 20 (FIG. 6).

In these experiments, the Saturn ring defect was sometimes pinned to the rough surface of the ferromagnetic particles. To eliminate this effect, these experiments were repeated with homeotropic magnetic droplets with a smooth interface. The results with the two systems were similar.

For Small $\lambda$ (i.e., $\lambda$< or ~40 µm), H* increases roughly linearly with $\lambda$. However, at larger $\lambda$, the range of interaction increases only weakly. A simple calculation for the director field near a wavy wall 20 in an unbounded medium in the one constant approximation and assuming small slopes predicts that the distortions from the wall 20 decay over distances comparable to $\lambda$. However, when $\lambda$, is much greater than T (thickness of the cell 300), confinement by the top and bottom slides truncates this range, giving rise to two regimes: one that complies with the linear trend and one that deviates from it. A similar shielding effect of confinement in a thin cell 300 was reported in the measurements of interparticle potential for colloids 50 in a sandwich cell 300.

To describe some aspects of the director field in the domain, the common simplification in nematic liquid crystal modeling known as the one-constant approximation was used: K1=K2=K3=K. If there is no bulk topological defect, then the director field is a solution to Laplace's equation, which can be solved by COMSOL separately for the two components $n_x$ and $n_z$, from which $n_y$ is obtained by the unit length restriction on n. The model solves the equivalent electrostatic problem of, which gives us $n_x$ and $n_z$. Customized geometry, such as the wavy wall, can be built with the geometry builder. The space was meshed with a triangular mesh, and the director field components were calculated; the results were then exported in grid form and post-processed in MATLAB.

The colloid 50 moves toward the wall 20 along a deterministic trajectory. Furthermore, it moves faster as it nears the wall 20, indicating steep local changes in the elastic energy landscape. This motion occurs in creeping flow. (Reynolds number, Re=$\rho$v$\alpha$/$\eta$ where $\rho$ and $\eta$ are the density and viscosity of 5CB, respectively). The energy dissipated to viscous drag along a trajectory U can be used to infer the total elastic energy change; this integration was performed and U was found to be approximately 5000 kBT.

In this calculation, the drag coefficient was corrected for proximity to the wavy wall 20 and for confinement between parallel plates 30. The dissipation calculation shows that gradients are weak far from the wall and steeper in the vicinity of the wall 20. The elastic energy profile found from the LdG simulation as a function of particle distance from the base of the well was consistent with these observations.

The particle 50 finds an equilibrium position in the well. At larger distances from the wall 20, the energy increases first steeply, and then tapers off. For wide wells ($\lambda$>15a), the energy gradient in x near the wall 20 is weak, and the drag is large. In this setting, the colloid 50 can find various trapped positions, and introduce error to energy calculation. Therefore, the trajectory is truncated at around y=15 µm from contact with the wall 20.

EXAMPLES

Energy landscape for versatile path planning:

In FIG. 1, a heat map of the elastic energy for a colloid 50 in the vicinity of the wall 20 as calculated by LdG simulation obtained by placing the center of mass (COM) of a colloid 50 at different locations of (x, y), with reference energy evaluated at ($\lambda$/2, $\lambda$). LdG numerical modeling was performed for a colloid 50 located at different locations between two identical wells. The vector field on this figure shows local elastic forces on the particle 50, obtained from the gradient in the elastic energy field. The solid curves indicate a few predicted trajectories for colloids 50 placed at different initial positions in the energy landscape. The spacing between COM locations was set to 2.5 times the simulation mesh size, corresponding to 11 nm. The rest of the simulation parameters were as follows, with lengths given in multiples of the simulation mesh size: Colloid radius a=12, corresponding to 54 nm; wavelength of the well $\lambda$=60, corresponding to 270 nm; amplitude A=6, corresponding to 27 nm, with well curvature radius R of roughly 22, corresponding to 98 nm. Thus, and adjacent grid points are separated by ~0.2a. The colloid surface imposes homeotropic anchoring of infinite strength. FIG. 3 depicts a schematic of the experimental setup (N denotes rubbing direction).

Figure 7:
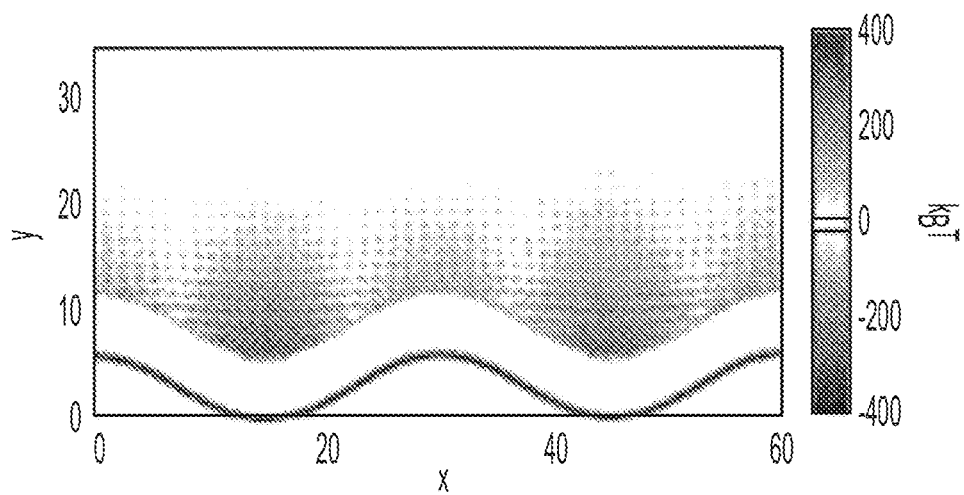
FIG. 7 provides a schematic of a smoothed energy field above a wavy wall extended by assuming symmetry and periodicity according to aspects of the present invention.

Assuming symmetry and periodicity, a smooth function g(x,y) can be applied over the entire space. By taking the gradient of this energy field g(x,y), the direction of the elastic force field experienced by the particle was obtained. This elastic force includes the distortion and defect sourced by a colloid 50 in the domain. Hills are repulsive, and wells are attractive in the case of a colloid 50 with homeotropic anchoring in a Saturn ring configuration (FIG. 7).

Transformation of quadrupole Saturn ring to dipole

In FIG. 4, time-lapse image of a Saturn ring transforming to a dipole at a metastable position remote from the wall 20 defined by the elastic energy field is depicted. Wells with a smooth boundary where R>a and amplitude A~a (specifically, 2A=15 µm and $\lambda$=60 µm or 2A=25 µm, and $\lambda$=100 µm) were used, and are best described as semicircle arcs with rounded corners.

These wider wells were exploited to position a colloid 50 with a companion Saturn ring several radii above the wall. The elastic energy field distorts the Saturn ring, and drives a gentle transition to a dipolar defect configuration, as shown in FIG. 4. The location of the colloid's 50 center of mass (COM) and the evolution of the polar angle of maximum deflection $\theta$ are tracked. This transition is not driven by hydrodynamics; the Ericksen number in this system is Er=$8 \times 10^{-4}$, a value two orders of magnitude lower than the critical Er=0.25 for a transition from quadrupole to dipole driven by flow.

Far from the wavy wall 20, the effect of the two parallel walls that confine the colloid is similar to that of an external electromagnetic field or to a weakening of the anchoring on the surface of the colloid 50, all of which make the Saturn ring configuration either stable or metastable. The wavy wall 20, however, exerts an asymmetrical elastic stress on the Saturn ring, displaces it away from that wall 20, and ultimately destabilizes this configuration. An experiment was performed wherein the Saturn ring was allowed to transition to a dipole near the wall, and then the elastic stress was rapidly removed by driving the particle away using a magnetic field. The dipole remained stable, which indicates that, under these experimental conditions, the dipole is the stable state and the Saturn ring is metastable. The polar angle θ and the director field can be considered "reaction coordinates" to characterize the transition between the Saturn ring state ($\theta=\pi/2$) and the dipolar state ($\theta=\pi$). It is assumed that the maximum of the energy barrier between these two states far from the wall is found at an intermediate angle θB. The elastic energy from the wall lowers the energy barrier to the transformation, allowing it to occur.

In this system, the Saturn ring is metastable, and the stabilization is provided by confinement from parallel glass, and destabilized by elastic stress from the wavy boundary. Further experiments indicate that it is possible to exert control over the transition by controlling the shape of the wells. In this case, deep wells of either 2A=15 μm or 2A=25 μm were made. Then the angle versus $t_c$-t was plotted, where $t_c$ is the time θ reaches π/2. The θ variations for 3 cases for wells of 2A=15 μm superpose. The dynamics are reproducible across samples of different sizes, even in the case where debris are collected by the topological defects on the way. In this system the motion is smooth and continuous as the colloid passes through the spatially varying director field. However, the velocity of the droplet decreases right after transition; this is attributed to the change in the drag environment.

In shallow wells (A<a) with small radii of curvature (R~a), the particle docks via a familiar lock-and-key mechanism. However, if the radius is large (R>a), the well exerts an elastic stress on the director field around the colloid 50 and the Saturn ring remains in the distorted state. The polar angle then ranges from θ=103° to 130° (maximum deflection). The energy barrier between the Saturn ring configuration and the dipolar configuration persists. However, at a critical angle $\theta_c$, the favorable energy from bend and splay matching eliminate the energy barrier between dipole and quadrupole, allowing completion of the quadrupole to dipole transition. This critical angle of transformation is relatively independent of the colloid size and mode of confinement, and found to be around θc=150° in the experiments. The initial dynamics of the quadrupole to dipole transition is slow, but as θ increases, so does dθ/dt.

In deeper wells (A>a), the polar angle increases as the colloid migrates into the well. LdG simulation reveals that, in the dipolar configuration, there is less distortion in the director field near the colloid owing to bend and splay matching, and that it is indeed more favorable for a colloid 50 with dipolar defect to locate deep within the well. The energy of a colloid 50 both far (State 1: y=5a, reference state) and near the wavy wall 20 for both Saturn ring and dipolar configurations (State 2: y=1.8a and y=1.5a, for Saturn ring and dipolar configuration, respectively) can be computed. Using identical parameters for the LdG numerics, a dipolar configuration can be stabilized by initializing the director field by the dipolar far-field ansatz. While colloids 50 in both configurations decrease their energy upon moving toward the wall 20 from State 1 to State 2, the decrease in energy is 2.9 times greater for the dipolar case. This change is determined by differences in the gradient free energy, corresponding to reduced distortion in the nematic director field.

The presence of the wavy wall 20 strongly alters the energy density at various regions. Due to limitations in computational power, colloids of this experimental scale cannot be modeled. This limits the simulations to settings in which the dipole is more energetically costly than the Saturn ring configuration. However, as the size of the simulation (a=90, 135, 180, 225, 270 nm) is increased, the energy difference between dipole and quadrupole decreases for colloids located at y=1.5a, suggesting that at larger system sizes, the dipole can become the stable configuration, in agreement with experiment. The energy difference ΔE ($=E_{dipole}-E_{Saturn\ ring}$) decreases going from y=5a to y=1.8a. When ΔE at y=5a agrees to within 1.15% with a simulation of colloids in a sandwich cell with no wavy wall, it serves as a valid reference state. Furthermore, the energy difference between a dipole and quadrupole configuration decreases as colloids move closer to the bottom of the well. These results show that the distortion field exerted by the wavy boundary can be considered as a gentle external field, in analogy to electrical, magnetic or flow fields.

Multiple Paths Diverging from Unstable Points p Unlike the location above a well, the location directly above a hill is an unstable point. When colloids are placed nearby using an external magnetic field, they can follow multiple diverging paths upon removal of the magnetic field. The particular paths followed by the colloid depend on small perturbations from the unstable point.

For example, amongst 28 such trials using an isolated homeotropic colloid with a Saturn ring, a colloid 50 moved along a curvilinear path to the well on its left 11 times, to the well on its right 10 times and was repelled away from the peak until it was approximately one wavelength away from the wall 7 times. These trajectories are also consistent with the heat map in FIG. 1, computed by taking a fixed step size in the direction of the local force as defined by the local energy gradient. The numerically calculated trajectories, and their extreme sensitivity to initial position, are in qualitative agreement with these experimental results. Thus, small perturbation in colloid location can be used to select among the multiple paths.

These features can be used to launch the colloid 50 from one location to another, propelled by the elastic energy field. To demonstrate this concept, two wavy walls 20 were arranged parallel to each other with the periodic structures in phase, i.e., the hills on one wall 20 faced valleys on the other (FIG. 5B).

For wall-to-wall separations more than 2λ, colloids 50 docked, as expected (FIG. 5B). For wall-to-wall separations less than 2λ, a colloid 50, placed with a magnetic field above the peak on one wall 20, was guided by the NLC elastic energy to dock in the valley on the opposite wall 20 (FIG. 5C), thus effectively extending its range of interaction with the second wall 20. In the context of microrobotics, such embedded force fields can be exploited to plan paths for particles to move from one configuration to another, guided by a combination of external magnetic fields and NLC-director field gradients.

Path-Planning for Colloids with Different Defect Structures

Figure 8A:
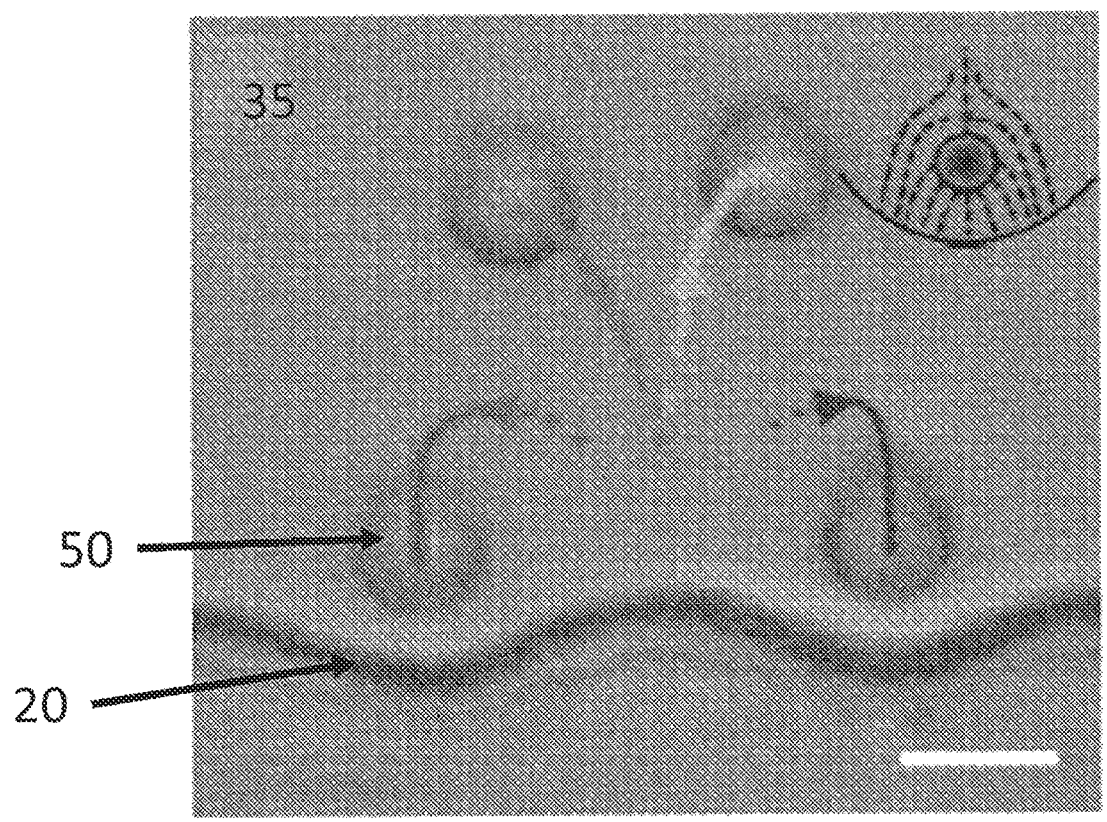
FIG. 8A provides an image of four representative trajectories (out of 12) of an upward-oriented dipole according to aspects of the present invention.
Figure 8B:
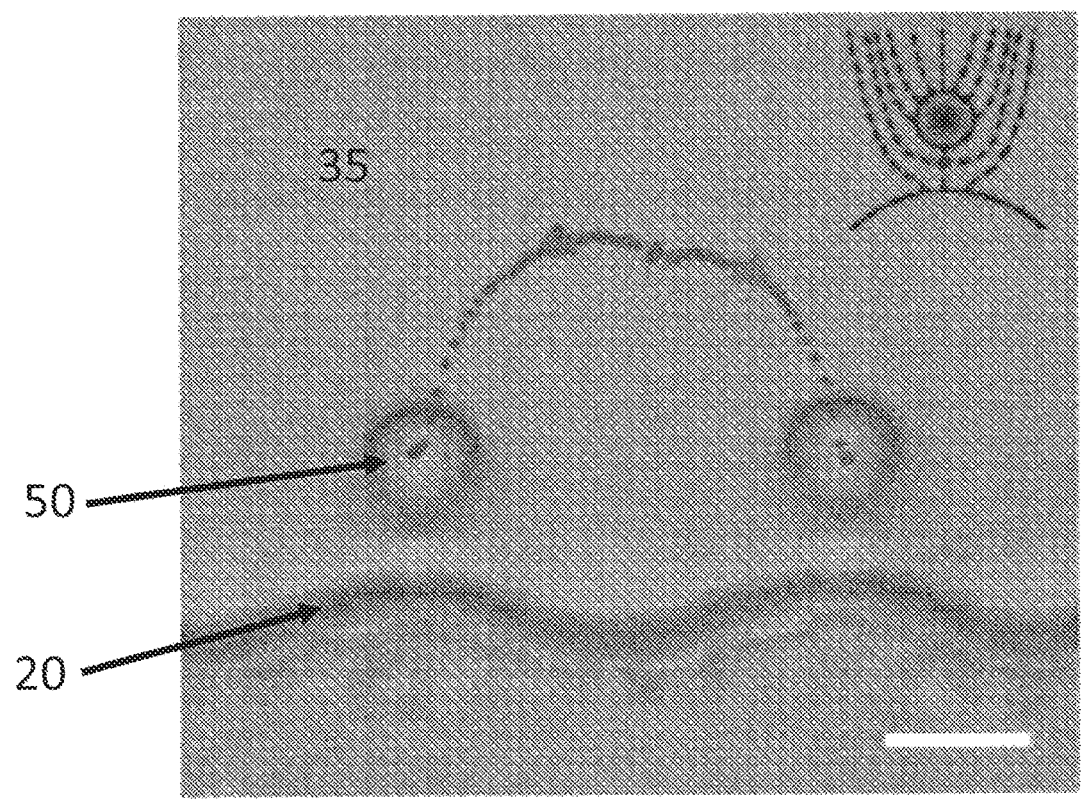
FIG. 8B provides an image of 2 representative trajectories (out of 11) of a downward-oriented dipole according to aspects of the present invention.

Unstable points and attractors for these particles can be tailored, and important differences can be found between the behavior of colloids attracted to wells and those attracted to hills. For example, a dipole pointing away from the wall 20 (FIG. 8A) behaves like a colloid 50 with companion Saturn rings in several ways. Both are attracted over a long range to equilibrate in wells, and both have unstable points above hills. Also, when released from this unstable point, both defect structures can travel in three distinct directions (left, right and away from the wall 20, FIG. 8A). On the other hand, dipoles pointing toward the wall 20 (FIG. 8B) behave differently. They are attracted to stable equilibria near hills, and are unstable near wells. Interestingly, when released from a point near a well, these colloids 50 can travel only toward one of the adjacent hills. That is, there is no trajectory above the well that drives them in straight paths away from the wall 20.

Figure 8C:
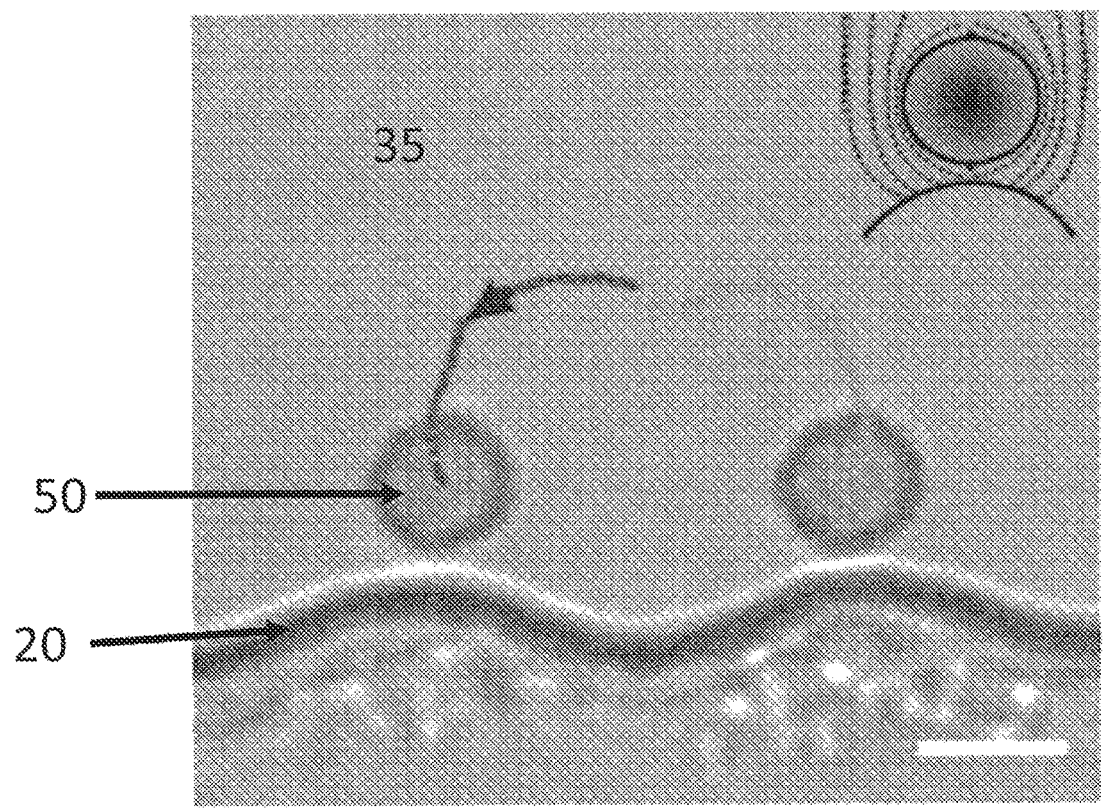
FIG. 8C provides an image of 2 representative trajectories (out of 14) of a planar-anchoring colloid with two boojums released between two neighboring wells according to aspects of the present invention.

Colloids 50 with planar anchoring form boojum structures behave similarly (FIG. 8C); they equilibrate near the hills, and follow only two sets of possible paths when released from unstable points above a well. The ability to drive particle motion with a gently undulating wall is thus not limited to colloids with companion Saturn rings; the wall 20 also directs the paths of dipolar colloids 50 with homeotropic anchoring and colloids 50 with planar anchoring, decorated with boojums. While colloids 50 with each defect structure have distinct equilibrium distances from a flat wall, the range of interactions follow similar trends as functions of $\lambda$. The range of interaction H* as a function of $\lambda$ is similar for homeotropic (H) and planar (P) anchoring, for hedgehog (DP) and Saturn ring (QP) defects, and for solid colloids and droplets.

These results indicate that the range of repulsion differs for hills and wells. This is likely related to the differences in the nematic director field near these boundaries. While converging splay field lines are sourced from the well, divergent splay field lines emanate from the hill. Both fields must merge with the oriented planar anchoring far from the wall 20. As a result, hills screen wells better than wells screen hills.

Figure 9A:
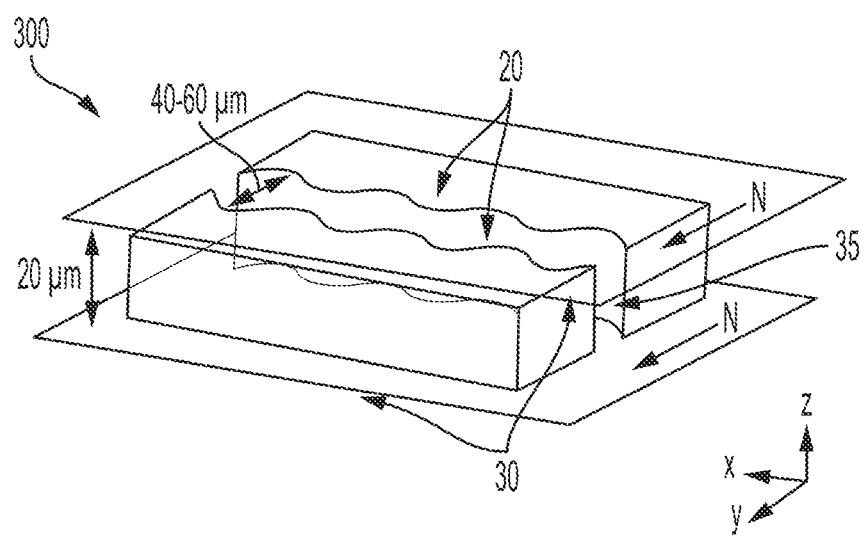
FIG. 9A provides a schematic of two out-of-phase parallel wavy walls with a gap comparable to λ between them according to aspects of the present invention.
Figure 9B:
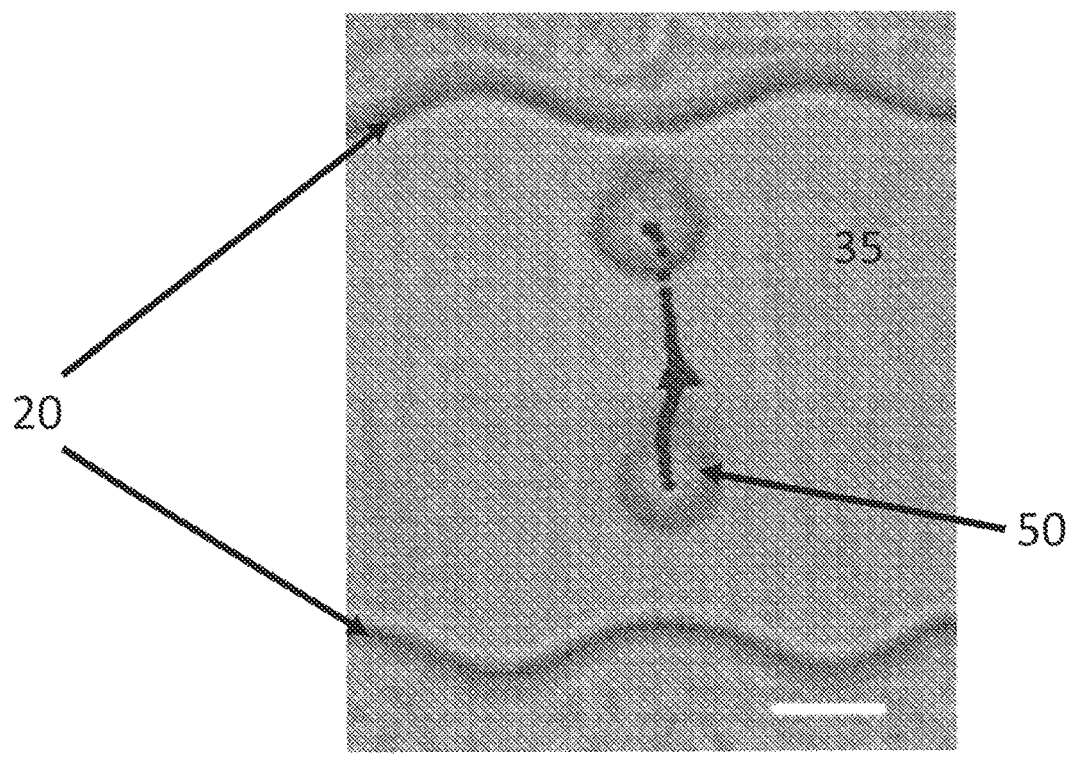
FIG. 9B provides an image of the movement of a dipole with point defect oriented upwards placed between two out-of-phase parallel wavy walls according to aspects of the present invention.
Figure 9C:
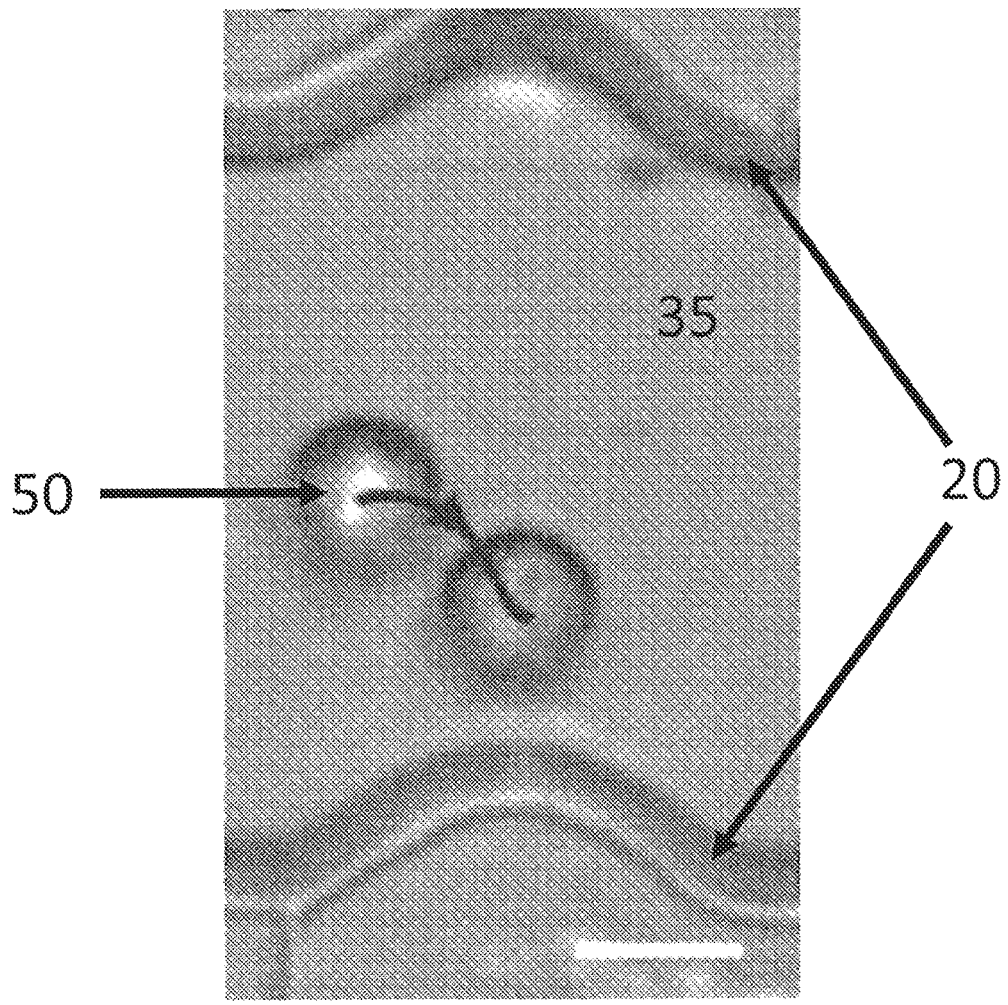
FIG. 9C provides an image of the movement of a dipole with point defect oriented downwards placed between two in-phase parallel wavy walls according to aspects of the present invention.
Figure 9D:
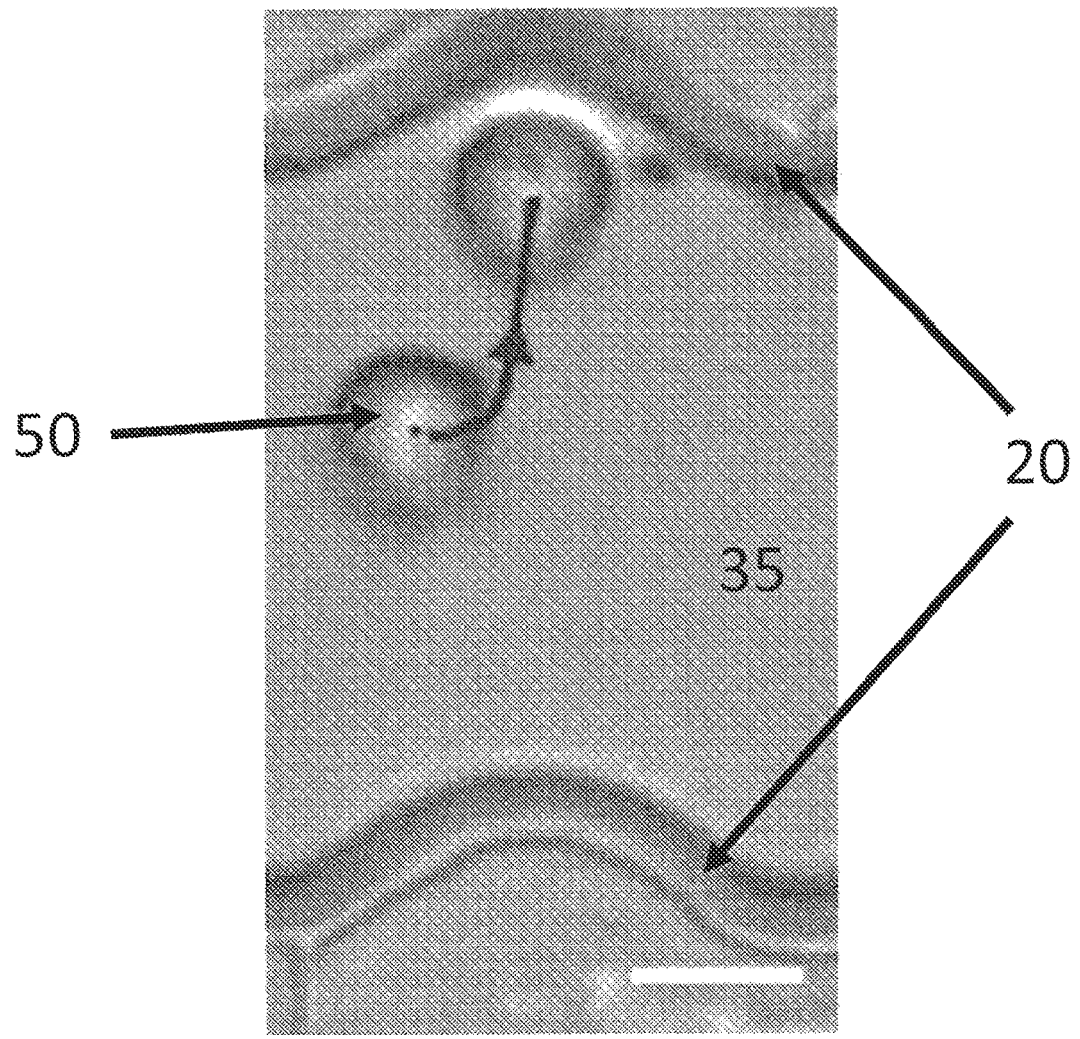
FIG. 9D provides an image of the movement of a dipole with point defect oriented downwards placed between two in-phase parallel wavy walls according to aspects of the present invention.

These wall-dipole interactions can be exploited to shuttle the colloid 50 between parallel walls. For walls 20 positioned with their wavy patterns out-of-phase (FIG. 9A-9B), dipoles with point defect oriented upwards are repelled from initial positions above hills on the lower wall 20 and dock on the hill on the opposite wall 20. However, for walls 20 with their patterns in phase, dipoles with defects oriented downwards released from an initial position above a well dock either at an adjacent hill on the same wall 20 (FIG. 9C), or in an attractive well on the opposite wall 20 (FIG. 9D).

FIG. 9A-9D depict schematics of two parallel walls 20 with a gap comparable to $\lambda$ between them. The waves of the wall 20 are either out of phase with hill to hill configuration such as in FIG. 9A-9B or in phase with hill to valley such as in FIG. 9C-9D. The scale bars are 10 µm.

Figure 10A:
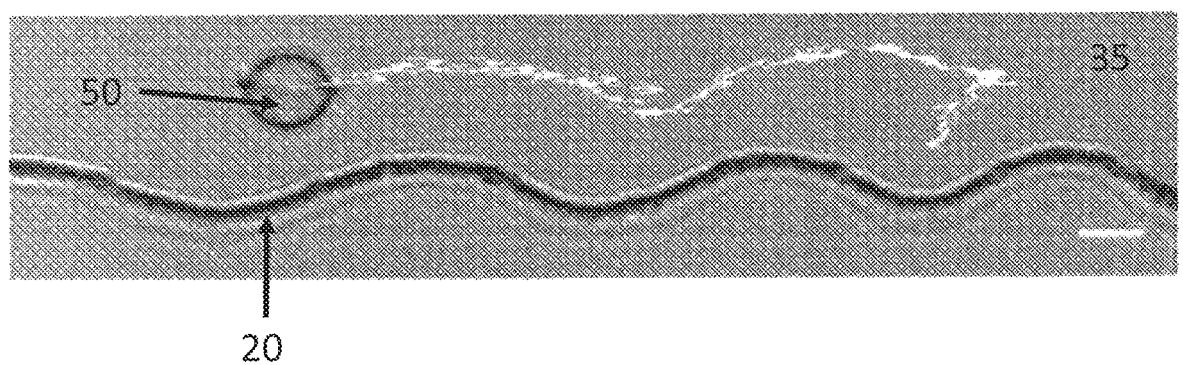
FIG. 10A provides an image of a particle under a biasing flow finding the lowest energy location and docking in a well along a wavy wall having wells of different wavelengths according to aspects of the present invention.

Particles moving in weak flow can select preferred docking sites along the wavy wall 20. Wells of different wavelengths create energy gradients that decay at distinct rates. Placing wells of different wavelength adjacent to each other offers additional opportunities for path planning. In one setting, a colloid 50 can sample multiple wells of varying sizes under a background flow in the x direction (FIG. 10A). The outcome of whether the colloid 50 docks or continues to be advected is determined by a balance between viscous forces that drive x-directed motion and attractive and repulsive interactions with the wall. The length of the arrow is proportional to the instantaneous velocity. The scale bar is 10 µm.

Figure 10B:
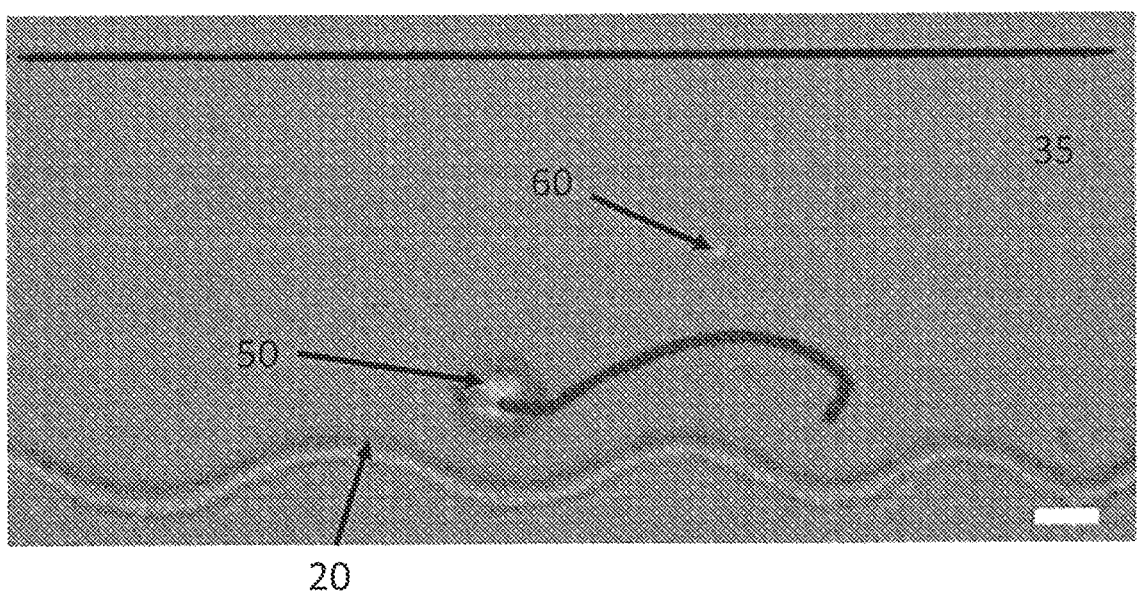
FIG. 10B provides an image of a colloid under a biasing flow sampling two wells of a wavy wall having wells of different wavelengths while a tracer particle indicates the velocity of the background flow according to aspects of the present invention.

In a separate experiment, tracer particles 60 were placed in the background while a sampling/docking event takes place (FIG. 10B). The tracer particle 60 travels along a straight path while the colloid 50 near the wall 20 follows a more complex trajectory, eventually docking in a well that is "just right". The complexity of the colloid's path confirms that the elastic energy field plays an important role in guiding the motion of the colloid 50 to its preferred well. A particle finds the lowest energy locations under a biasing flow, ending in the well that best matches its curvature. Such interactions provide interesting avenues, e.g., approaches in which the rates of motion owing to elastic forces and those owing to applied flows are tuned, and the trapping energy of the docking sites are tailored, e.g., for colloidal capture and release.

Additional Disclosure

The ability to dictate the motion of microscopic objects is an important challenge in fields ranging from materials science to biology. Field-directed assembly drives microparticles along paths defined by energy gradients. Nematic liquid crystals, consisting of rod-like molecules, provide new opportunities in this domain. Deviations of nematic liquid crystal molecules from uniform orientation cost elastic energy, and such deviations can be molded by bounding vessel shape.

Here, by placing a wavy wall in a nematic liquid crystal, we impose alternating splay and bend distortions, and define a smoothly varying elastic energy field. A microparticle in this field displays a rich set of behaviors, as this system has multiple stable states, repulsive and attractive loci, and interaction strengths that can be tuned to allow reconfigurable states. Microparticles can transition between defect configurations, move along distinct paths, and select sites for preferred docking. Such tailored landscapes are useful in microrobotics applications.

The study of colloidal interactions has led to the discovery of new physics and has fueled the design of functional materials. External applied fields provide important additional degrees of freedom, and allow microparticles to be moved along energy gradients with exquisite control. In this context, nematic liquid crystals (NLCs) provide unique opportunities.

Within these fluids, rod-like molecules co-orient, defining the nematic director field. Gradients in the director field are energetically costly; by deliberately imposing such gradients, elastic energy fields can be defined to control colloid motion. Since NLCs are sensitive to the anchoring conditions on bounding surfaces, reorient in electro-magnetic fields, have temperature-dependent elastic constants[5] and can be reoriented under illumination using optically active dopants, such energy landscapes can be imposed and reconfigured by a number of routes.

Geometry, topology, confinement, and surface anchoring provide versatile means to craft elastic energy landscapes and dictate colloid interactions. This well-known behavior implies that strategies to dictate colloidal physics developed in these systems are robust and broadly applicable to any material with similar surface anchoring and shape. Furthermore, the ability to control the types of topological defects that accompany colloidal particles provides access to significantly different equilibrium states in the same system. Thus, the structure of the colloid and its companion defect dictate the range and form of their interactions.

By tailoring bounding vessel shape and NLC orientation at surfaces, one can define elastic fields to direct colloid assembly. The elastic energy landscapes obtainable with a wavy wall provide important opportunities to direct colloidal motion that go far beyond near-wall lock-and-key interaction.

In this system, elastic energy gradients are defined in a nonsingular director field by the wavelength and amplitude of the wavy structure, allowing long ranged wall-colloid interactions. Colloids can be placed at equilibrium sites far from the wall that can be tuned by varying wall curvature.

Unstable loci, embedded in the elastic energy landscape, can repel colloids and drive them along multiple paths. In this work, we develop and exploit aspects of this energy landscape to control colloid motion by designing the appropriate boundary conditions.

For example, we exploit metastable equilibria of colloids to induce gentle transformations of the colloids' companion topological defects driven by the elastic fields. Since topological defects are sites for accumulation of nanoparticles and molecules, such transformations enable manipulation of hierarchical structures. We also create unstable loci to direct particle trajectories and to produce multistable systems, with broad potential implications for reconfigurable systems and microrobotics. Finally, we combine the effects of the NLC elastic energy field and of an external field (gravity) to demonstrate fine-tuning of the particles' sensitivity to the size of their docking sites.

Results

Molding the energy landscape.

Figure 11A:
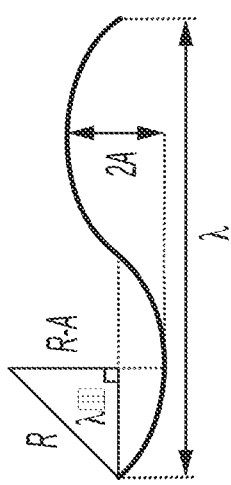
FIGS. 11A-11D provides a schematic of an experiment, with (a) a schematic of the wall shape with relevant parameters: radius of curvature R, amplitude A, and wavelength λ.
Figure 11B:
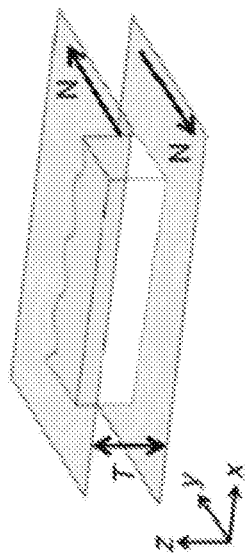

To mold the elastic energy landscape near a curved boundary with geometrical parameters defined in FIG. 11A, we fabricate long, epoxy resin strips using standard lithographic techniques to form wavy structures (FIG. 11B). These structures are placed between two parallel glass slides, separated by distance T, with planar anchoring oriented perpendicular to the strip to form a cell within which the NLC is contained.

Figure 11C:
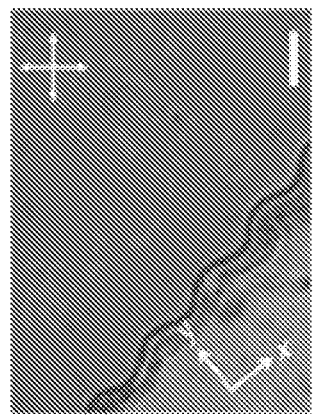
Figure 11D:
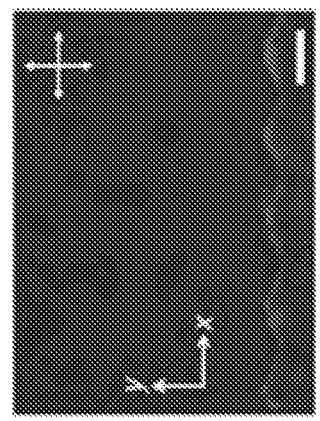

This cell is filled by capillarity with a suspension of colloids in the NLC 4-cyano-4'-pentylbiphenyl (5CB) in the isotropic phase, and subsequently quenched into the nematic phase (TNT,=34.9° C.). The alignment of a colloid-free cell is examined under crossed polarizers (FIG. 11C, 11D), which shows that the bulk liquid crystal is defect-free. The much brighter texture at 45°-135° (FIG. 11C) compared to the 0°-90° (FIG. 11D) also shows good planar alignment along they direction. The defects visible in FIG. 11C, 11D are only in the thin NLC film squeezed between the top of the wavy wall and the confining glass, a region which is not accessible to the colloids.

Colloid migration in the cells is observed with an optical microscope from a bird's-eye view. For the larger colloids, as expected, strong confinement between the glass slides stabilizes the Saturn ring configuration, with a disclination line encircling the colloid. Smaller colloids, which experience weaker confinement, adopt the dipolar structure where a colloid is accompanied by a topological point-like defect often called a hedgehog. Particles are equally repelled by elastic interactions with the top and bottom glass slides, whose strength dominates over the particles' weight, so gravity plays a negligible role in our system when the z axis of our experimental cell is vertical. When observed through the microscope, this configuration forms a quasi-2D system in the (x,y) plane, where y is the distance from the base of a well in the direction perpendicular to the wall. Unless otherwise specified, when reporting colloid position, y denotes the location of the colloid's center of mass (COM).

The wavy wall forms a series of hills and wells, with amplitude 2A measured from the base of the well to the highest point on a hill. Because of strong homeotropic anchoring at the wavy wall, these features impose zones of splay and bend in this domain. In particular, the valleys are sites of converging splay, the hills are sites of diverging splay, and the inflection points are sites of maximum bend. The wavelength of the structure $\lambda$ can be expressed in terms of the radius of curvature R and the amplitude A:

$$\lambda = 4R\sqrt{\frac{A}{R}\left(2 - \frac{A}{R}\right)}$$

(FIG. 11A). Therefore, $\lambda$ and R are not independent for fixed A. Different aspects of the colloid-wall interaction are best described in terms of one or the other. For example, the range of the distortion is discussed in terms of $\lambda$, and the splay field near the well is described in terms of R. Throughout the exemplary study, unless specified otherwise, 2A=10 μm. $\lambda$/a for a given system can be, e.g., from about 0.001 to about 20, or from about 5 to about 20, or even from about 5 to about 15.

The gentle undulations of this wall deform the surrounding director field, but do not seed defect structures into the NLC. We demonstrate control over colloidal motion within the energy landscape near this wall. In addition, we use Landau-de Gennes (LdG) simulation of the liquid crystal orientation.

Attraction to the Wall

To determine the range of interaction of a colloid with undulated walls of differing $\lambda$, a magnetic field is used to move a ferromagnetic colloid (radius a=4.5 μm) to a position y far from the wall and x corresponding to the center of the well. The magnet is rapidly withdrawn, and the colloid is observed for a period of 2 min. If the colloid fails to approach the wall by distances comparable to the particle radius within this time, the colloid is moved closer to the wall in increments of roughly a particle radius until it begins to approach the wall.

Figure 12B:
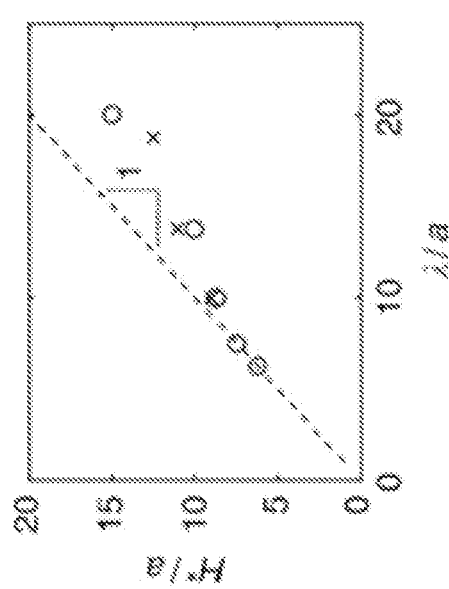
FIGS. 12A-12C illustrates colloid-wall interaction range vs. wavelength λ. A ferromagnetic homeotropic colloid with a Saturn ring defect is used to establish the range of interaction H* of the colloid with the wall.
Figure 12C:
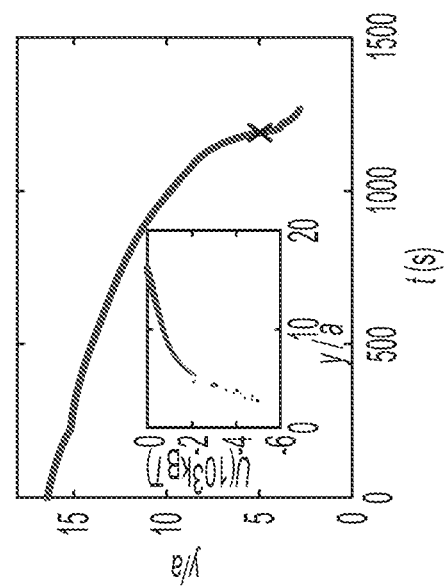

We define the range of interaction H* as the maximum distance from the base of the well at which the colloid starts moving under the influence of the wall (FIG. 12). In these experiments, the Saturn ring defect was sometimes pinned to the rough surface of the ferromagnetic particles. To eliminate this effect, these experiments were repeated with homeotropic magnetic droplets with a smooth interface whose fabrication is described elsewhere herein, and the results did not change.

Figure 12A:
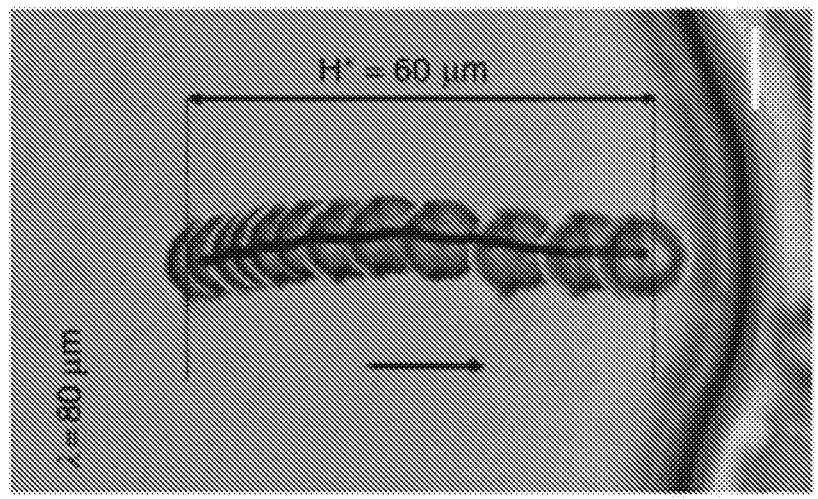

A typical trajectory is shown in FIG. 12A in equal time step images ($\Delta t=125$ s). For small $\lambda$ (i.e., $\lambda \leq 40$ pm), H* increases roughly linearly with $\lambda$. However, at larger $\lambda$, the range of interaction increases only weakly. A simple calculation for the director field near a wavy wall in an unbounded medium in the one elastic constant approximation and assuming small slopes predicts that the distortions from the wall decay over distances comparable to $\lambda$. However, for $\lambda$ much greater than the thickness of the cell T, confinement by the top and bottom slides truncates this range (see FIG. 19), giving rise to the two regimes reported in FIG. 12B: one that complies with the linear trend and one that deviates from it.

The colloid moves toward the wall along a deterministic trajectory. Furthermore, it moves faster as it nears the wall (FIG. 12C), indicating steep local changes in the elastic energy landscape. This motion occurs in creeping flow (Reynolds number Re=pva/η=1.15×10$^{-8}$, where p and n are the density and viscosity of 5CB, respectively, and v is the magnitude of the velocity of the colloid). The energy U dissipated to viscous drag along a trajectory can be used to infer the total elastic energy change; we perform this integration and find U ~5000 $k_B$T. In this calculation, we correct the drag coefficient for proximity to the wavy wall and for confinement between parallel plates. The dissipation calculation shows that gradients are weak far from the wall and steeper in the vicinity of the wall.

Figure 20:
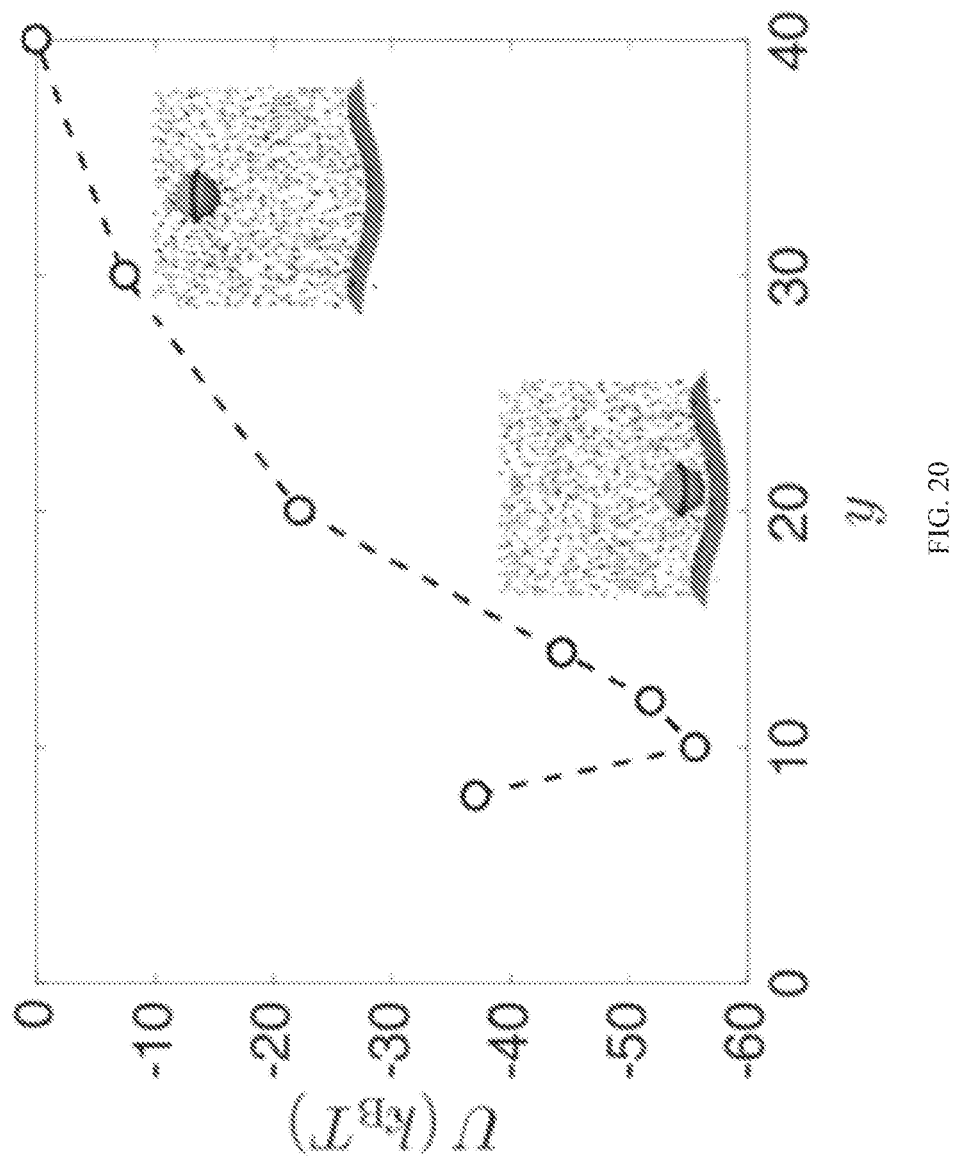
FIG. 20 shows potential energy by Landau de Gennes (LdG) simulation. The energy of a colloid with Saturn ring defect is simulated by placing it at different distances above a well with normalized radius R/a=7, and normalized wavelength R/a=8.5, where a is the radius of the colloid.

The elastic energy profile found from LdG simulation as a function of particle distance from the base of the well is consistent with these observations (FIG. 20). The particle finds an equilibrium position in the well. At larger distances from the wall, the energy increases first steeply, and then levels off (FIG. 20). For wide wells ($\lambda$>15a), the energy gradient in x near the wall is weak, and the drag is large. In this setting, the colloid can find various trapped positions, and introduce error to the energy calculation. Therefore, the trajectory is truncated at around y=15 µm from contact with the wall.

Figure 13A:
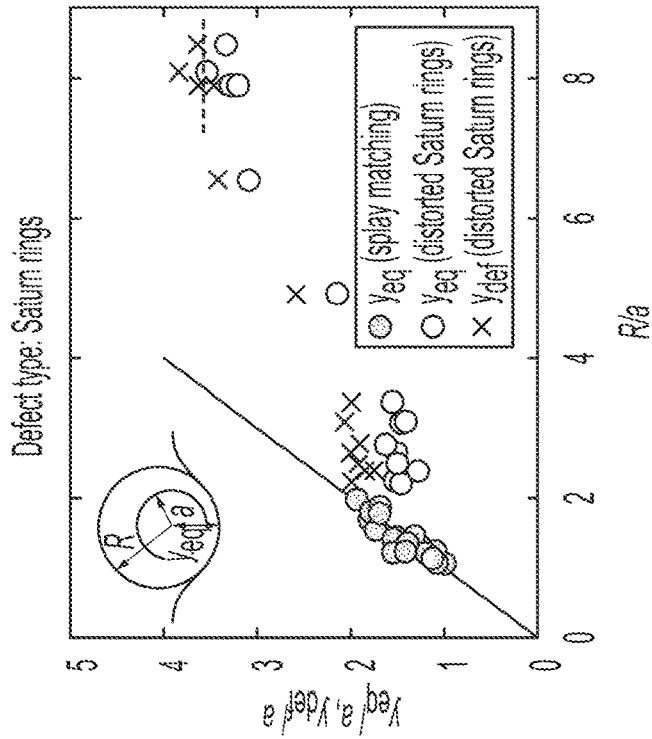
FIGS. 13A-13H illustrates particle-wavy wall interactions mechanisms. $y_{eq}$ and $y_{def}$ measure the equilibrium distance relative to the bottom of the wells of the wavy wall for the COM of the colloid and the defect.
Figure 13B:
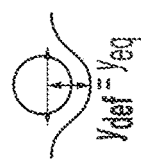

Equilibrium position. The wall shape also determines the colloid's equilibrium position $y_{eq}$, i.e., the distance between the colloid's COM and the bottom of the well. In fact, we show that the particles do not always dock very close to the wall. Rather, they find stable equilibrium positions at well-defined distances from contact with the hills and wells. We probe this phenomenon by varying colloid radius a and well radius of curvature R (FIG. 13A). At equilibrium, $y_{eq}$ is equal to R. That is, the colloid is located at the center of curvature of the well (FIG. 13B, 13C). In this location, the splay of the NLC director field from the colloid matches smoothly to the splay sourced by the circular arc that defines the well. As R increases, this splay matching requirement moves the equilibrium position of the colloid progressively away from the wall.

Figure 13D:
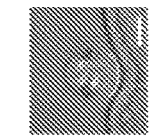
Figure 13C:
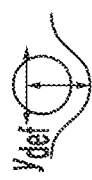
Figure 13E:
Figure 13G:
Figure 13H:
Figure 13F:
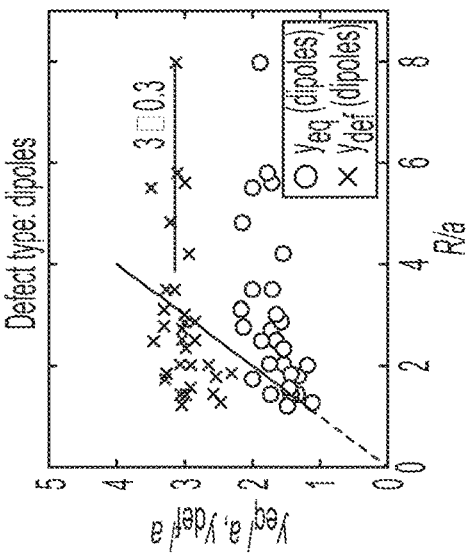
Figure 21C:
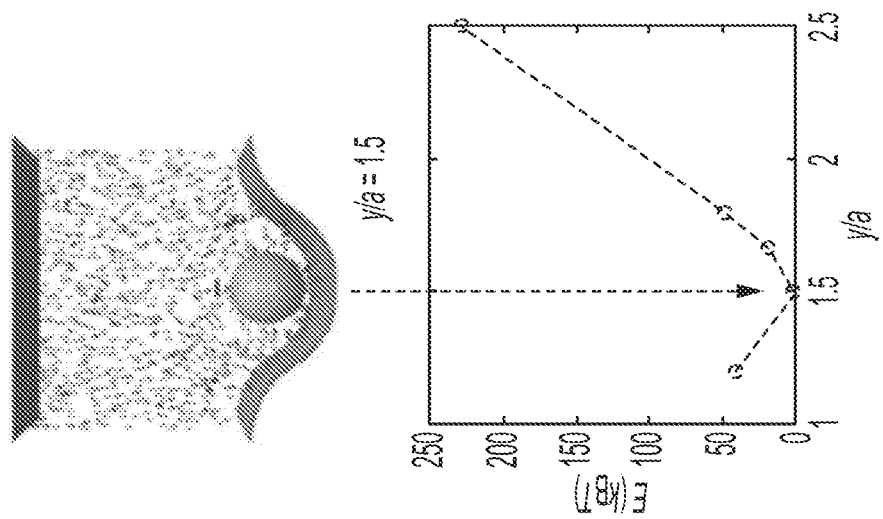
FIG. 21A-21C shows energy of the quadrupole and dipole in wells.
Figure 21B:
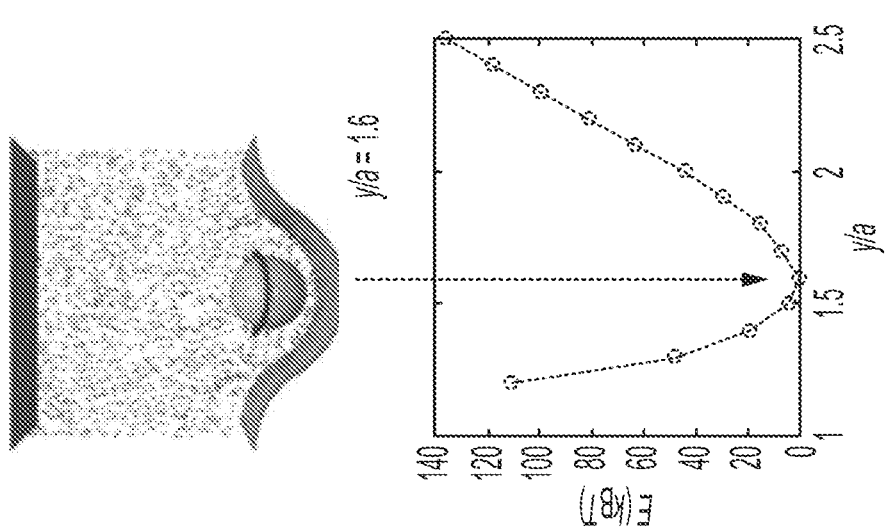

However, for wide wells with R>>2a, the elastic energy from the wall distorts the Saturn ring, displacing it away from the wall (FIG. 13D, 13E). When this occurs, the equilibrium position of the colloid is closer to the wall. For all such colloids, the height of Saturn rings (FIG. 13A crosses: $y=y_{def}$) and that of the COM of the particles (FIG. 13A open circles: $y=y_{eq}$) do not coincide. Specifically, the particle moves closer to the wall, and the disclination line becomes distorted, i.e., the Saturn ring moves upward from the equator of the particle so that the particle-defect pairs become more dipole-like (FIG. 13G, 13H). For comparison, we plot the COM of particles with point defects sitting near the wall (FIG. 13T). We observe that, when the colloid radius is similar to the radius of the wall (R/a≈2), there is a similar "splay-matching" zone for the dipoles; however, as we increase R/a, the behavior changes. In this regime, the dipole remains suspended with its hedgehog defect at a distance of roughly $y_{def}/a=3$ from the base of the well for wells of all sizes. The equilibrium distance of particles with distorted Saturn rings (FIG. 13A open circles) is intermediate between equilibria for particles with undistorted Saturn rings and colloids in dipolar configurations with point defects. LdG simulation corroborates the finding that dipoles and quadrupoles equilibrate at different distances from the wall, and that the particles with point defects sit deeper in the well than those with Saturn ring (FIG. 21).

A colloid positioned directly above a well moves down the steepest energy gradient, which corresponds to a straight path toward the wall. The energy minimum is found when the particle is at a height determined by R/a, consistent with our experiments (FIG. 13B). We also note that at R/a=7, we find $y_{COM}/a=3.5$, which corresponds to the equilibrium distance of colloids repelled from a flat wall. However, even at these wide radii, the elastic energy landscape above the undulated wall differs significantly from the repulsive potential above a planar boundary, which decays monotonically with distance from the wall.

For colloids above the wide wells, energy gradients in they direction are small, but gradients in the x direction are not. As a result, particles migrate laterally and position themselves above the center of the wells. We have postulated and confirmed the splay matching mechanism to be the driving force of the colloid docking. We expect that by using a liquid crystal that has different elastic constants, we can enhance or suppress this effect. For example, for a LC with $K_{11}$>$K_{33}$, the colloids will preferentially sit closer to the wall to favor bend distortion over splay.

Quadrupole to Dipole Transition

For micron-sized colloids in an unbounded medium, the dipole is typically the lowest energy state; electrical fields, magnetic fields or spatial confinement can stabilize the Saturn ring configuration. In prior research, we showed that a colloid with a Saturn ring defect, stabilized by confinement far from the wavy wall, became unstable and transformed into a dipolar structure near the wavy wall. However, in those experiments, the transformation occurred very near the wall, where the dynamics of the colloid and surrounding liquid crystal were strongly influenced by the details of wall-particle hydrodynamic interactions and near-wall artifacts in the director field. Here, to avoid these artifacts, we use wells with a smooth boundary where R>a and amplitude A>a (specifically, A=R=15 µm and A=60 µm, or A=R=25 µm and $\lambda$=100 µm). These wells are deeper and are best described as semicircular arcs with rounded corners.

We exploit these wider wells to position a colloid with a companion Saturn ring several radii above the wall. The elastic energy field distorts the Saturn ring, and drives a gentle transition to a dipolar defect configuration, as shown in FIG. 14A in time lapsed images. The location of the colloid y and the evolution of the polar angle of maximum deflection $\theta$ are tracked and reported in FIG. 14B. This transition is not driven by hydrodynamics; the Ericksen number in this system is Er $8\times10^{-4}$, a value two orders of magnitude lower than the critical value Er=0.25 at which a flow-driven transition from quadrupole to dipole occurs[35].

The confinement from the top and bottom glass stabilizes the Saturn ring. The wavy wall, however, exerts an asymmetrical elastic energy gradient on the Saturn ring, displaces it away from that wall, and ultimately destabilizes this configuration. Once the transition to dipole has taken place, re-positioning the particle away from the wall with a magnetic field does not restore the Saturn ring.

Other studied the transition of a colloid with a Saturn ring defect to a dipolar configuration in an unbounded medium, prompted by the fast removal of the stabilizing electric field. Although these two sets of experiments take place in very different physical systems (confined vs. unconfined, withdrawal of an electric field vs. an applied stress field via boundary curvature), the slow initial dynamics and the total time of transition are common features shared by both (FIG. 14C, 14D).

Figure 22B:
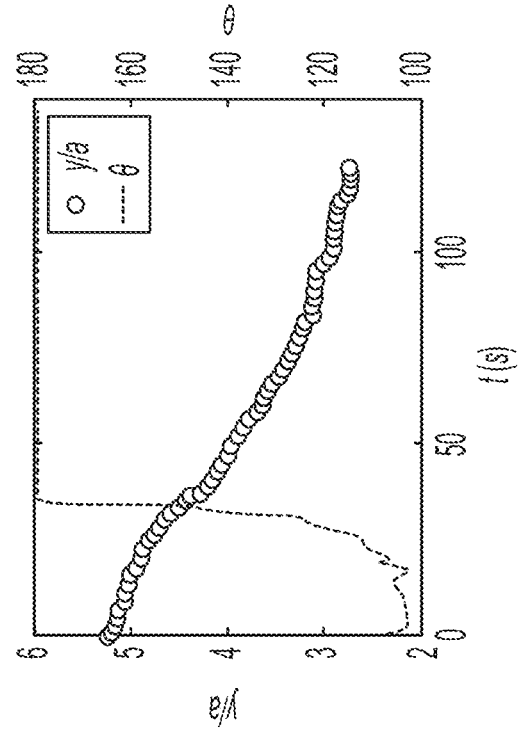
FIG. 22A-22D shows quadrupole to dipole transition dynamics.
Figure 22D:
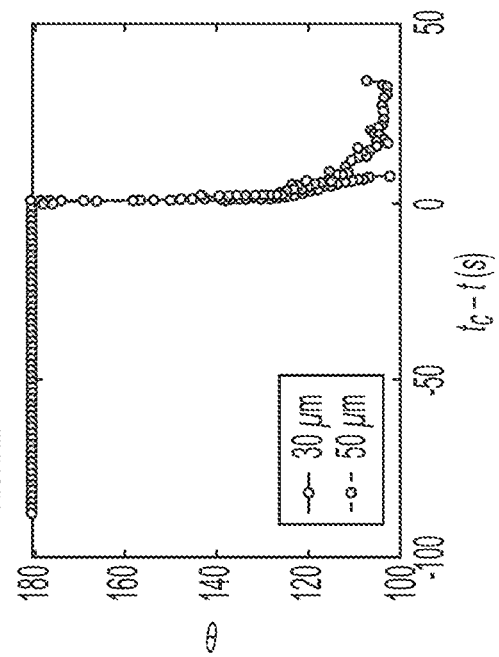
Figure 22A:
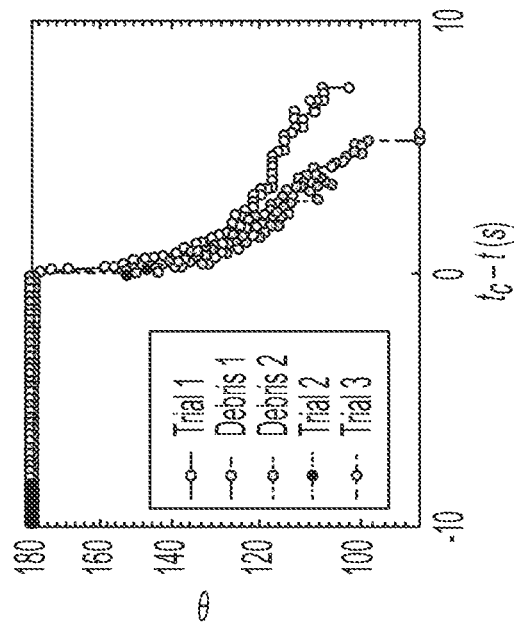
Figure 22C:
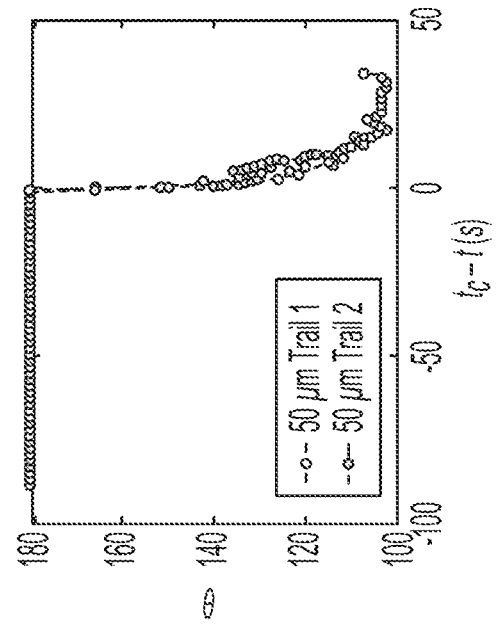

The dynamics of the transition are reproducible across particles of different sizes (FIG. 14E), and across additional runs with different sized walls (FIG. 22), and even in the case where debris is collected by the topological defects on the way. In our system, the motion is smooth and continuous as the colloid passes through the spatially varying director field. Furthermore, the velocity of the droplet decreases right after transition; we attribute this, in part, to the change in the drag environment (FIG. 14B and FIG. 22B).

There are cases in which the transition does not occur; rather, the Saturn ring remains distorted. In such cases the polar angle then ranges from $\theta$=103° to 130°. For polar angles larger than 130°, the transition always occurs, indicating that this is the critical angle for the transition.

Quadrupoles and Dipoles in Simulation

In deeper wells (A>a), the polar angle increases as the colloid migrates into the well. LdG simulation reveals that, in the dipolar configuration, there is less distortion in the director field near the colloid owing to bend and splay matching, and that it is indeed more favorable for a colloid with dipolar defect to be located deep within the well (FIG. 15A-15D). In simulation, we compute the energy of a colloid both far (state 1:y=5a, reference state) and near the wavy wall (FIG. 15A-15D) to locate the equilibrium site for both the Saturn ring and dipolar configurations (state 2: y=1.8a and y=1.5a, for Saturn ring and dipolar configuration, respectively). Using the same geometrical parameters and anchoring strength for the LdG numerics, we stabilize a dipolar configuration by initializing the director field by the dipolar far-field ansatz[35]. While colloids in both configurations decrease their energy by moving from state 1 to state 2, the decrease in energy is 2.9 times greater for the dipolar case (FIG. 15C, 15D). This change is determined by differences in the gradient free energy, corresponding to reduced distortion in the nematic director field.

Some have argued that the stabilization of a Saturn ring under confinement occurs when the region of distortion becomes comparable to or smaller than that of a dipole, assuming the same defect energy and energy density. Yet this argument does not apply here because the presence of the wavy wall strongly alters the energy density at various regions in the domain (FIG. 15A-15D).

Figure 23:
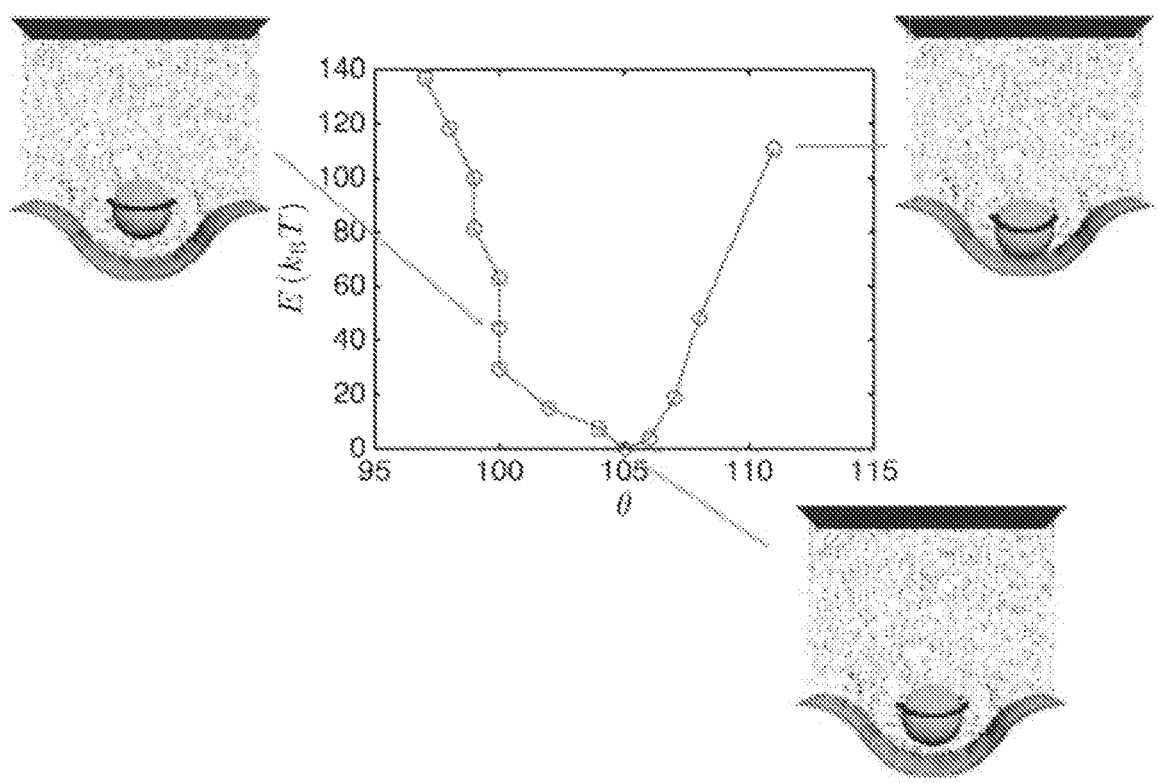
FIG. 23 shows a simulation of total energy of the system E versus the reaction coordinate θ. The reaction coordinate denotes the polar angle of the Saturn ring. Snapshot of the equilibrium simulation is attached where the particle is located at various distances from the well. The particle has minimum energy when it is located at the equilibrium position. The reference energy is that of particle at equilibrium position.

Since this reorganization occurs in creeping flow and at negligible Erickson number, it occurs in quasi-equilibrium along the reaction coordinate. In principle, this suggests that insight can be gained into the transition energy between the two states by simulating the equilibrium value for $\theta$ and the corresponding system energy E for a colloid Saturn ring configuration at various fixed heights above the wall. We can consider the polar angle $\theta$ and the director field as our "reaction coordinate" to characterize the transition between the Saturn ring state ($\theta=90°$) and the dipolar state ($\theta=180°$). As shown schematically in FIG. 15E, an energy barrier exists between these two states far from the wall. Direct calculations of system energy E vs. $\theta$ for small colloids with stable Saturn rings simply show an energy minimum and an equilibrium ring displacement at their equilibrium height above the well (FIG. 23).

We can compare the system energy for quadrupolar and dipolar configurations by computing $\Delta E = E_{dipole} - E_{Saturn\ ring}$ (FIG. 15F, FIG. 24). This quantity is always positive for colloidal radii accessible in simulation. By moving closer to the wall, however, $\Delta E$ decreases (FIG. 15A-15D, 15F).

Figure 24A:
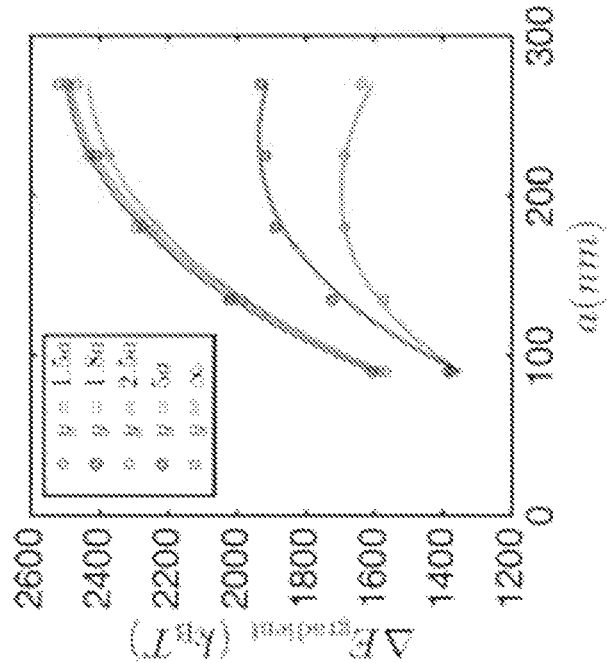
FIG. 24A-24B provides simulation energy scaling. The energy of the simulation consists of two parts, the phase free energy ($\Delta E_{phase}$, associated with the defect) and the difference in gradient free energy ($\Delta E_{gradient}$, associated with the distortion of the field).
Figure 24B:
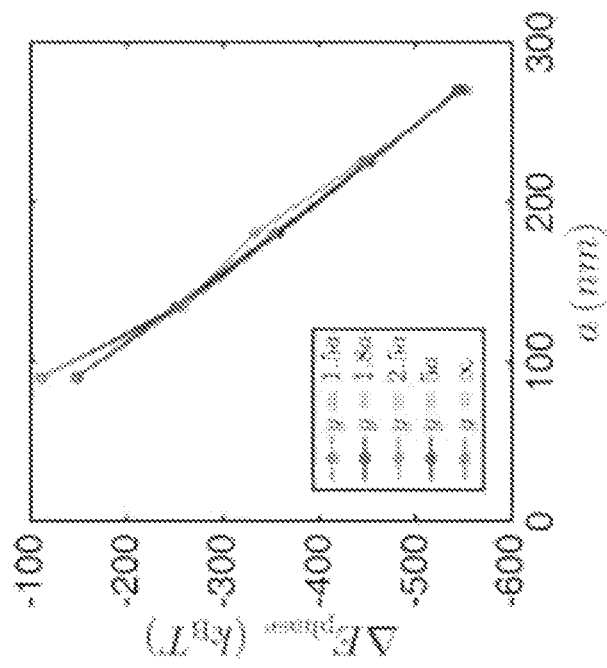

To explore how $\Delta E$ scales with colloid radius, we calculate $\Delta E$ in systems of similar geometries in which all length scales are increased proportionally with a for a range of values (colloid radius a=90, 135, 180, 225, 270 nm) (FIG. 15F, FIG. 24). The total energy consists of two parts, the phase free energy which captures the defect energy, and the gradient free energy which captures the distortion of the field. The hedgehog defect does not grow with the system size, while the Saturn ring grows with the linear dimension of the system. Thus, the difference in the phase free energy $\Delta E_{phase}$ between dipole and quadrupole is always linear in a (FIG. 24A). However, the gradient free energy $\Delta E_{gradient}$ has more complex scaling, with a part that scales linearly in a and a part that scales as a log(a). Simulated values for $\Delta E_{gradient}$ are fitted to such a form $k_1 a + k_2 a \log(a) + k_3$, FIG. 24B).

The sum of these two ($\Delta E = \Delta E_{phase} + \Delta E_{gradient}$) for different y values is presented in FIG. 15F (circles: simulated results; solid line: fit; dotted lines: extrapolations to micron-sized particles). Note that for large a values, comparable to those in experiment, the linear-logarithmic form fitted to $\Delta E_{gradient}$ is linear in a. Extrapolation of $\Delta E$ according to the scaling arguments presented above suggests that $\Delta E$ becomes negative for large enough a. In this limit, the dipole becomes the stable configuration everywhere in the domain, in agreement with experiment. Furthermore, this suggests that, as a particle moves closer to the wall, the dipolar configuration is more favored.

These results show that the distortion field exerted by the wavy boundary can be considered as an external field, in some ways analogous to external electrical, magnetic or flow fields. However, the spatial variations in the elastic energy landscape and its dependence on boundary geometry allow gentle manipulations of colloids and their defects that are not typically afforded by those other fields.

Multiple Paths Diverging from Unstable Points

Figure 16A:
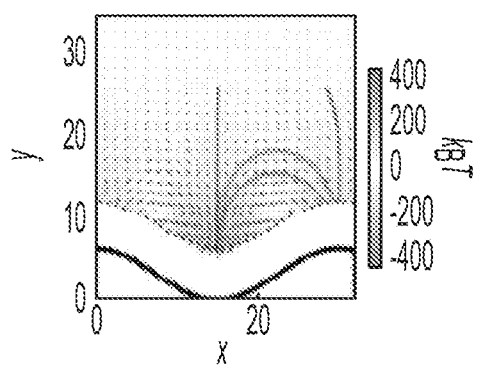
FIG. 16A-16F illustrates multiple states and reconfigurable docking.

The elastic energy field in the vicinity of the wall was simulated by placing the COM of a colloid in a Saturn ring configuration at different locations (x, y). The reference energy is evaluated at ($\lambda/2$, $\lambda$), where, recall, $\lambda$ is the wavelength of the periodic structure of the wall (FIG. 16A). The energy in the color bar is given in $k_B T$ for a colloid 54 nm in radius. The vectors in this figure show local elastic forces on the particle, obtained by taking the negative gradient of the elastic energy field. The solid curves indicate a few predicted trajectories for colloids placed at different initial positions in the energy landscape. (FIG. 25). In the preceding discussions, we have focused on attractive particle-wall interactions and associated stable or metastable equilibria, which correspond to the energy minima (blue) above the well. However, the location directly above a hill is an unstable point. When colloids are placed near this location using an external magnetic field, they can follow multiple diverging paths upon removal of the magnetic field. The particular paths followed by the colloid depend on small perturbations from the unstable point. Trajectories are computed by taking a fixed step size in the direction of the local force as defined by the local energy gradient (FIG. 16A).

Figure 16B:
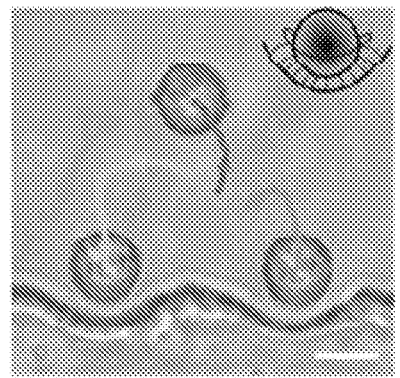

In our experiments, amongst 28 trials using an isolated homeotropic colloid with a Saturn ring, the colloid moved along a curvilinear path to the well on its left 11 times, to the well on its right ten times and was repelled away from the peak until it was approximately one wavelength away from the wall seven times. These trajectories are also consistent with the heat map in FIG. 16A. The numerically calculated trajectories (FIG. 16A) and their extreme sensitivity to initial position are in qualitative agreement with our experimental results (FIG. 16B). Thus, small perturbations in colloid location can be used to select among the multiple paths.

Figure 16C:
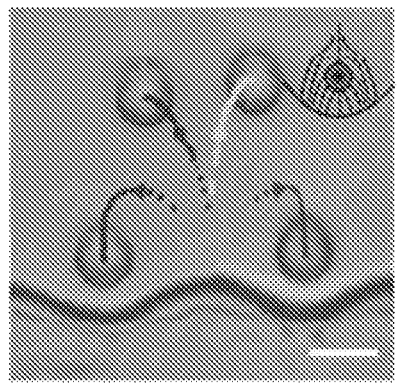
Figure 16D:
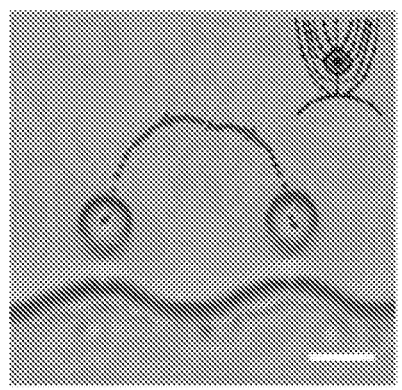

So far we have primarily discussed colloids with Saturn ring defects, but we can also tailor unstable points and attractors for dipolar colloids, and find important differences between the behavior of colloids attracted to wells and those attracted to hills. For example, a dipole pointing away from the wall (FIG. 16C) behaves like a colloid with companion Saturn rings in several ways. Both are attracted over a long range to equilibrate in wells, and both have unstable points above hills. Also, when released from this unstable point, both defect structures can travel in three distinct directions (left, right, and away from the wall, FIG. 16C). On the other hand, dipoles pointing toward the wall (FIG. 16D) behave differently. They are attracted to stable equilibria near hills, and are unstable near wells. Interestingly, when released from a point near a well, these colloids can travel only toward one of the adjacent hills. That is, there is no trajectory above the well that drives them in straight paths away from the wall.

Figure 16E:
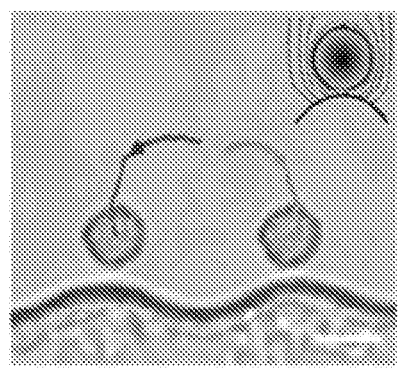

Finally, we observed the behavior of colloids with planar molecular anchoring, which form two topologically required "boojums", surface defects at opposing poles. They behave similarly to downward-orienting dipoles (FIG. 16E); they equilibrate near the hills, and they follow only two sets of possible paths when released from unstable points above a well. The ability to drive particle motion with a gently undulating wall is thus not limited to colloids with companion Saturn rings; the wall also directs the paths of dipolar colloids with homeotropic anchoring and colloids with planar anchoring, decorated with boojums.

Figure 16F:
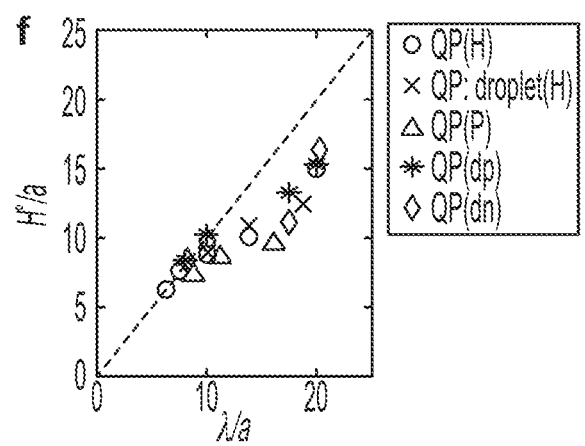

These results indicate that the range of repulsion differs for hills and wells. This is likely related to the differences in the nematic director field near these boundaries. While converging splay field lines are sourced from the well, divergent splay field lines emanate from the hill. Both fields must merge with the oriented planar anchoring far from the wall. As a result, hills screen wells better than wells screen hills. The ranges of interaction for various colloid-defect configurations are summarized in FIG. 16F; while colloids with each defect structure have distinct equilibrium distances from a flat wall (FIG. 26), the range of interaction between colloids and wavy walls follows a similar trend independent of the topological defects on the colloid (FIG. 16F).

Extending the Range of Interaction by Placing Wavy Walls Across from Each Other

Figure 17A:
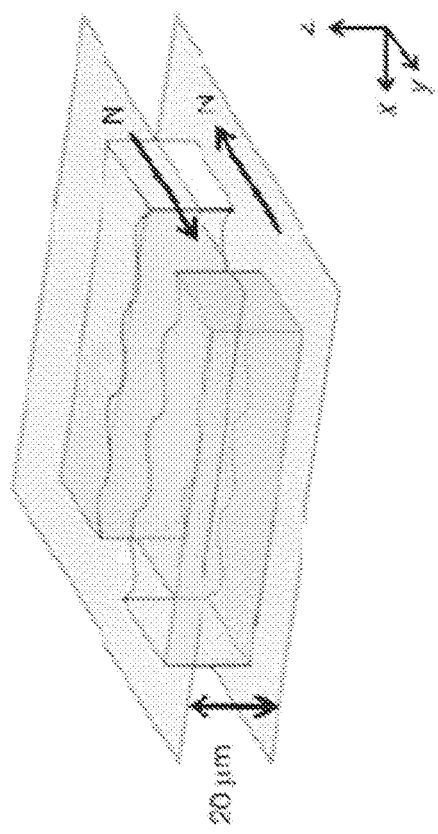
FIG. 17A-17F illustrates repulsion and bistable docking of dipoles and Saturn rings.
Figure 17B:
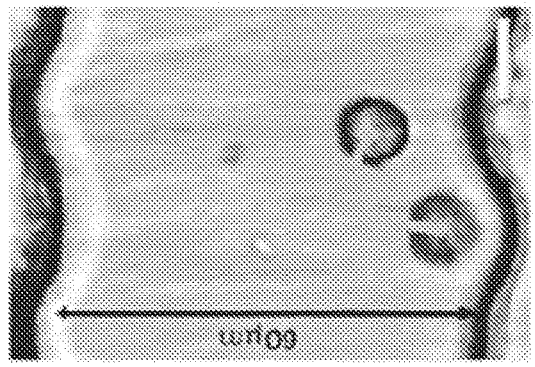
Figure 17C:
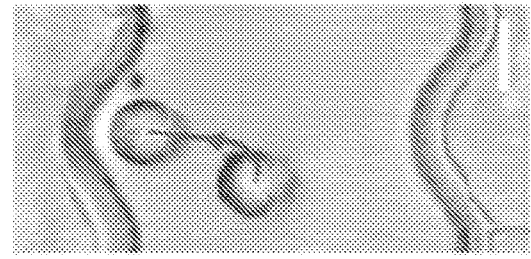

Thus far, we have discussed instances of colloids of different defect structures diverging along multiple paths from unstable points near wavy walls. These features can be used to launch the colloid from one location to another, propelled by the elastic energy field. To demonstrate this concept, we arranged two wavy walls parallel to each other with the periodic structures in phase, i.e., the hills on one wall faced valleys on the other (FIG. 17A). For wall-to-wall separations more than $2\lambda$, colloids with Saturn rings docked, as expected (FIG. 17B). For wall-to-wall separations less than $2\lambda$, a colloid, placed with a magnetic field above the peak on one wall, was guided by the NLC elastic energy to dock in the valley on the opposite wall (FIG. 17C), thus effectively extending its range of interaction with the second wall. In the context of micro-robotics, such embedded force fields can be exploited to plan paths for par-tides to move from one configuration to another, guided by a combination of external magnetic fields and NLC-director field gradients.

Figure 17D:
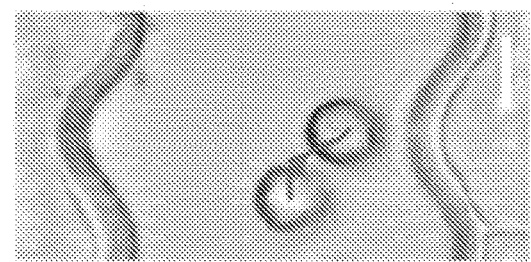
Figure 17E:
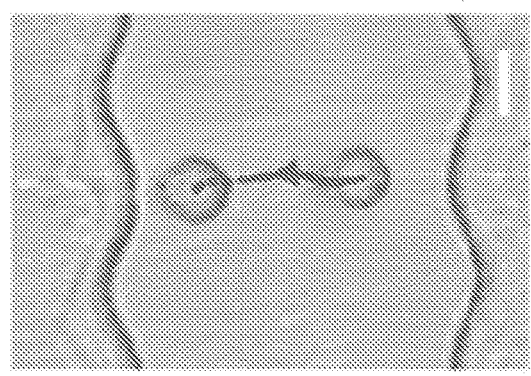
Figure 17F:
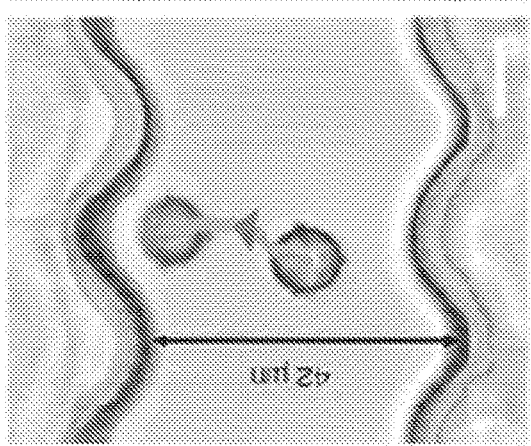

We can also exploit wall-dipole interactions to shuttle the colloid between parallel walls. For walls positioned with their wavy patterns out-of-phase (FIG. 17D), dipoles with point defect oriented upwards are repelled from initial positions above hills on the lower wall and dock on the hill on the opposite wall. However, for walls with their patterns in phase, dipoles with defects oriented downwards released from an initial position above a well dock either at an adjacent hill on the same wall (FIG. 17E), or in an attractive well on the opposite wall (FIG. 17F).

"Goldilocks" or Well-Selection for Colloids in Motion

Particles in motion can select preferred places to rest along the wavy wall. Wells with different wavelengths create energy gradients that decay at different, well-defined distances from the wall. Placing wells of different sizes adjacent to each other offers additional opportunities for path planning. In one setting that we explore, a colloid can sample multiple wells of varying sizes under a background flow in the x direction. We followed a colloid moving under the effect of gravity. The sample was mounted on a custom-made holder that can be tilted by an angle $\alpha$ (FIG. 18A, 18B) within a range between 10° and 20° so that the colloid experiences a body force in the x direction. We have verified in independent experiments that, without the wall, the particle moves at a constant velocity due to balance of drag and gravity. In the presence of the wavy wall, the particle's trajectory is influenced by the energy landscape there. We first describe the particle paths over a series of periodic wells, and then describe motion for wells of decreasing wavelengths.

Docking or continued motion in the cell is determined by a balance between the body force that drives x-directed motion and viscous forces that resist it, the range and magnitude of attractive and repulsive elastic interactions with the wall, and viscous drag near the wall. If the particle moves past the well in the x direction faster than it can move toward the wall, it will fail to dock. However, if interaction with the well is sufficiently pronounced to attract the particle before it flows past, the particle will dock.

Figure 18C:
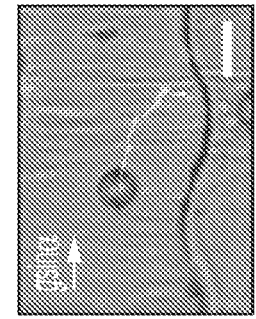
FIG. 18A-18E illustrates "Goldilocks" colloid in motion docks in a preferred well.
Figure 18B:
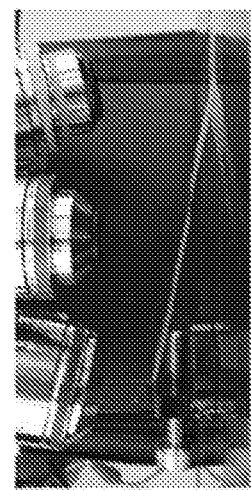
Figure 18A:
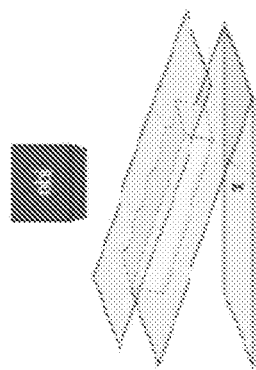
Figure 18E:
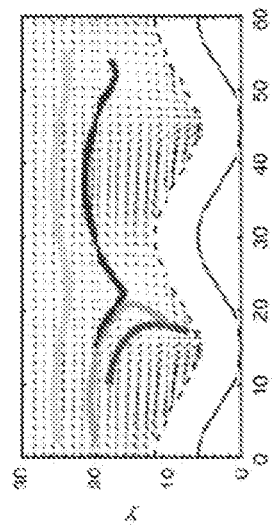
Figure 18D:
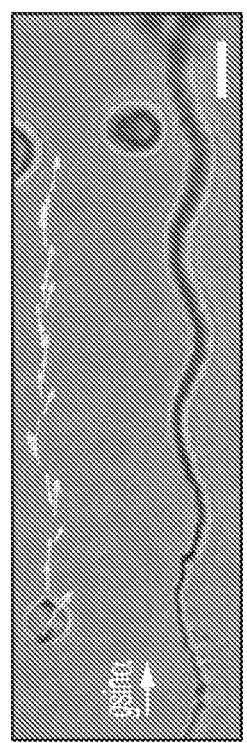

For a tilted sample with a wavy wall of uniform wavelength ($\lambda$=70 µm), colloids initially close enough to the wall dock into the nearest well (FIG. 18C, $V_x$=0.01 µm s$^{-1}$). Far from the wall, the colloids do not dock. However, the influence of the wall is evident by the fact that the colloids do not remain at a fixed distance from the wall. Rather, the distance from the wall varies periodically, and this periodic motion has the same wavelength as the wall itself (FIG. 18D, $V_x$=0.06 µm s$^{-1}$).

To simulate the forces on the particle, a particle is placed at different locations near a wall, and the energy of the system is calculated. Gradients in this energy capture the forces on the colloid owing to the distortions of the director field at each location. A uniform body force in the x direction is then added on the colloid to find the trajectories. We simulated the trajectories for various initial loci. We find two outcomes: for strong x-directed force and/or far from the wall, the particle follows a wavy path (FIG. 18E, yellow trajectory); for weak x-directed force and near the wall, the particle docks (FIG. 18E, red and green trajectories). A particle slows down right before the hill and speeds up as it approaches the next well. This velocity modulation can be attributed to the interaction with the splay-bend region, similar to particles moving within an array of pillars. Our experiments and simulations are in good agreement, showing both behaviors.

Figure 18G:
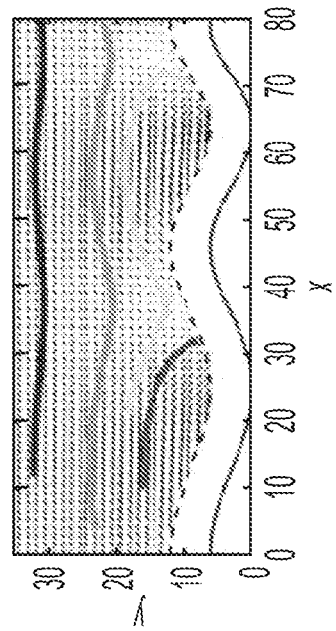
FIG. 18G—particle trajectories predicted for the sum of the elastic energy field and a gravitational potential energy gradient in −x direction. All colloids have 2a=13 The scale bars are 20 μm.
Figure 18F:
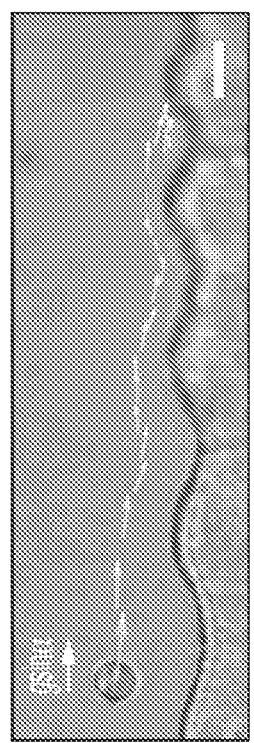

However, a different behavior is observed when we modulate the wavelength of the wavy wall, by placing wells adjacent to each other with different wavelength as defined in FIG. 11A. As a particle travels past successive wells of decreasing wavelengths ($\lambda$=70, 60, 50, 40 µm), the particle moves in they direction, closer to the wells, until it eventually is entrained by a steep enough attraction that it docks (FIG. 18F, $V_x$=0.09 µm s$^{-1}$). This particle, like Goldilocks, protagonist of a beloved children story, finds the well that is "just right". Simulation of two wells with different wavelengths and a superimposed force confirms these results: we can achieve an additional state not possible with the uniform well, i.e. a wavy trajectory that descends and docks (FIG. 18G, yellow trajectory). The slight energy difference between wells of different wavelength underlies the "Goldilocks" phenomenon. Because the energy landscape defines zones of strong bend and splay, the ratio between the elastic constants $K_{11}$ and $K_{33}$ is important in determining the particle paths. Such interactions open interesting avenues, e.g., those in which the rates of motion owing to elastic forces and those owing to applied flows are tuned, and the trapping energy of the docking sites are tailored, e.g., for colloidal capture and release.

Discussion

The development of robust methods to drive microscopic objects along well-defined trajectories paves new routes for materials assembly, path planning in microrobotics and other reconfigurable micro-systems. Strategies developed within NLCs are one means to address these needs. Since the strategies developed in liquid crystals depend on topology, confinement, and surface anchoring, which can be manipulated by changing surface chemistry or texture on colloids with very different material properties, they are broadly applicable across materials platforms. We have developed controllable elastic energy fields in NLCs near wavy walls as a tool to manipulate the ranges of attraction and to define stable equilibiria. We have also exploited elastic energy fields to drive transitions in topological defect configurations. The near-field interaction between the colloid and the wall rearranges the defect structure, driving a transition from the metastable Saturn ring configuration to the globally stable dipolar configuration for homeotropic colloids.

We account for this transformation by means of an analogy between confinement and an external applied field. However, the gentle elastic energy field allows us to access metastable states. As these defect sites are of interest for molecular and nanomaterials assembly, the ability to control their size and displacement provides an important tool to improve understanding of their physico-chemical behavior, and potentially to harvest hierarchical structures formed within them.

Furthermore, we have developed the concept of repulsion from unstable points as a means to dictate paths for colloids immersed within the NLCs. We have identified unstable sites from which multiple trajectories can emerge, and have used these trajectories to propel particles, demonstrating the multistability made possible by the wavy wall geometry. Finally, we have demonstrated the Goldilocks concept, i.e., that wells of different wavelengths can be used to guide docking of particles moving in a superimposed flow or via an external force. These concepts lend themselves to actuation and path planning in reconfigurable systems.

Methods

Assembly of the Cell

We have developed a wavy wall confined between two parallel (or nearly parallel) plates as a tool to direct colloid assembly. The wavy wall is configured as a bounding edge to the planar cell. The NLC cell and the walls were fabricated.

An exemplary procedure is briefly outlined here. The wavy walls are made with standard lithographic methods of SU-8 epoxy resin (Micro-Chem Corp.). The wells have wavelengths $\lambda$ ranging from 27-80 µm and consist of smoothly connected circular arcs of radius R between 7-40 µm. These strips, of thickness between T=20-28 µm, are coated with silica using silica tetrachloride via chemical vapor deposition, then treated with DMOAP (dimethyloctadecyl[3-(tri-methoxysityl)propyl]). The wavy wall is sandwiched between two antiparallei glass cover slips, treated with 1% PVA (poly(vinyl alcohol)), annealed at 80° C. for 1 h and rubbed to have uniform planar anchoring. Once assembled, the long axis of the wall is perpendicular to the oriented planar anchoring on the bounding surfaces. We observed that in some LC cells the actual thickness was larger than expected, which we attribute to a gap above the strip. In those cases, we noticed that some small colloids could remain trapped between the wavy strip and the top glass surface, so the effective thickness could be as large as 35-40 µm.

Particle Treatment and Solution Preparation

We use the NLC 5CB (4-cyano-4'-pentylbiphenyl, Kingston Chemicals) as purchased. We disperse three types of colloids in the 5CB. The size and polydispersity of the colloids are characterized by measuring a number of colloids using the program FIJI. (1) a=7.6±0.8 pm silica particles (Corpuscular Inc.), treated with DMOAP to have homeotropic anchoring. (2) a=4.3±0.4 µm ferromagnetic particles with polystyrene core and coated with chrome dioxide (Spherotech, Inc.), treated with DMOAP, an amphiphile that imposes homeotropic anchoring, or with PVA for planar anchoring. (3) a=4.3-8 µm custom-made emulsion droplets where water phase was loaded with magnetic nanoparticles and crosslinked. The oil phase consisted of 5CB mixed with 2 wt % Span 80.

The water consisted of a 50:50 mixture of water loaded with iron oxide nanoparaticle and a pre-mixed crosslinking mixture. The magnetic nanopowder iron (II, III) oxide (50-100 nm) was first treated with citric to make it hydrophilic, The crosslinking mixture was pre-mixed with HEMA (2-hydroxyl ethyl meta-crylate): PEG-DA (poly(ethylene glycol) diacrylate): HMP (2-hydroxyl-2-methyl-propiophenone) in 5:4:1 ratio. Water and oil phases were emulsified with a Vortex mixer to reach desired colloid size range. The two were combined in a vial treated with OTS (trichloro (octadecyl)silane) to minimize wetting of the wall by the water phase during the crosslinking process. All chemicals were purchased from Sigma Aldrich unless otherwise specified.

The emulsion was crosslinked by a handheld UV lamp (UVP, LLC) at 270 nm at roughly power P=1 mW cm$^{-2}$ for 3 h. The emulsion was stored in a refrigerator for stability. Span 80 ensured that the liquid crystal-water interface would have homeotropic anchoring. The magnetic droplets are very poly-dispersed due to the emulsification process. However, when we compare their behavior with the silica and feromagnetic colloids, we only compare colloids and droplets of similar sizes.

Imaging

The cells form a quasi-2D system that is viewed from above. In this view, the wavy wall is in the plane of observation. The homeotropic colloids dispersed in the NLC are located between the top and bottom coverslips. These colloids are levitated away from both top and bottom surfaces by elastic repulsion. The cell was imaged with an upright microscope (Zeiss Axiolmager Mim) under magnification ranging from 20× to 50×. The dynamics of the colloid near the wavy wall are recorded in real time using optical microscopy. Additional information regarding the director field configuration is also gleaned using polarized optical microscopy.

Application of a Magnetic Field

The magnetic field was applied by using a series of 8 NdFeB magnets (K&J Magnetics, Inc.) attached to the end of a stick. The magnets was placed roughly 0.5 cm from the sample; the field applied is estimated to be roughly 40-60 mT, far below the strength required to reorient the NLC molecules, but sufficiently strong to overcome the drag and move magnetic droplets and particle in arbitrary directions.

Numerical Modeling by Landau-de Gennes (Ld6) Simulation

Numerical modeling provides insight into the NLC-director field in our confining geometries. We use the standard numerical Landau-de Gennes (Q-tensor) approach with a finite difference scheme on a regular cubic mesh. This approach is widely used to compute regions of order and disorder in bounded geometries through a global free energy minimization. The Q-tensor is a second-rank, traceless, symmetric tensor whose largest eigenvalue is the order parameter S in the NLC. Using the Landau-de Gennes approach, at equilibrium, the 3-D director field and the locations of defect structures for a given geometry are predicted. The nematic director field, a headless vector field (i.e., −n=n), represents the average direction of an ensemble of molecules of size comparable to the correlation length at any point in the system. Defects are defined as the regions where the order parameter S is significantly less than than the bulk value. The mesh size in our simulation is related to the correlation length in the NLC, and corresponds to 4.5 nm. Due to the difference in scale, the exact final configurations of numerics and experiment must be compared with caution; nevertheless, it is an invaluable tool to corroborate and elucidate experimental findings.

Simulation Geometry and Parameters

The geometry of the system, the boundary conditions, and elastic constants for the NLC are inputs to the numerical relaxation procedure. The one-constant approximation is used. Since we have a quasi-2D system, with the director field expected to lie in the plane of the wavy wall, the effect of changing the twist constant is expected to be weak in comparison to changing the splay and bend elastic constants. Specifically, the particle is bounded by walls with oriented planar anchoring separated by thickness T=4a, unless otherwise specified. The effect of confinement with different T values has been explored in detail in FIG. 19. The anchoring at the boundary opposite of the wavy wall is set to zero, and that of the flat plates sandwiching the colloid and the wavy wall is set to oriented planar. The Nobili-Durand anchoring potential is used.

Figure 27:
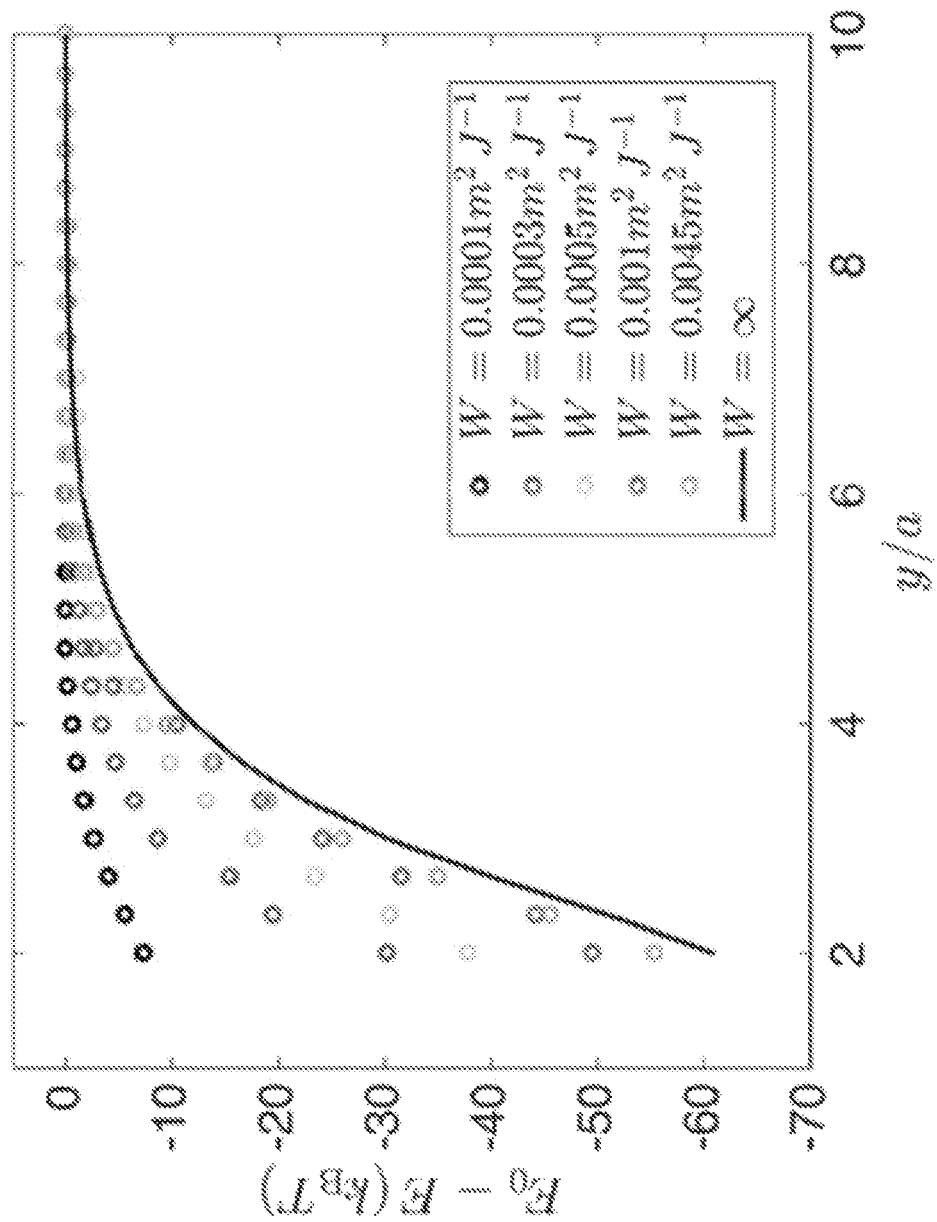
FIG. 27 illustrates the effect of anchoring. The energy of a colloid with Saturn ring defect is simulated by placing it at different distances above a well in a cell of T=4a. For realistic anchoring strength, the energy profile as the particle position changes near the wall remains very similar to the case of infinite anchoring (solid line). If we decrease the anchoring by 10-fold, binding energy (the energy difference between when the particle is far and when it is near the well) decreases, and so does the gradient. Therefore, we also expect the range of interaction to decrease.

Because the size of simulation is much smaller, much stronger anchoring is applied. For most of our results, infinite anchoring strength is applied unless otherwise specified. To verify this assumption is valid, we simulate the particle placed at various distances from lie wavy wall, centered above the well, and the anchoring strength is systematically varied. Under realistic anchoring strength ($10^{-3}$-$10^{-2}$ $Jm^{-2}$), the behavior of the energy of moving a colloid from near to far does not deviate much from that in the case of infinite anchoring (FIG. 27). As we decrease the anchoring further, the particle interacts with the well from a decreased range, and more weakly.

Simulation of the Dipoles

To simulate dipoles, we vary the material constants B and C so that the core energy of the defect is 2.6×higher to compensate for the small system. In addition, we also use an initial condition with a dipolar configuration about the colloid:

$$n(r) = \hat{i} + PR_c^2 \frac{r - r_c}{|r - r_c|^3},$$

where $R_c$ is the colloid radius, $r_c$ is the location of the colloid center, P=3.08 is the dipole moment, and $\hat{i}$ is the far-field director'. This expression is applied only in a sphere of radius $2R_c$ around $r_c$.

Numerical Modeling by COMSOL

To describe some aspects of the director field in the domain, we employ the common simplification in NLC modeling known as the one-constant approximation: $K_1=K_2=K_3\equiv K$. If there is no bulk topological defect, then the director field is a solution to Laplace's equation $\nabla^2 n=0$, which can be solved by COMSOL separately for the two components $n_x$ and $n_z$, from which $n_y$ is obtained by the unit length restriction on n. In COMSOL, this is easiest implemented by the Electrostatics Module. The model solves the equivalent electrostatic problem of $\nabla^2 V=0$, which gives us $n_x$ and $n_z$. Customized geometry, such as the wavy wall, can be built with the geometry builder. We mesh the space with a triangular mesh and calculate the director field components; the results are then exported in grid form and post-processed in MATLAB.

We study the motion of colloids confined in a sandwich cell near a wavy wall. In a related study, absent wavy wall, the effect of confinement on inter-particle potential for particles in a sandwich cell has previously been explored. This study showed that the elasticity-mediated potential for particle pair interactions decreased sharply for center to center particle separations that were large compared to the thickness of the cell. In our sandwich cell, oriented planar anchoring is enforced in the y-direction on the two glass coverslips, in the plane of observation. To investigate the effect of this anchoring on the orientation of the director field in the bulk, we use COMSOL and LdG to investigate the director field for a series of cell thicknesses.

COMSOL is used to calculate the average deviation of the director field above the well with distance y. The nematic is assumed uniaxial, with equal Frank elastic constants. The procedure, detailed in the Methods section, is briefly restated here. For a given geometry constructed in COMSOL, we solve for components of the director field. The components are governed by Laplacian $\nabla^2 n_i=0$ where i=x, z, and $n_y=\sqrt{1-n_x^2-n_z^2}$. Furthermore, the following boundary conditions are imposed: Periodic boundary conditions are enforced in x, uniform planar anchoring ($n_x$|glass=0,$n_2$|) is enforced on the top and bottom glass walls and perpendicular anchoring $$n_x \mid \text{wavy wall} = \frac{-F\prime(x)}{\sqrt{1 + (F\prime(x))^2}},$$

wavy wall=0) is enforced on the wavy wall; y=F(x) defines the shape of the wavy wall. At the boundary opposite the wavy wall at the top of the simulation cell, a free boundary condition is applied. In the single constant approximation, these boundary conditions require that $n_z=0$ everywhere. In a system with no colloids, the distortion is determined by variation of $n_x$ alone. At the glass slide, (FIG. 19A, left panel) the oriented planar anchoring is enforced. In the bulk, the wavy wall is a source of distortions (FIG. 19A, right panel). We have performed these simulations for a number of cell thicknesses T for fixed λ=30; results for T=15 mesh spacing is shown in FIG. 19A. By considering slices in xz-plane (constant y), we determine the average absolute values of n, in that plane. This quantity captures the magnitude of the distortion; a value close to 0 means the director field is oriented the same way as the far-field director. As expected, the distortion decays with distance from the wavy wall (FIG. 19B). For infinite T, the director distortion decays exponentially with decay length λ; this asymptote is plotted as the dashed line in FIG. 19B. For finite T, the distortion field decays more rapidly, owing to the anchoring energies on the top and bottom of the cell.

To relate these findings to the distance H* at which the colloid interacts with the wall, LdG simulation is used to calculate the total energy of the system with a colloid with homeotropic anchoring in a Saturn ring configuration. The colloid of radius a is placed at various distances y from the wavy wall, centered above the well (FIG. 19C). The energy of the system is plotted against the distance y normalized by the radius a on a log-log plot for different cell thicknesses T (=4a, 6a, 8a, 12a, 15a, FIG. 19D). The plot confirms that confinement diminishes the range of the interaction of the wall.

To gain insight into the energetics of the quadrupole to dipole transition, we use a combination of numerics and theory. LdG numerical modeling is used to compare the energy of colloids with dipolar and Saturn ring configurations at different distances y away from the wavy wall. In our study, we increase the nematic defect core energy by 2.6× to accommodate for the small size of our simulation compared to experimental scales for all simulation of dipoles and those for Saturn rings used to compare to the results of dipoles. We do this in order to stabilize a dipolar configuration in the numerics for colloid radii as small as 90 nm, allowing us to model both the colloid and the larger wavy wall in a box of reasonable size. The Landau-de Gennes free energy stabilizes the nematic phase over the isotropic phase with a free energy density $f_{phase}$:

$$f_{phase} = \tfrac{1}{2} A \cdot Tr(Q^2) + \tfrac{1}{3} B \cdot Tr(Q^3) + \tfrac{1}{4} C \cdot Tr((Q^2))^2 \quad (4)$$

To increase the defect core energy, we replace the ratios $B/A \approx 12.23$, $C/A \approx -10.06$, commonly used to model 5CB, with $B/A = 106$, $C/A = -86.5$. With $A<0$ held fixed, this replacement increases by a factor of 2.6 the magnitude of the minimum value $f_{phase}$, which sets the defect core energy density.

Figure 21A:
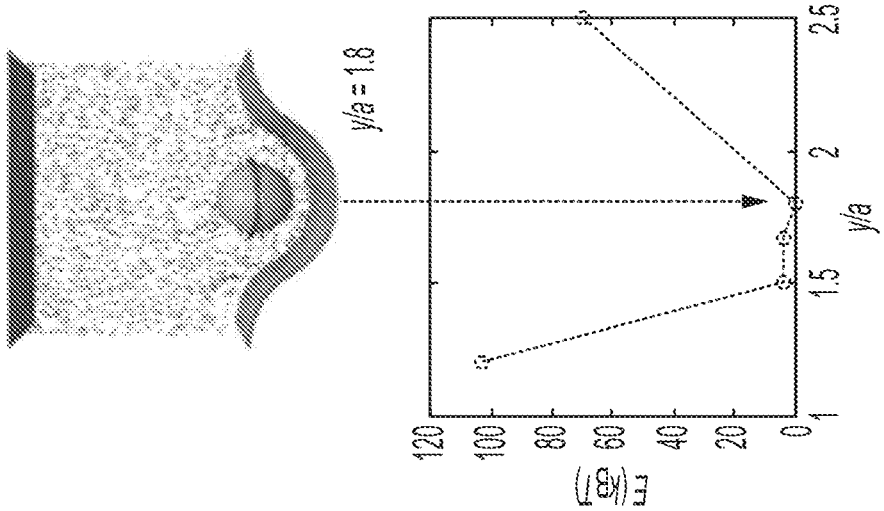

To simulate the dipolar configuration rather than the Saturn ring, we initialized the system with a dipole-like director field. The spherical colloids are placed near the wall at various heights y, with two independent trials for each colloid position, one with a dipole resulting from the dipole-like initialization, and one with a Saturn ring resulting from a uniform director field initialization. The colloid with the Saturn ring defect achieves minimum energy at y=1.8a, corresponding to the splay-matching height (FIG. 21A). The colloid with the dipolar configuration sits lower inside the well, achieving its minimum energy at y=1.5a (FIG. 21C). In both cases, the lowest energy is chosen as the reference energy. In comparing the energy of the Saturn ring and the dipole, we must keep in mind that the Saturn ring is more stable for very small colloids, while the dipolar configuration is stable for larger colloids (a>720 nm). Thus, the Saturn ring always has the lower energy in the numerics, while the opposite is true in experiment.

In order to gain insight into the energy landscape of a colloid near the wall, Landau-de Gennes (LdG) numerical modeling was performed for a colloid located at different locations between two identical wells. The colloid center of mass was placed at a fixed location. The corresponding energy field for the NLC was found. The colloid location was then moved to a new location on a grid. The spacing between COM locations was set to 2.5 times the simulation mesh size, corresponding to 11 nm. The rest of the simulation parameters are as follows, with lengths given in multiples of the simulation mesh size: Colloid radius a=12, corresponding to 54 nm; wavelength of the well $\lambda$=60, corresponding to 270 nm; amplitude A=6, corresponding to 27 nm, with well curvature radius R of roughly 22, corresponding to 98 nm. Thus, $\lambda/a=5$ and $R/A=8$ and adjacent grid points are separated by ~0.2a. The colloid surface imposes homeotropic anchoring of infinite strength.

Figure 25B:
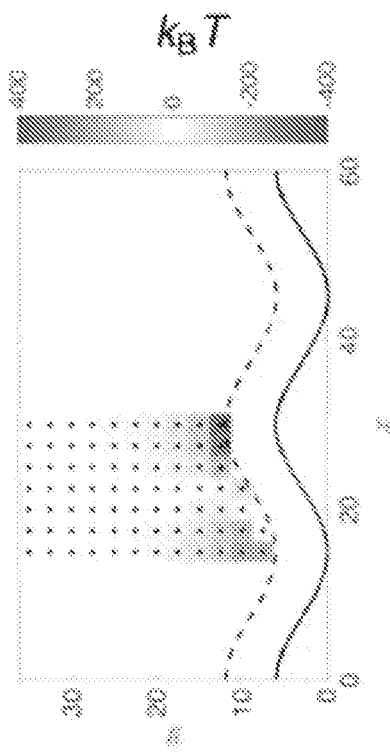
FIG. 25A-25D provides a mapping of the energy landscape by sampling and calculating particle trajectories by force field.
Figure 25D:
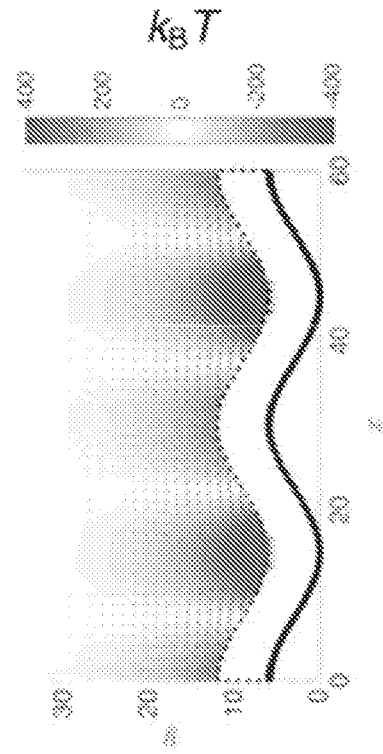
Figure 25A:
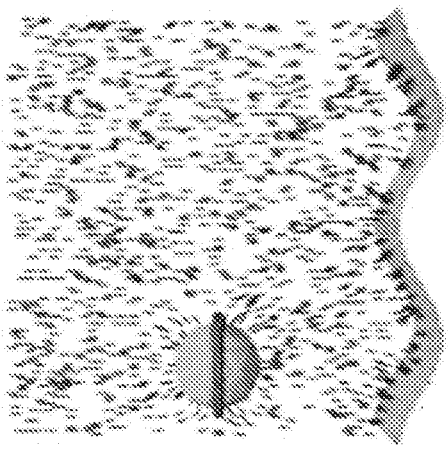
Figure 25C:
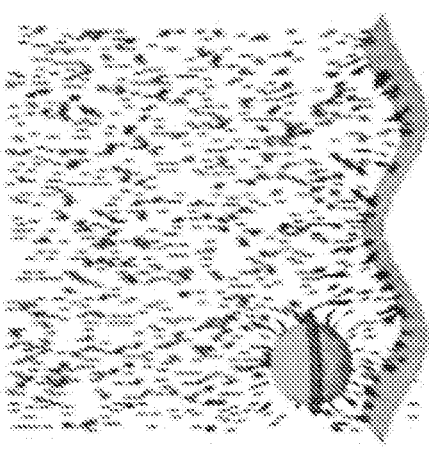

To calculate the liquid crystal free energy, the colloid is centered at a specified location on the grid and the Landau-de Gennes free energy is minimized numerically over the Q-tensor field; the details of the simulation can be found in the Methods section in the main text. The output from two representative colloid locations are shown in FIG. 25A, 25B. The discretized liquid crystal free energy as a function of colloid center position (denoted by black dots) is expressed in the heat map shown in FIG. 25C, by choosing the energy when a colloid is located at (x, y)=($\lambda/2$, $\lambda$) as reference, and performing the conversion from simulation units to real units (1 s.u.=3.7 $k_B T$). Assuming symmetry and periodicity, we can fit a smooth function g(x, y) over the entire space. By taking the gradient of this energy field g(x, y), we obtain the direction of the elastic force field experienced by the particle. This elastic force includes the distortion and defect sourced by a colloid in the domain. Hills are repulsive, and wells are attractive in the case of a colloid with homeotropic anchoring in a Saturn ring configuration (FIG. 25D).

Finally, we simulate trajectories of a colloid released at different locations near the wavy wall. Consider a colloid placed at an initial position $(x_0, y_0)$. The force balance on the colloid is simplified in the limits explored in experiment. Given the low Reynolds number applicable to the colloid's motion, acceleration is negligible. Furthermore, since the colloids move in a deterministic manner, Brownian motion is also negligible. Thus, the colloid moves quasi-statically along a path determined by the elastic force, which is balanced by viscous drag on the particle. We are interested here in the particle path, which is determined by the elastic force. The direction and magnitude of the elastic force at the initial location is calculated by the gradient of the field g (x, y) at that point, as described above. Colloidal paths are simulated by updating the particle position by a step path length $\Delta s$, according to explicit Euler scheme:

$$\begin{cases} x_{i+1} = x_i - \dfrac{\partial g}{\partial x}\bigg|_{v_i, y_1} \Delta s \\ y_{i+1} = y_i - \dfrac{\partial g}{\partial y}\bigg|_{v_i, y_1} \Delta s \end{cases}$$

Trajectories starting from arbitrary locations can thereby be calculated, in qualitative agreement with experimental trajectories. We show that the trajectories are very sensitive to initial locations. This method does not take into account hydrodynamic interactions with the wall or Brownian motion.

In order to determine how colloids interact with a planar boundary, we place ferromagnetic colloids (2a=8.7, 10, 10.2, 9.8 μm in FIG. 26A-26D) with different defect configurations adjacent to a planar wall with homeotropic anchoring (FIG. 26). Upon releasing the magnetic field, the colloids, repelled, migrate away from the wall. We track their trajectories and record their equilibrium location y=h. To confirm that the particles have reached their equilibrium positions, we track the particles for an additional 500 s to ensure that they do not move further from the wall. Since we are looking at the sample from a bird's eye view, the particles do not move under the influence of gravity. Particles reach different equilibrium heights based on the type and orientation of their defects. In particular, an oriented dipole with the defect away from the wall (FIG. 26A) has the longest range of repulsion from the wall to a distance of h/a=4.5 while a colloid with boojums equilibrates merely h/a=2.2 away from the wall. Furthermore, although the symmetry of these colloids can be approximated as multipoles in the far field, in the near field the details matter. Specifically, the director field between the upward-orienting dipole and the Saturn ring are similar (diverging splay), and that of the downward-orienting dipole and the boojum are similar (converging splay). As a result, these colloids behave similarly based on their near-field director configurations.

Exemplary Embodiments

The following embodiments are exemplary only and do not limit the scope of the present disclosure or the appended claims.

Embodiment 1. A method for manipulating a colloidal particle, the method comprising: constructing a nematic liquid crystal cell assembly by forming a bounded cell, including placing at least one wavy wall between two parallel plates to form at least one bounding edge; and confining nematic liquid crystals within the bounded cell, wherein the colloidal particle is within the nematic liquid crystals; wherein geometry of the at least one wavy wall defines an elastic energy field within the confined nematic liquid crystals that is configured to interact with the colloidal particle.

Embodiment 2. The method of Embodiment 1, wherein the method further comprises placing two wavy walls in parallel between two parallel plates to form at least two bounding edges of the nematic liquid crystal assembly. The wavy walls can be, e.g., opposed to one another. In some embodiments, a first line can be drawn that contacts the peaks of the undulations on the first of the two wavy walls, which first line is parallel (or nearly parallel) to a second line, the second line being drawn such that it contacts the peaks of the undulations of the second of the two wavy walls.

Embodiment 3. The method of Embodiment 2, wherein the two parallel wavy walls are in-phase with one another.

Embodiment 4. The method of Embodiment 2, wherein the two parallel wavy walls are out-of-phase.

Embodiment 5. The method of Embodiment 2, wherein a gap between the two parallel wavy walls is configurable. The gap can be, e.g., adjustable in distance. One or both of the wavy walls can be slidable and/or angle-able relative to the other.

Embodiment 6. The method of Embodiment 1, wherein the colloidal particle has a topological point defect such that it is a topological dipole or has quadrupolar symmetry.

Embodiment 7. The method of Embodiment 6, wherein the colloidal particle with the nematic liquid crystals is confined within the nematic liquid crystal cell assembly and has quadrupolar symmetry, and the method further comprises: distorting the quadrupolar symmetry of the colloidal particle with the elastic energy field of the at least one wavy wall.

Embodiment 8. The method of Embodiment 7, wherein the quadrupolar symmetry of the colloidal particle transitions to a dipolar defect.

Embodiment 9. The method of Embodiment 1, wherein a period ($\lambda$) of the at least one wavy wall is configurable. For example, a wavy wall's curves can be adjustable such that the distance between peaks on adjacent curves is adjustable. The period of a wall can be, e.g., from about 0.1 to about 100 micrometers, or from about 1 to about 75 micrometers, or from about 5 to about 50 micrometers, or from about 10 to about 30 micrometers.

Embodiment 10. The method of Embodiment 1, wherein a flow is imparted to the nematic liquid crystal. Flow can be imparted by, e.g., magnetic field, a pressure gradient, and the like.

Embodiment 11. The method of Embodiment 1, further comprising: directing motion of the colloidal particle with the elastic energy field of the nematic liquid crystals defined by the geometry of the at least one wavy wall.

Embodiment 12. The method of Embodiment 11, wherein the method further comprises: placing, with an external magnetic field, the colloidal particle at a location within the nematic liquid crystals confined within the bounded cell, and removing the external magnetic field such that the motion of the colloidal particle is directed by with the elastic energy field of the nematic liquid crystals.

Embodiment 13. The method of Embodiment 11, wherein: the elastic energy field defines stable, metastable, and unstable equilibria along the at least one wavy wall for the colloidal particle; the colloidal particle is attracted to locations along the at least one wavy wall having associated stable or metastable equilibria; the colloidal particle is repelled from locations along the at least one wavy wall having associated unstable equilibria; and the motion of the colloidal particle is directed by the interaction of the colloidal particle with the stable, metastable, and unstable equilibria defined by the elastic energy field.

Embodiment 14. A system, comprising: a bounded cell, the bounded cell comprising at least one wavy wall disposed between two parallel plates to form at least one bounding edge; nematic liquid crystals confined within the bounded cell, a colloidal particle disposed within the nematic liquid crystals; and the geometry of the at least one wavy wall defining an elastic energy field within the confined nematic liquid crystals configured to interact with the colloidal particle.

As described elsewhere herein, a cell can include one wavy wall or a plurality of wavy walls. Wavy walls can be arranged in parallel with one another. Also as described elsewhere herein, a first wavy wall can be arranged opposite a second wavy wall, with the first wavy wall and the second wavy wall being in-phase with one another. In some embodiments, the first wavy wall and the second wavy wall are out-of-phase with one another.

Embodiment 15. A system, comprising: a bounded cell, the bounded cell comprising at least one wavy wall disposed between two parallel plates to form at least one bounding edge; and nematic liquid crystals confined within the bounded cell, a colloidal particle disposed within the nematic liquid crystals; the geometry of the at least one wavy wall defining an elastic energy field within the confined nematic liquid crystals configured to interact with the colloidal particle such that the colloidal particle is encouraged to a stable location within the system.

The disclosed systems can be characterized as having one, two, or more stable states (e.g., a bistable system), such that microparticles can transition between defect configurations, move along distinct paths, and select sites, e.g., for preferred docking. A system can also be configured such that a particle is resistant to displacement from a location or state. Also as described elsewhere herein, a wavy wall can be configured to effect a stable state or even a plurality of stable states within the bounded cell. The wavy wall can be configured so as to give rise to one or more loci attractive to a colloidal particle, one or more loci repulsive to a colloidal particle, or any combination thereof.

As but one example, a system can be constructed such that particles in certain positions are more or less resistant to positional change that particles in other positions. In this way, a system can be configured (e.g., as a detector) such that it is sensitive to one or more certain gradients, e.g., a gradient that dislocates at least some particles but does not disturb other such particles can be detected, e.g., via monitoring particle displacements. A system can also be configured as a switchable, e.g., via application of a gradient that effects motion of some particles to certain stable or meta-stable locations (or away from certain locations) such that the system can act as a filter or other such modality.

Also provided are methods. Such methods include, with a bounded cell according to the present disclosure, applying a gradient sufficient to move a colloidal particle within the bounded cell from a first stable location or a first metastable location to a second stable location or a second metastable location. Such a gradient can be a pressure gradient, a magnetic gradient, an electrical gradient, a temperature gradient, and the like.

Further provided are methods, comprising disposing one or more colloidal particles into a bounded cell according to the present disclosure, the disposing being performed under such conditions that at least one of the one or more colloidal particles self-assembles to a stable or meta-stable location. As described elsewhere herein, a wavy wall of a boundary cell can be configured to have a profile that directs one or more of the colloidal particles to a stable or meta-stable location.

A system can be arranged such that different particles (e.g., particles of different sizes) are directed to different locations within a bounded cell. For example, a cell can be constructed such that particles of a first size are directed to a first location (or a set of first locations) and particles of a second size are directed to a second location (or a set of second locations). A combination of fields (e.g., external magnetic fields and NLC-director field gradients) can be used to move particles from one configuration to another.

Also provided are self-assembling systems, comprising a plurality of colloidal particles disposed within nematic liquid crystal disposed a bounded cell according to the present disclosure, the bounded cell being dimensioned such that the nematic director field defines a force field that directs motion of the colloidal particles such that at least two of the particles are directed toward a first location. The systems can also be configured such that the bounded cell is dimensioned such that the nematic director field defines a force field that directs at least one of the particles toward a second location.

Although the invention is illustrated and described herein with reference to specific embodiments, the invention is not intended to be limited to the details shown. Rather, various modifications can be made in the details within the scope and range of equivalents of the claims and without departing from the invention.

REFERENCES

The following references are provided for convenience. A reference's inclusion is not an admission that the reference is material to the patentability of the technology disclosed herein.

1. Manoharan, V. N. Colloidal matter: packing, geometry, and entropy. *Science* 349, 1253751 (2015).

2. Dinsmore, A. D., Crocker, J. C. & Yodh, A. G. Self-assembly of colloidal crystals. *Curt. Opin. Colloid interface Sci.* 3, 5-11 (1998).

3. Yi, G.-R., Pine, D. J. & Sacanna, S. Recent progress on patchy colloids and their self-assembly. *J. Phys. Condens. Matter* 25, 193101 (2013).

4. Blanc, C., Coursault, D. & Lacaze, E. Ordering nano- and microparticles assemblies with liquid crystals. *Lig. Cryst. Rev.* 1, 83-109 (2013).

5. De Gennes, P.-G., & Prost, J. *The Physics of Liquid Crystals.* 2nd edn (Oxford University Press, New York. 1993).

6. Rasing, T. & Mutevi, 1. *Surfaces and Interfaces of Liquid Crystals.* (Springer-Verlag, Berlin Heidelberg, 2004).

7. Brake, J. M., Mezera, A. D. & Abbott, N. L Effect of surfactant structure on the orientation of liquid crystals at aqueous-liquid crystal interfaces. *Langmuir* 19, 6436-6442 (2003).

8. Brochard, F., Pieranski, P. &Guyon, E. Dynamics of the orientation of a nematic-liquid-crystal film in a variable magnetic field. *Phys. Rev. Letr.* 28, 1681 (1972).

9. Matczyszyn, K. & Sworakowski, J. Phase change in azobenzene derivative-doped liquid crystal controlled by the photochromic reaction of the dye. *J. Phys. Chem. B* 107, 6039-6045 (2003).

10. Legge, C. & Mitchell, G. Photo-induced phase transitions in azobenzene-doped liquid crystals. *J. Phys. D. Appl. Phys.* 25, 492-499 (1992).

11. Chen, K. et al. Colloidal transport within nematic liquid crystals with arrays of obstacles. *Soft Matter* 14, 83-91 (2018).

12. Terentjev, E. Disclination loops, standing alone and around solid particles, in Remade liquid crystals, *Phys. Rev. E* 51, 1330 (1995).

13. Yoshida, H., Asakura, K., Fukuda, I. & Ozaki, M. Three-dimensional positioning and control of colloidal objects utilizing engineered liquid crystalline defect networks. *Nat. Comm.* 6, 7180 (2015).

14. Serra. F. Curvature and defects in nematic liquid crystals. *Liq. Cryst.* 43, 1920-1936 (2016).

15. Poulin, P., Stark, H., Lubensky, T. & Weitz, D. Novel colloidal interactions in anisotropic fluids. *Science* 275, 1770-1773 (1997).

16. Li, X. et al. Directed self-assembly of colloidal particles onto nematic liquid crystalline defects engineered by chemically patterned surfaces. *ACS Nano.* 11, 6492-6501 (2017).

17. Peng, C. et al. Control of colloidal placement by modulated molecular orientation in nematic cells. *Sci. Adv.* 2, e1600932 (2016).

18. Nych. A. et al. Assembly and control of 3d nematic dipolar colloidal crystals. *Nat. Comm.* 4, 1489 (2013).

19. Cavallaro, M. et al. Exploiting imperfections in the bulk to direct assembly of surface colloids. *Proc. Nat! Acad. Sri. USA* 110, 18804-18808 (2013).

20. Lee, E. et al. Fine golden rings: tunable surface plasmon resonance from assembled nanorods in topological defects of liquid crystals. *Adv. Mater.* 28, 2731-2736 (2016).

21. Luo, Y. et al. Around the corner: colloidal assembly and wiring in groovy nematic cells. *Phys. Rev. E* 93, 032705 (2016).

22. Sengupta, A., Bahr, C. & Herminghaus, S. Topological microfluidics for flexible micro-cargo concepts. *Soft Matter* 9, 7251-7260 (2013).

23. Ohzono, T. & Fukuda, J.-I. Zigzag line defects and manipulation of colloids in a menatic liquid crystal microwrinkle groove. *Nat. Comm.* 3, 1709 (2012).

24. Luo, Y., Serra, F. & Stebe, K. J. Experimental realization of the "lock-and-key" mechanism in liquid crystals. *Soft Matter* 12, 6027-6032 (2016).

25. Silvestre, N. M., Patrcio, P. & Telo da Gama, M. M. Key-lock mechanism in nematic colloidal dispersions. *Phys. Rev. E* 69, 061402 (2004).

26. Gu, Y. & Abbott, N. L. Observation of saturn-ring defects around solid microspheres in nematic liquid crystals. *Phys. Rev. Lett.* 85, 4719 (2000).

27. Lavrentovich, O. D. Transport of particles in liquid crystals. *Soft Matter* 10, 1264-1283 (2014).

28. Vilfan, M. et al. Confinement effect on interparticle potential in nematic colloids. *Phys. Rev. Lett.* 101, 237801 (2008).

29. Brenner, H. The slow motion of a sphere through a viscous fluid towards a plane surface. *Chem. Eng. Sci.* 16, 242-251 (1961).

30. Ganatos, P., Pfeffer, R. & Weinbaum, S. A strong interaction theory for the creeping motion of a sphere between plane parallel boundaries. Part 2. Parallel motion. *J. Fluid. Mech.* 99, 755-783 (1980).

31. Chernyshuk, S. & Lev, B. Theory of elastic interaction of colloidal particles in nematic liquid crystals near one wall and in the nematic cell. *Phys. Rev. E* 84, 011707 (2011).

32. Lubensky, T. C., Pettey, D., Currier, N. & Stark, H. Topological defects and interactions in nematic emulsions. *Phys. Rev. E* 57, 610 (1998).

33. Loudet, J. & Poulin, P. Application of an electric field to colloidal particles suspended in a liquid-crystal solvent. *Phys. Rev. Lett.* 87, 165503 (2001), 34. Stark, H. Director field configurations around a spherical particle in a nematic liquid crystal. *Eur. Phys. J. B* 10, 311-321 (1999).

35. Khullar, S., Zhou, C. & Feng, J. J. Dynamic evolution of topological defects around drops and bubbles rising in a nematic liquid crystal. *Phys. Rev. Lett.* 99, 237802 (2007).

36. Loudet, J.-C., Mondain-Monval, O. & Poulin, P. Line defect dynamics around a colloidal particle. *Eur. Phys. J. E* 7, 205-208 (2002).

37. Akarabot, M. et al. Interactions of quadrupolar nematic colloids. *Phys. Rev. E* 77, 031705 (2008).

38. Stark, H. Physics of colloidal dispersions in nematic liquid crystals. *Phys. Rep.* 351, 387-474 (2001).

39. Stark, H. Saturn-ring defects around microspheres suspended in nematic liquid crystals: an analogy between confined geometries and magnetic fields. *Phys. Rev. E* 66, 032701 (2002).

40. Poulin. P. & Weitz, D. Inverted and multiple nematic emulsions. *Phys. Rev. E* 57, 626 (1998).

41. Eskandari, Z., Silvestre, N., Telo da Gama, M. & Ejtehadi, M. Particle selection through topographic templates in nematic colloids. *Soft Matter* 10, 9681-9687 (2014).

42. Ravnik, M. & Zumer, S. Landau-de gennes modelling of nematic liquid crystal colloids. *Liq. Cryst.* 36, 1201-1214 (2009).

43. Nobili, M. & Durand. G. Disorientation-induced disordering at a nematic-liquid-crystal-solid interface. *Phys. Rev. A.* 46, R6174 (1992).

44. M. Vilfan, et al., Confinement effect on interparticle potential in nematic colloids, Phys. Rev. Lett. 101, 237801 (2008).

45. M. Ravnik and S. Zumer, Landau-de Gennes modelling of nematic liquid crystal colloids, Liq. Crys. 36, 1201-1214 (2009).

46. H. Stark, Director field configurations around a spherical particle in a nematic liquid crystal, Eur. Phys. J. B 10, 311-321 (1999).

47. H. Stark, Physics of colloidal dispersions in nematic liquid crystals, Phys. Rep. 351,387-474 (2001).

What is claimed:

1. A method for manipulating a colloidal particle, comprising:
confining nematic liquid crystals within a bounded cell, the bounded cell comprising at least one wavy wall positioned between two parallel plates to form at least one bounding edge,
wherein the colloidal particle is within the nematic liquid crystals, and
wherein a geometry of the at least one wavy wall defines an elastic energy field within the confined nematic liquid crystals that is configured to interact with the colloidal particle at a distance from the at least one wavy wall,
the elastic energy field defining, at a distance from the at least one wavy wall, metastable loci that are attractive to the colloidal particle and unstable loci that are repulsive to the colloidal particle.

2. The method of claim 1, wherein the bounded cell comprises two wavy walls in parallel between two parallel plates to form at least two bounding edges of the bounded cell.

3. The method of claim 2, wherein the two parallel wavy walls are in-phase.

4. The method of claim 2, wherein the two parallel wavy walls are out-of-phase.

5. The method of claim 2, wherein a gap between the two parallel wavy walls is configurable.

6. The method of claim 1, wherein the colloidal particle has a topological dipole or has quadrupolar symmetry.

7. The method of claim 6, wherein the colloidal particle has quadrupolar symmetry, and the method further comprises:
distorting the quadrupolar symmetry of the colloidal particle with the elastic energy field.

8. The method of claim 7, wherein the quadrupolar symmetry of the colloidal particle transitions to a dipolar defect.

9. The method of claim 1, wherein a period ($\lambda$) of the at least one wavy wall is configurable.

10. The method of claim 1, wherein a flow is imparted to the nematic liquid crystals.

11. The method of claim 1, further comprising:
directing motion of the colloidal particle with the elastic energy field of the nematic liquid crystals defined by the geometry of the at least one wavy wall.

12. The method of claim 11, wherein the method further comprises:
placing, with an external magnetic field, the colloidal particle at a location within the nematic liquid crystals confined within the bounded cell, and removing the external magnetic field in order that the motion of the colloidal particle is directed by with the elastic energy field of the nematic liquid crystals.

13. The method of claim 11, wherein:
the elastic energy field defines stable, metastable, and unstable equilibria along the at least one wavy wall for the colloidal particle;
the colloidal particle is attracted to locations along the at least one wavy wall having associated stable or metastable equilibria;
the colloidal particle is repelled from locations along the at least one wavy wall having associated unstable equilibria; and
the motion of the colloidal particle is directed by the interaction of the colloidal particle with the stable, metastable, and unstable equilibria defined by the elastic energy field.

14. A system, comprising:
a bounded cell, the bounded cell comprising at least one wavy wall disposed between two parallel plates to form at least one bounding edge;
nematic liquid crystals confined within the bounded cell; and
a colloidal particle disposed within the nematic liquid crystals,
a geometry of the at least one wavy wall defining an elastic energy field within the confined nematic liquid crystals configured to interact with the colloidal particle, the elastic energy field defining, at a distance from the wavy wall, metastable loci that are attractive to the colloidal particle and unstable loci that are repulsive to the colloidal particle.

15. A system, comprising:
a bounded cell, the bounded cell comprising at least one wavy wall disposed between two parallel plates to form at least one bounding edge;
nematic liquid crystals confined within the bounded cell; and
a colloidal particle disposed within the nematic liquid crystals,
a geometry of the at least one wavy wall defining an elastic energy field within the confined nematic liquid crystals configured to interact with the colloidal particle such that the colloidal particle is encouraged to a stable location within the system, the elastic energy field defining, at a distance from the wavy wall, metastable loci that are attractive to the colloidal particle and unstable loci that are repulsive to the colloidal particle.

16. The method of claim 1, wherein the metastable loci that are attractive to the colloidal particle are attractive to the colloidal particle at a distance that is greater than a radius of the colloidal particle and wherein the unstable loci that are repulsive to the colloidal particle are repulsive to the colloidal particle at a distance that is greater than a radius of the colloidal particle.

17. The system of claim 14, wherein the metastable loci that are attractive to the colloidal particle are attractive to the colloidal particle at a distance that is greater than a radius of the colloidal particle and wherein the unstable loci that are repulsive to the colloidal particle are repulsive to the colloidal particle at a distance that is greater than a radius of the colloidal.

18. The system of claim 15, wherein the metastable loci that are attractive to the colloidal particle are attractive to the colloidal particle at a distance that is greater than a radius of the colloidal particle and wherein the unstable loci that are repulsive to the colloidal particle are repulsive to the colloidal particle at a distance that is greater than a radius of the colloidal particle.

* * * * *

UNITED STATES PATENT AND TRADEMARK OFFICE
CERTIFICATE OF CORRECTION

PATENT NO. : 11,708,532 B2
APPLICATION NO. : 17/025431
DATED : July 25, 2023
INVENTOR(S) : Kathleen J Stebe et al.

It is certified that error appears in the above-identified patent and that said Letters Patent is hereby corrected as shown below:

On the Title Page

Item (72) In Inventors, Under Column No. 1, Line no. 1, Replace:
"Kathleen J Stebe,"
With:
--Kathleen J. Stebe,--

In the Specification

Under Column No. 5, Line no. 48, Replace:
"wavelengths (k=70, 60,"
With:
--wavelengths ($\lambda$=70, 60,--

Under Column No. 5, Line no. 51, Replace:
"2a=13"
With:
--2a=13μm.--

Under Column No. 11, Line nos. 13-14, Replace:
"2 wt % Span 80."
With:
--2 wt% Span 80.--

Under Column No. 13, Line no. 8, Replace:
"differing k,"
With:
--differing $\lambda$,--

Signed and Sealed this
Thirty-first Day of October, 2023

Katherine Kelly Vidal
*Director of the United States Patent and Trademark Office*

Under Column No. 16, Line no. 12, Replace:
"y=5a toy=1.8a."
With:
--y=5a to y=1.8a.--

Under Column No. 19, Line no. 33, Replace:
"(TNT,=34.9° C.)."
With:
--($T_{NI}$=34.9° C.).--

Under Column No. 19, Line no. 38, Replace:
"along they direction."
With:
--along the y direction.--

Under Column No. 20, Line no. 43, Replace:
"(i.e., $\lambda \leq 40$ pm),"
With:
--(i.e., $\lessgtr 40$ pm),--

Under Column No. 21, Line no. 65, Replace:
"they direction"
With:
--the y direction--

Under Column No. 26, Line no. 50, Replace:
"in they direction,"
With:
--in the y direction,--

Under Column No. 28, Line no. 15, Replace:
"2 wt % Span 80."
With:
--2 wt% Span 80.--

Under Column No. 29, Line nos. 58-59, Replace:
"far-field director'."
With:
--far-field director$^{38}$.--

Under Column No. 30, Line no. 19, Replace:
"in the y-direction"
With:
--in the γ-direction--